United States Patent
Khoshnevisan et al.

(10) Patent No.: US 12,532,360 B2
(45) Date of Patent: Jan. 20, 2026

(54) DOWNLINK CONTROL CHANNEL REPETITION FOR A DOWNLINK CONTROL CHANNEL ORDER

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 397 days.

(21) Appl. No.: 17/885,309

(22) Filed: Aug. 10, 2022

(65) Prior Publication Data
US 2023/0096505 A1    Mar. 30, 2023

Related U.S. Application Data

(60) Provisional application No. 63/250,963, filed on Sep. 30, 2021.

(51) Int. Cl.
*H04W 74/0833* (2024.01)
*H04W 74/0838* (2024.01)

(52) U.S. Cl.
CPC .... *H04W 74/0833* (2013.01); *H04W 74/0838* (2024.01)

(58) Field of Classification Search
CPC ............. H04W 74/0833; H04W 72/23; H04W 74/0838; H04W 74/006
See application file for complete search history.

(56) References Cited

U.S. PATENT DOCUMENTS

| | | | |
|---|---|---|---|
| 2020/0045569 A1* | 2/2020 | Seo | H04W 72/23 |
| 2021/0185689 A1 | 6/2021 | Zhou et al. | |
| 2021/0321373 A1* | 10/2021 | Rahman | H04L 5/0023 |
| 2023/0042828 A1* | 2/2023 | Uchino | H04W 74/0833 |

(Continued)

FOREIGN PATENT DOCUMENTS

| | | | |
|---|---|---|---|
| WO | WO-2021022123 A1 | 2/2021 | |
| WO | WO-2022067227 A1 | 3/2022 | |
| WO | WO-2022212644 A1 | 10/2022 | |

OTHER PUBLICATIONS

International Search Report and Written Opinion—PCT/US2022/042071—ISA/EPO—Dec. 22, 2022.

(Continued)

*Primary Examiner* — Charles N Appiah
*Assistant Examiner* — Frank E Donado
(74) *Attorney, Agent, or Firm* — Holland & Hart LLP

(57) ABSTRACT

Methods, systems, and devices for wireless communications are described. A user equipment (UE) may receive, from a network device, a downlink control channel order requesting the UE to participate in random access procedure via two or more downlink control channel candidates associated with different transmission configuration indicator (TCI) states that are linked for repetition. In some examples, downlink control information conveying the downlink control channel order may indicate which TCI state to use for the random access procedure. In some examples, the UE may select a TCI state to use for the random access procedure, for example, based on the channel quality of the downlink control channel candidates.

30 Claims, 26 Drawing Sheets

(56) References Cited

U.S. PATENT DOCUMENTS

2023/0125672 A1* 4/2023 Grossmann ....... H04W 72/1273
2023/0125762 A1 4/2023 Prediger et al.
2023/0224916 A1* 7/2023 Cirik ................... H04W 74/08
370/329

OTHER PUBLICATIONS

Moderator (QUALCOMM): "Summary #1 of [106bis-e-NR-feMIMO-02] Email Discussion on Multi-TRP for PDCCH", 3GPP TSG-RAN WG1 Meeting #106-bis-e, R1-2110438, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 12, 2021, 76 Pages, XP052060385, proposal 7, Alt5, paragraph [02.7].

QUALCOMM Incorporated: "Enhancements on Multi-TRP for PDCCH, PUCCH and PUSCH", 3GPP TSG-RAN WG1 Meeting #104-e, R1-2101447, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-28, XP051971612, para [02.1], figure 3 proposal 12 and preceding para, p. 9.

* cited by examiner

DOWNLINK CONTROL CHANNEL REPETITION FOR A DOWNLINK CONTROL CHANNEL ORDER

CROSS REFERENCE

The present application for patent claims the benefit of U.S. Provisional Patent Application No. 63/250,963 by KHOSHNEVISAN et al., entitled "DOWNLINK CONTROL CHANNEL REPETITION FOR A DOWNLINK CONTROL CHANNEL ORDER," filed Sep. 30, 2021, assigned to the assignee hereof, and expressly incorporated by reference herein.

FIELD OF TECHNOLOGY

The following relates to wireless communications, including downlink control channel repetition for a downlink control channel order.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support downlink control channel repetition for a downlink control channel order. Generally, the described techniques provide for a user equipment (UE) to receive a downlink control channel order via two or more downlink control channel candidates that are linked for repetition. The UE may receive an indication that a first downlink control channel candidate and a second downlink control channel candidate are linked for downlink control channel repetition. In some examples, the indication may be received via radio resource control (RRC) signaling. The first and second downlink control channel candidates may be associated with different transmission configuration indicator (TCI) states. The UE may receive a downlink control channel order via at least one of the first and second downlink control channel candidates. The downlink control channel order may be transmitted by a base station and may request the UE to participate in a random access procedure. In some cases, the downlink control channel order may be conveyed in downlink control information (DCI), and the DCI conveying the downlink control channel order may indicate which TCI state for the UE to use for the random access channel (RACH) procedure associated with the downlink control channel order. For example, bits in the DCI conveying the downlink control channel order may indicate whether to use the TCI state associated with the downlink control channel candidate having a lower or higher control resource set (CORESET) identifier (ID), search space ID, or TCI state ID. In some examples, the indication in the DCI may be based on the timing of the downlink control channel candidates, for example, which downlink control channel candidate was received earlier.

In some cases, the UE may select a TCI state to use for the random access procedure associated with the downlink control channel order and the UE may transmit a physical RACH (PRACH) in a PRACH occasion that is associated with a synchronization signal block (SSB) index that is quasi-colocated with the TCI state associated with one of the downlink control channel candidates. The base station may transmit, and the UE may receive, a downlink random access message using the TCI state selected by the UE. In some examples, the UE may select the TCI state to use based on the signal quality of the downlink control channel candidates such as by measuring the signal quality of demodulation reference signals (DMRS) or received coded bits associated with the downlink control channel candidates.

A method for wireless communications at a UE is described. The method may include receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure, and performing the random access procedure using the indicated one of the first TCI state or the second TCI state.

An apparatus for wireless communications at a UE is described. The apparatus may include a processor, memory coupled with the processor, and instructions stored in the memory. The instructions may be executable by the processor to cause the apparatus to receive a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, receive, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure, and perform the random access procedure using the indicated one of the first TCI state or the second TCI state.

Another apparatus for wireless communications at a UE is described. The apparatus may include means for receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, means for receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure, and means for performing the random access procedure using the indicated one of the first TCI state or the second TCI state.

A non-transitory computer-readable medium storing code for wireless communications at a UE is described. The code may include instructions executable by a processor to receive a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, receive, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure, and perform the random access procedure using the indicated one of the first TCI state or the second TCI state.

In some examples of the method, apparatuses, and non-transitory computer-readable medium described herein, receiving the downlink control channel order may include operations, features, means, or instructions for receiving an indication that the first TCI state may be associated with the random access procedure, where the first TCI state may be associated with a first CORESET ID and the second TCI state may be associated with a second CORESET ID that may be lower than the first CORESET ID.

In some examples of the method, apparatuses, and non-transitory computer-readable medium described herein, receiving the downlink control channel order may include operations, features, means, or instructions for receiving an indication that the first TCI state may be associated with the random access procedure, where the first TCI state may be associated with a first search space ID and the second TCI state may be associated with a second search space ID that may be lower than the first search space ID.

In some examples of the method, apparatuses, and non-transitory computer-readable medium described herein, receiving the downlink control channel order may include operations, features, means, or instructions for receiving an indication that the first TCI state may be associated with the random access procedure, where the first TCI state may be associated with a first TCI state ID and the second TCI state may be associated with a second TCI state ID that may be lower than the first TCI state ID.

In some examples of the method, apparatuses, and non-transitory computer-readable medium described herein, receiving the downlink control channel order may include operations, features, means, or instructions for receiving an indication that the first TCI state may be associated with the random access procedure, where the first TCI state may be associated with a first CORESET ID and the second TCI state may be associated with a second CORESET ID that may be higher than the first CORESET ID.

In some examples of the method, apparatuses, and non-transitory computer-readable medium described herein, receiving the downlink control channel order may include operations, features, means, or instructions for receiving an indication that the first TCI state may be associated with the random access procedure, first search space ID and the second TCI state may be associated with a second search space ID that may be higher than the first search space ID.

In some examples of the method, apparatuses, and non-transitory computer-readable medium described herein, receiving the downlink control channel order may include operations, features, means, or instructions for receiving an indication that the first TCI state may be associated with the random access procedure, where the first TCI state may be associated with a first TCI state ID and the second TCI state may be associated with a second TCI state ID that may be higher than the first TCI state ID.

In some examples of the method, apparatuses, and non-transitory computer-readable medium described herein, the indicated one of the first TCI state or the second TCI state used for the random access procedure may be based on a relative timing of the first downlink control channel candidate and the second downlink control channel candidate.

In some examples of the method, apparatuses, and non-transitory computer-readable medium described herein, performing the random access procedure may include operations, features, means, or instructions for transmitting an uplink random access message responsive to the downlink control channel order and receiving, using the indicated one of the first TCI state or the second TCI state, a downlink random access message responsive to the uplink random access message.

In some examples of the method, apparatuses, and non-transitory computer-readable medium described herein, receiving the downlink random access message may include operations, features, means, or instructions for receiving DCI that schedules a random access response message and receiving the random access response message via a physical downlink shared channel.

In some examples of the method, apparatuses, and non-transitory computer-readable medium described herein, performing the random access procedure may include operations, features, means, or instructions for receiving the downlink random access message responsive to the uplink random access message using a same beam that was used to receive the one of the first downlink control channel candidate or the second downlink control channel candidate that may be associated with the indicated one of the first TCI state or the second TCI state.

In some examples of the method, apparatuses, and non-transitory computer-readable medium described herein, the downlink control channel order requests a contention-free random access procedure on a primary cell or a primary-secondary cell.

In some examples of the method, apparatuses, and non-transitory computer-readable medium described herein, receiving the downlink control channel order may include operations, features, means, or instructions for receiving the downlink control channel order via DCI, where the DCI indicates the one of the first TCI state or the second TCI state to use for the random access procedure.

A method for wireless communications at a UE is described. The method may include receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, receiving, via at least one of the first downlink control channel candidate or the second downlink control channel candidate, a downlink control channel order requesting the UE to participate in a random access procedure, and transmitting a PRACH of the random access procedure associated with the downlink control channel order using one of the first TCI state or the second TCI state.

An apparatus for wireless communications at a UE is described. The apparatus may include a processor, memory coupled with the processor, and instructions stored in the memory. The instructions may be executable by the processor to cause the apparatus to receive an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, receive, via at least one of the first downlink control channel candidate or the second downlink control channel candidate, a downlink control channel order requesting the UE to participate in a random access procedure, and transmit a PRACH of the random access procedure associated with the downlink control channel order using one of the first TCI state or the second TCI state.

Another apparatus for wireless communications at a UE is described. The apparatus may include means for receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, means for receiving, via at least one of the first downlink control channel candidate or the second downlink control channel candidate, a downlink control channel order requesting the UE to participate in a random access procedure, and means for transmitting a PRACH of the random access procedure associated with the downlink control channel order using one of the first TCI state or the second TCI state.

A non-transitory computer-readable medium storing code for wireless communications at a UE is described. The code may include instructions executable by a processor to receive an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, receive, via at least one of the first downlink control channel candidate or the second downlink control channel candidate, a downlink control channel order requesting the UE to participate in a random access procedure, and transmit a PRACH of the random access procedure associated with the downlink control channel order using one of the first TCI state or the second TCI state.

Some examples of the method, apparatuses, and non-transitory computer-readable medium described herein may further include operations, features, means, or instructions for measuring a first channel quality of the first downlink control channel candidate and a second channel quality of the second downlink control channel candidate and selecting one of the first TCI state or the second TCI state for transmitting the PRACH based on the measured first channel quality of the first downlink control channel candidate and the measured second channel quality of the second downlink control channel candidate.

In some examples of the method, apparatuses, and non-transitory computer-readable medium described herein, the transmitting the PRACH includes transmitting the PRACH using the selected one of the of the first TCI state or the second TCI state.

Some examples of the method, apparatuses, and non-transitory computer-readable medium described herein may further include operations, features, means, or instructions for receiving a first DMRS associated with the first downlink control channel candidate, where the first channel quality of the first downlink control channel candidate may be measured based on the first DMRS and receiving a second DMRS associated with the second downlink control channel candidate, where the second channel quality of the second downlink control channel candidate may be measured based on the second DMRS.

In some examples of the method, apparatuses, and non-transitory computer-readable medium described herein, measuring the first channel quality of the first downlink control channel candidate and the second channel quality of the second downlink control channel candidate may include operations, features, means, or instructions for measuring a first signal to interference and noise ratio (SINR) associated with the first DMRS and a second SINR associated with the second DMRS.

In some examples of the method, apparatuses, and non-transitory computer-readable medium described herein, measuring the first channel quality of the first downlink control channel candidate and the second channel quality of the second downlink control channel candidate may include operations, features, means, or instructions for measuring a first reference signal received power (RSRP) associated with the first DMRS and a second RSRP associated with the second DMRS.

Some examples of the method, apparatuses, and non-transitory computer-readable medium described herein may further include operations, features, means, or instructions for receiving a first set of coded bits via the first downlink control channel candidate, where the first channel quality of the first downlink control channel candidate may be measured based on the first set of coded bits and receiving a second set of coded bits via the second downlink control channel candidate, where the second channel quality of the second downlink control channel candidate may be measured based on the second set of coded bits.

In some examples of the method, apparatuses, and non-transitory computer-readable medium described herein, measuring the first channel quality of the first downlink control channel candidate and the second channel quality of the second downlink control channel candidate may include operations, features, means, or instructions for measuring a first log likelihood ratio associated with the first set of coded bits and a second log likelihood ratio associated with the second set of coded bits.

Some examples of the method, apparatuses, and non-transitory computer-readable medium described herein may further include operations, features, means, or instructions for applying, in a reception of a downlink random access message responsive to the PRACH, a quasi-colocation assumption, where the quasi-colocation assumption may be associated with one of the first TCI state or the second TCI state.

In some examples of the method, apparatuses, and non-transitory computer-readable medium described herein, the reception of the downlink random access message may include operations, features, means, or instructions for receiving DCI that schedules a random access response message and receiving the random access response message via a physical downlink shared channel.

In some examples of the method, apparatuses, and non-transitory computer-readable medium described herein, the quasi-colocation assumption may be associated with a SSB that may be associated with the PRACH.

In some examples of the method, apparatuses, and non-transitory computer-readable medium described herein, transmitting the PRACH may include operations, features, means, or instructions for transmitting the PRACH in one of a first PRACH occasion associated with the first TCI state, or a second PRACH occasion associated with the second TCI state, where the first PRACH occasion may be associated with a first SSB and the second PRACH occasion may be associated with a second SSB.

In some examples of the method, apparatuses, and non-transitory computer-readable medium described herein, the downlink control channel order requests a contention-free random access procedure on a primary cell or a primary-secondary cell.

A method is described. The method may include transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state and transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure.

An apparatus is described. The apparatus may include a processor, memory coupled with the processor, and instructions stored in the memory. The instructions may be executable by the processor to cause the apparatus to transmit, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state and transmit, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure.

Another apparatus is described. The apparatus may include means for transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state and means for transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure.

A non-transitory computer-readable medium storing code is described. The code may include instructions executable by a processor to transmit, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state and transmit, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure.

Some examples of the method, apparatuses, and non-transitory computer-readable medium described herein may further include operations, features, means, or instructions for performing the random access procedure using the indicated one of the first TCI state or the second TCI state.

In some examples of the method, apparatuses, and non-transitory computer-readable medium described herein, performing the random access procedure may include operations, features, means, or instructions for receiving, from the UE, an uplink random access message responsive to the downlink control channel order and transmitting, to the UE, using the indicated one of the first TCI state or the second TCI state, a downlink random access message responsive to the uplink random access message.

In some examples of the method, apparatuses, and non-transitory computer-readable medium described herein, performing the random access procedure may include operations, features, means, or instructions for transmitting the downlink random access message responsive to the uplink random access message using a same beam that was used to transmit the one of the first downlink control channel candidate or the second downlink control channel candidate that may be associated with the indicated one of the first TCI state or the second TCI state.

In some examples of the method, apparatuses, and non-transitory computer-readable medium described herein, transmitting the downlink control channel order may include operations, features, means, or instructions for transmitting an indication that the first TCI state may be associated with the random access procedure, where the first TCI state may be associated with a first CORESET ID and the second TCI state may be associated with a second CORESET ID that may be lower than the first CORESET ID.

In some examples of the method, apparatuses, and non-transitory computer-readable medium described herein, transmitting the downlink control channel order may include operations, features, means, or instructions for transmitting an indication that the first TCI state may be associated with the random access procedure, where the first TCI state may be associated with a first search space ID and the second TCI state may be associated with a second search space ID that may be lower than the first search space ID.

In some examples of the method, apparatuses, and non-transitory computer-readable medium described herein, transmitting the downlink control channel order may include operations, features, means, or instructions for transmitting an indication that the first TCI state may be associated with the random access procedure, where the first TCI state may be associated with a first TCI state ID and the second TCI state may be associated with a second TCI state ID that may be lower than the first TCI state ID.

In some examples of the method, apparatuses, and non-transitory computer-readable medium described herein, transmitting the downlink control channel order may include operations, features, means, or instructions for transmitting an indication that the first TCI state may be associated with the random access procedure, where the first TCI state may be associated with a first CORESET ID and the second TCI state may be associated with a second CORESET ID that may be higher than the first CORESET ID.

In some examples of the method, apparatuses, and non-transitory computer-readable medium described herein, transmitting the downlink control channel order may include operations, features, means, or instructions for transmitting an indication that the first TCI state may be associated with the random access procedure, first search space ID and the second TCI state may be associated with a second search space ID that may be higher than the first search space ID.

In some examples of the method, apparatuses, and non-transitory computer-readable medium described herein, transmitting the downlink control channel order may include operations, features, means, or instructions for transmitting an indication that the first TCI state may be associated with the random access procedure, where the first TCI state may be associated with a first TCI state ID and the second TCI state may be associated with a second TCI state ID that may be higher than the first TCI state ID.

In some examples of the method, apparatuses, and non-transitory computer-readable medium described herein, the indicated one of the first TCI state or the second TCI state used for the random access procedure may be based on a relative timing of the first downlink control channel candidate and the second downlink control channel candidate.

In some examples of the method, apparatuses, and non-transitory computer-readable medium described herein, the downlink control channel order requests a contention-free random access procedure on a primary cell or a primary-secondary cell.

In some examples of the method, apparatuses, and non-transitory computer-readable medium described herein, transmitting the downlink control channel order may include operations, features, means, or instructions for transmitting the downlink control channel order via DCI, where the DCI indicates the one of the first TCI state or the second TCI state to use for the random access procedure.

A method for wireless communications at a base station is described. The method may include transmitting, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, transmitting, to the UE, via at least one of the first downlink control channel candidate or the second downlink control channel candidate, a downlink control channel order requesting the UE to participate in a random access procedure, and receiving, from the UE, a PRACH of the random access procedure associated with the downlink control channel order using one of the first TCI state or the second TCI state.

An apparatus for wireless communications at a base station is described. The apparatus may include a processor, memory coupled with the processor, and instructions stored in the memory. The instructions may be executable by the processor to cause the apparatus to transmit, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, transmit, to the UE, via at least one of the first downlink control channel candidate or the second downlink control channel candidate, a downlink control channel order requesting the UE to participate in a random access procedure, and receive, from the UE, a PRACH of the random access procedure associated with the downlink control channel order using one of the first TCI state or the second TCI state.

Another apparatus for wireless communications at a base station is described. The apparatus may include means for transmitting, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, means for transmitting, to the UE, via at least one of the first downlink control channel candidate or the second downlink control channel candidate, a downlink control channel order requesting the UE to participate in a random access procedure, and means for receiving, from the UE, a PRACH of the random access procedure associated with the downlink control channel order using one of the first TCI state or the second TCI state.

A non-transitory computer-readable medium storing code for wireless communications at a base station is described. The code may include instructions executable by a processor to transmit, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state, transmit, to the UE, via at least one of the first downlink control channel candidate or the second downlink control channel candidate, a downlink control channel order requesting the UE to participate in a random access procedure, and receive, from the UE, a PRACH of the random access procedure associated with the downlink control channel order using one of the first TCI state or the second TCI state.

Some examples of the method, apparatuses, and non-transitory computer-readable medium described herein may further include operations, features, means, or instructions for transmitting, to the UE, a first DMRS associated with the first downlink control channel candidate and transmitting, to the UE, a second DMRS associated with the second downlink control channel candidate.

Some examples of the method, apparatuses, and non-transitory computer-readable medium described herein may further include operations, features, means, or instructions for applying, in a transmission of a downlink random access message responsive to the PRACH, a quasi-colocation assumption, where the quasi-colocation assumption may be associated with one of the first TCI state or the second TCI state.

In some examples of the method, apparatuses, and non-transitory computer-readable medium described herein, the quasi-colocation assumption may be associated with a SSB that may be associated with the PRACH.

In some examples of the method, apparatuses, and non-transitory computer-readable medium described herein, receiving the PRACH may include operations, features, means, or instructions for receiving the PRACH in one of a first PRACH occasion associated with the first TCI state, or a second PRACH occasion associated with the second TCI state, where the first PRACH occasion may be associated with a first SSB and the second PRACH occasion may be associated with a second SSB.

In some examples of the method, apparatuses, and non-transitory computer-readable medium described herein, the downlink control channel order requests a contention-free random access procedure on a primary cell or a primary-secondary cell.

DETAILED DESCRIPTION

Figure 1:
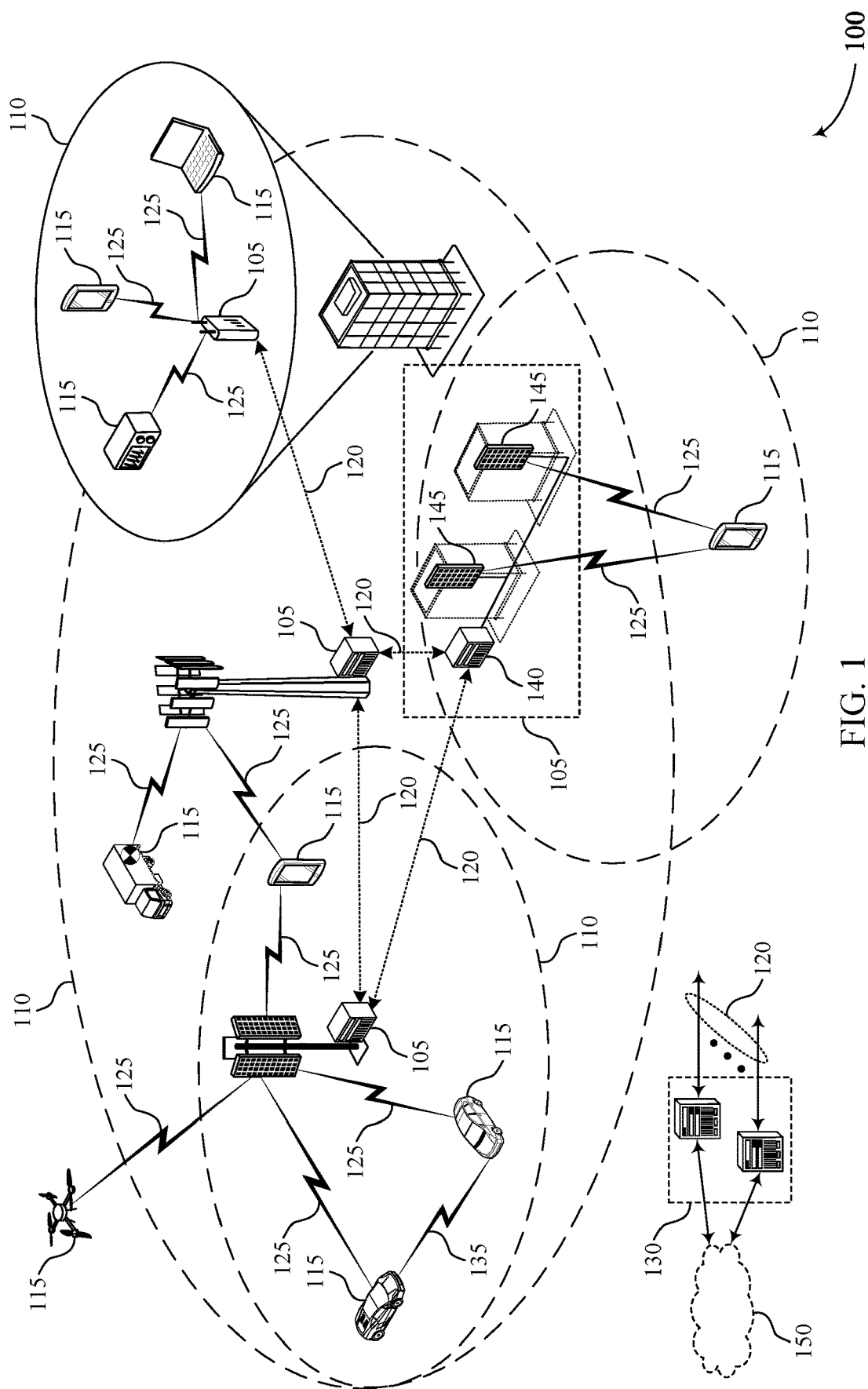
FIG. 1 illustrates an example of a wireless communications system that supports downlink control channel repetition for a downlink control channel order in accordance with aspects of the present disclosure.

In some wireless communications systems, a user equipment (UE) may be configured with one or more control resource sets (CORESETs). Each CORESET may include time and frequency resources within a bandwidth part (BWP) of a serving cell that are allocated for carrying a control channel such as a physical downlink control channel (PDCCH). A CORESET may include one or more search space sets that each include one or more PDCCH candidates. Two or more PDCCH candidates may be linked for repetition of control information to improve decoding performance at the UE. The UE may be configured to monitor each PDCCH candidate for downlink control information (DCI). In some examples, a base station may transmit a PDCCH order requesting a UE to participate in a random access procedure via one or more PDCCH candidates that are linked for PDCCH repetition. In some cases, however, the two or more PDCCH candidates may be associated with different transmission configuration indicator (TCI) states and the UE may be unable to determine which TCI state to use for the random access procedure.

In some examples, the PDCCH order may indicate, in DCI conveying the PDCCH order, which TCI state or which quasi-colocation (QCL) assumption for the UE to use for the random access channel (RACH) procedure (e.g., which TCI state to use for the downlink random access message of the random access procedure). DCI conveying the PDCCH order may include multiple reserved bits that may be used to indicate the TCI state to use for the random access procedure. For example, bits in the DCI conveying the PDCCH order may indicate whether to use the TCI state associated with the PDCCH candidate having a lower or higher CORESET identifier (ID), search space ID, or TCI state ID. For example, a bit 0 may indicate to use the TCI state associated with the PDCCH candidate having a lower CORESET ID, search space ID, or TCI state ID, and a bit 1 may indicate to use the TCI state associated with the PDCCH candidate having a higher CORESET ID, search space ID, or TCI state ID. Other examples may be based on the timing of the PDCCH candidates, e.g., which PDCCH candidate was received earlier. The UE may perform the random access procedure based on the indicated TCI state.

In some examples, the UE may select a TCI state to use for the random access procedure, and the UE may transmit a physical random access channel (PRACH) in a PRACH occasion that is associated with a synchronization signal block (SSB) index that is quasi-colocated with the TCI state associated with one of the PDCCH candidates (e.g., the UE 115 may transmit the PRACH in the same spatial relation as the TCI state associated with one of the PDCCH candidates). In some examples, the UE may select the TCI state to use based on the link or channel quality of the PDCCH candidates, such as by measuring the signal quality of demodulation reference signals (DMRS) associated with the PDCCH candidates. For example, the UE may measure a signal to interference and noise ratio (SINR), signal to noise ratio (SNR), or reference signal received power (RSRP) associated with DMRSs associated with the PDCCH candidates. In other cases, the UE may select the TCI state based on measuring the signal quality of received coded bits in the PDCCH candidates such as based on the log likelihood ratio (LLR) associated with received coded bits in the PDCCH candidates. The base station may transmit, and the UE may receive, a downlink random access message using the TCI state selected by the UE.

Aspects of the disclosure are initially described in the context of wireless communications systems. Additional aspects of the disclosure are described with reference to search space set configurations, random access timelines, and process flows. Aspects of the disclosure are further illustrated by and described with reference to apparatus diagrams, system diagrams, and flowcharts that relate to Downlink control channel repetition for a downlink control channel order.

FIG. 1 illustrates an example of a wireless communications system 100 that supports downlink control channel repetition for a downlink control channel order in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115—are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an ID for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115—associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105—associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is a technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may receive a downlink control channel order via two or more downlink control channel candidates (e.g., PDCCH candidates) that are linked for downlink control channel repetition. The UE 115 may receive an indication that a first downlink control channel candidate and a second downlink control channel candidate are linked for downlink control channel repetition. In some examples, the indication may be received via RRC signaling. The UE 115 may receive a downlink control channel order via at least one of the first and second downlink control channel candidates. The downlink control channel order may be transmitted by a base station 105 and may request the UE 115 to participate in a random access procedure.

In some cases, the downlink control channel order may indicate which TCI state or which QCL assumption for the UE 115 to use for the RACH procedure (e.g., which TCI state to use for the downlink random access message of the random access procedure). For example, DCI conveying the downlink control channel order may include multiple reserved bits that may be used to indicate the TCI state to use for the RACH procedure. For example, bits in the DCI conveying the downlink control channel order may indicate whether to use the TCI state associated with the downlink control channel candidate having a lower or higher CORE-SET ID, search space ID, or TCI state ID. For example, a bit 0 may indicate to use the TCI state associated with the downlink control channel candidate having a lower CORE-SET ID, search space ID, or TCI state ID, and a bit 1 may indicate to use the TCI state associated with the downlink control channel candidate having a higher CORESET ID, search space ID, or TCI state ID. Other examples may be based on the timing of the downlink control channel candidates, e.g., which downlink control channel candidate was received earlier. For example, a bit 0 may indicate to use the TCI state associated with the downlink control channel candidate that was received earlier, and a bit 1 may indicate to use the TCI state associated with the downlink control channel candidate that was received later. The UE 115 may perform the random access procedure associated with the downlink control channel order using the indicated TCI state (e.g., the UE 115 may use the indicated TCI state as a basis for a QCL assumption to be applied to receipt of one or more downlink random access messages).

In some examples, the UE 115 may select which TCI state of the different TCI states associated with the downlink control channel candidates to use for the random access procedure, and the UE 115 may transmit a PRACH in a PRACH occasion that is associated with an SSB that is quasi-colocated with the selected TCI state (e.g., the UE 115 may transmit the PRACH in the same spatial relation as the TCI state associated with one of the PDCCH candidates). In some examples, the UE 115 may select the TCI state to use based on the link or channel quality of the downlink control channel candidates, such as by measuring the signal quality of DMRSs associated with the downlink control channel candidates. For example, the UE 115 may measure an SINR, SNR, or RSRP associated with DMRSs associated with the downlink control channel candidates. In some cases, the UE 115 may select the TCI state based on measuring the signal quality of received coded bits in the downlink control channel candidates, such as based on the LLR associated with received coded bits in the downlink control channel candidates. The base station 105 may transmit, and the UE 115 may receive, a downlink random access message using the TCI state selected by the UE 115 (e.g., the indicated TCI state may be used as a basis for a QCL assumption to be applied to transmission and receipt of one or more downlink random access messages).

Figure 2:
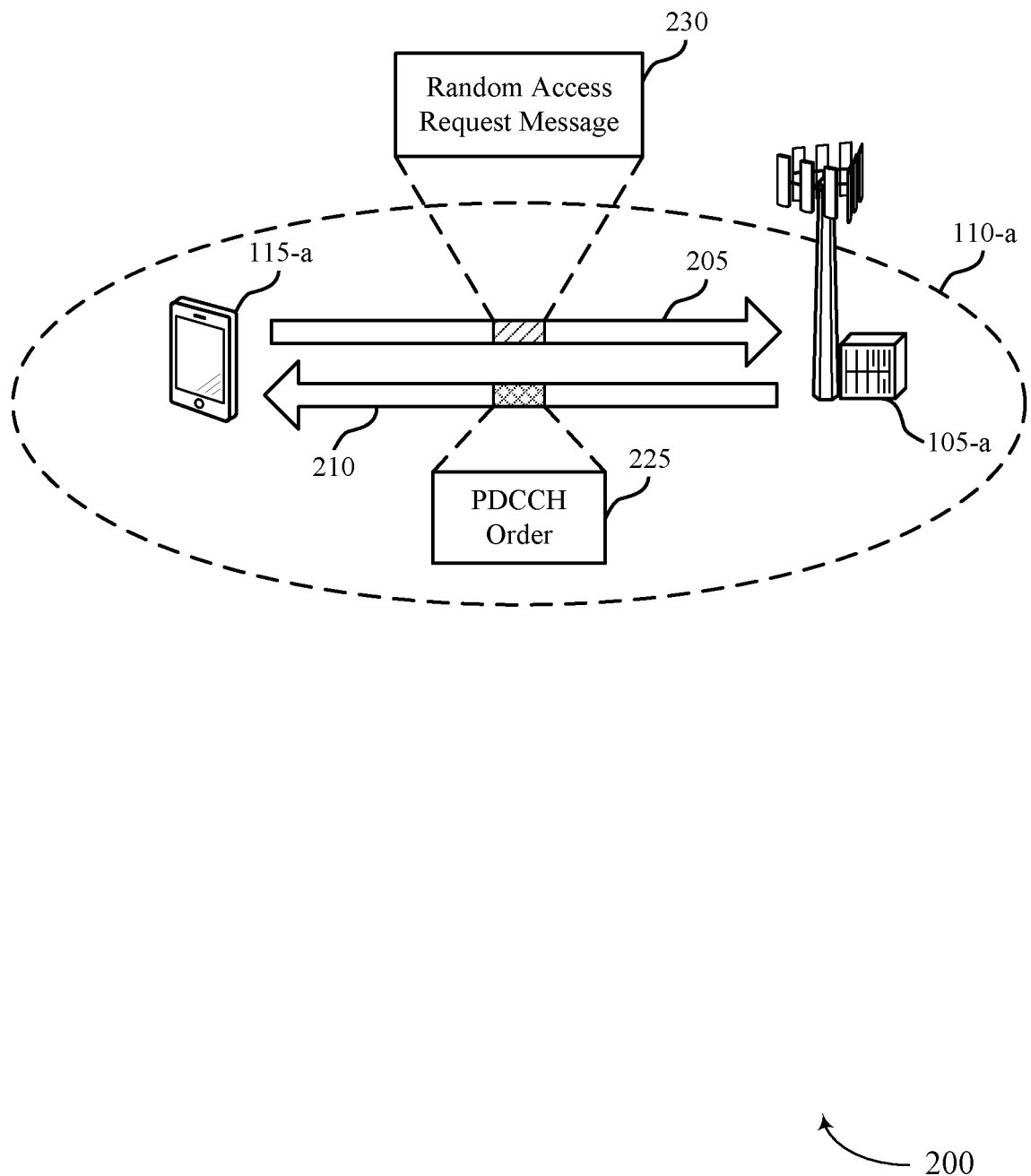
FIG. 2 illustrates an example of a wireless communications system that supports downlink control channel repetition for a downlink control channel order in accordance with aspects of the present disclosure.

FIG. 2 illustrates an example of a wireless communications system 200 that supports downlink control channel repetition for a downlink control channel order in accordance with aspects of the present disclosure. In some examples, the wireless communications system 200 may implement some aspects of the wireless communications system 100. For example, the wireless communications system 200 may include a base station 105-*a* and a UE 115-*a*, which may represent examples of a base station 105 and a UE 115 as described herein. The base station 105-*a* and the UE 115-*a* may communicate within a geographic coverage area 110-*a* via an uplink communication link 205 and a downlink communication link 210 (e.g., Uu links). In some examples, the base station 105-*a* may transmit, to the UE 115-*a*, via one or more PDCCH candidates that are linked for PDCCH repetition, a PDCCH order 225 requesting the UE 115-*a* to participate in a random access procedure.

The UE 115-*a* and the base station 105-*b* may perform a random access procedure to synchronize the uplink communication link 205, the downlink communication link 210, or both. In some cases, the UE 115-*a* may transmit a random access request message 230 (e.g., Msg 1) to initiate the random access procedure. The random access request message 230 may be transmitted via a PRACH during a PRACH occasion. The random access procedure may correspond to contention-based random access (CBRA) or contention-free random access (CFRA). During a CBRA procedure, the UE 115-*a* may randomly select a preamble and PRACH occasion for transmitting the random access request message 230 (e.g., based on a received SSB). During a CFRA procedure, the UE 115-*a* may receive a random access preamble or PRACH occasion assignment from the base station 105-*a*, and the UE 115-*a* may transmit the random access request message 230 using the assigned preamble and during the assigned PRACH occasion.

In some examples, the base station 105-*a* may transmit a PDCCH order 225 to the UE 115-*a* to request the UE 115-*a* to participate in the random access procedure. The UE 115-*a* may transmit the random access request message 230 in response to the PDCCH order 225. The UE 115-*a* may receive the PDCCH order 225 via DCI (e.g., DCI format 1_0) with a CRC scrambled by a control radio network temporary ID (C-RNTI). If each bit in a frequency domain resource allocation (FDRA) field of the DCI is set high (e.g., to '1'), the UE 115-*a* may determine the DCI corresponds to the PDCCH order 225.

The PDCCH order 225 may indicate one or more parameters associated with the random access procedure. For example, the PDCCH order 225 may include a random access preamble index (e.g., a six bit field) indicating a type of random access procedure. If the random access preamble index is zero, the PDCCH order may trigger CBRA, and the UE 115-*a* may ignore the remaining fields in the PDCCH order 225. During CBRA, the UE 115-*a* may measure one or more SSBs received from the base station 105-*a* and determine a PRACH occasion for transmitting the random access request message 230 based on a measurement of the one or more SSBs. If the random access preamble is not zero, the PDCCH order may trigger CFRA. If CFRA is triggered, the UE 115-*a* may decode one or more remaining fields to identify a PRACH occasion and other parameters associated with the random access procedure.

The one or more remaining fields may include an uplink or supplementary uplink (SUL) indication field, an SSB index field, a PRACH mask index field, one or more other reserved fields, or any combination thereof. The uplink or SUL indication field may include a bit to indicate whether the UE 115-*a* may transmit the random access request message 230 via an uplink or a SUL. The SSB index field may include a quantity of bits (e.g., six bits) to indicate an SSB index associated with the CFRA. The PRACH mask filed may include a quantity of bits (e.g., four bits) indicating a PRACH mask index associated with the CFRA. The UE 115-*a* may determine a PRACH occasion for transmitting the random access request message 230 based on the SSB index and the PRACH mask index. One or more remaining bits in the DCI conveying the PDCCH order 225 may be reserved for other parameters or applications.

The PRACH occasion indicated by the PDCCH order 225 (e.g., for CFRA) or associated with a measured SSB (e.g., for CBRA) may occur after a threshold delay period. The threshold delay period may begin after a last symbol of the PDCCH order 225. That is, a first symbol of the PRACH occasion may occur at least a threshold delay period after a last symbol of the PDCCH order 225. The threshold delay period may account for physical uplink shared channel (PUSCH) preparation in accordance with a capability of the UE, random access preparation, BWP switching, uplink switching, or any combination thereof.

The base station 105-*a* may receive the random access request message 230 during the PRACH occasion, and the base station 105-*a* may transmit one or more other random access messages as part of the random access procedure. For example, the base station 105-*a* may transmit a control message (e.g., DCI) via a PDCCH, a downlink random access response (RAR) message via a physical downlink shared channel (PDSCH), or both. In some cases, the UE 115-*a* may identify a QCL assumption to be applied to receipt of the control message, the downlink RAR message, or both, based on a TCI state associated with the PDCCH order 225 (e.g., a beam used for reception of the PDCCH order 225). For example, the UE 115-*a* may use the TCI state associated with the PDCCH order 225 as a basis for the QCL assumption to be applied to receipt of the one or more downlink random access messages (e.g., the UE 115-*a* may assume that the downlink random access messages are quasi-collocated with the PDCCH order 225).

The UE 115-*a* may be configured with one or more CORESETs (e.g., three, four, five, or some other quantity of CORESETs in a BWP of a serving cell) for monitoring a PDCCH for the PDCCH order 225 (e.g., or for other downlink control messages). A quantity of time and frequency resources (e.g., resource blocks in a frequency domain and OFDM symbols in a time domain) within each CORESET and an active TCI state associated with each CORESET may be RRC configured. Each CORESET may be associated with one active TCI state. Each CORESET may include one or more search space sets (e.g., up to 10 search space sets in a BWP of a component carrier), and each search space set may include one or more PDCCH candidates (e.g., according to a given aggregation level). For example, a PDCCH candidate with a given aggregation level and a given candidate index may be defined in a given search space set. The UE 115-*a* may perform blind decoding of the PDCCH candidates within each search space set to receive DCI. That is, the UE 115-*a* may monitor each PDCCH candidate in a search space set for DCI. The UE 115-*a* may successfully decode one or more of the PDCCH candidates (e.g., a CRC may pass) to obtain the DCI. In some examples, one or more search space sets and corresponding PDCCH candidates may be linked for repetition of DCI, which may be referred to as PDCCH repetition or downlink control channel repetition. Additional aspects of the configurations for search space sets and PDCCH candidates may be further described elsewhere herein, including with reference to FIGS. 3A and 3B.

In some cases, the base station 105-*a* may transmit the PDCCH order 225 via two or more PDCCH candidates that are linked for PDCCH repetition. The UE 115-*a* may receive an indication that the PDCCH candidates are linked, and the UE 115-*a* may receive the PDCCH order 225 accordingly. If the UE 115-*a* receives a PDCCH order 225 via linked PDCCH candidates, the linked PDCCH candidates may correspond to different TCI states, and the UE 115-*a* may not know which TCI state to use as a basis for a QCL assumption to be applied to receipt of downlink random access messages from the base station 105-*a*.

As described herein, the DCI conveying the PDCCH order 225 may include one or more reserved bits. The one or more reserved bits may indicate a TCI state to use as a basis for a QCL assumption to be applied to receipt of one or more downlink random access messages from the base station 105-*a*. For example, bits in the DCI conveying the PDCCH order 225 may indicate whether to use the TCI state associated with the PDCCH candidate having a lower or higher CORESET ID, search space ID, or TCI state ID. For example, a bit 0 may indicate to use the TCI state associated with the PDCCH candidate having a lower CORESET ID, search space ID, or TCI state ID, and a bit 1 may indicate to use the TCI state associated with the PDCCH candidate having a higher CORESET ID, search space ID, or TCI state ID. Other examples may be based on the timing of the PDCCH candidates, e.g., which PDCCH candidate was received earlier or later. For example, a bit 0 may indicate to use the TCI state associated with the PDCCH candidate that was received earlier, and a bit 1 may indicate to use the TCI state associated with the PDCCH candidate that was received later. The UE 115-*a* may use the indicated TCI state as a basis for a QCL assumption to be applied to receipt of downlink random access messages from the base station 105-*a*.

If the PDCCH order 225 triggers a CBRA procedure, the UE 115-*a* may ignore the indication of the TCI state. The UE 115-*a* may instead determine the QCL assumption based on a measured SSB associated with the CBRA. That is, the indication in the PDCCH order of the TCI state to use for the random access procedure may apply to CFRA procedures, but may not be applicable for CBRA procedures. Additionally, or alternatively, the indication in the PDCCH order of the TCI state to use for the random access procedure may not apply to CFRA procedures performed on a secondary cell (SCell) (e.g., for SCell, a PDCCH order may be received on the SCell, while a PDCCH order that includes a DCI format 1_0 may be received on a primary cell (PCell) or primary-SCell (PSCell), and therefore a QCL dependency based on the PDCCH candidate may not be applicable).

In some examples, the UE 115-*a* may select a TCI state to use for the random access procedure (e.g., which TCI state to use as a basis for a QCL assumption to be applied to receipt of downlink random access messages from the base station 105-*a*) and the UE 115-*a* may transmit a PRACH in a PRACH occasion that is associated with an SSB index that is quasi-colocated with the TCI state associated with one of the PDCCH candidates (e.g., the UE 115-*a* may transmit the PRACH in the same spatial relation as the TCI state associated with one of the PDCCH candidates). In some examples, the UE 115-*a* may select the TCI state to use based on the channel quality of the PDCCH candidates, such as by measuring the signal quality of DMRSs associated with the PDCCH candidates. For example, the UE 115-*a* may measure an SINR, SNR, or RSRP associated with DMRSs associated with the PDCCH candidates. In other cases, the UE 115-*a* may select the TCI state based on measuring the signal quality of received coded bits in the PDCCH candidates such as based on the LLR associated with received coded bits in the PDCCH candidates. Accordingly, the UE 115-*a* may select the TCI state associated with the downlink control channel that the UE 115-*a* determined has a better link or channel quality. The base station 105-*a* may transmit, and the UE 115-*a* may receive, a downlink random access message from the base station 105-*a* using the TCI state selected by the UE 115-*a*.

If the PDCCH order 225 triggers a CBRA procedure, the UE 115-*a* may not select the TCI state for use in the requested random access procedure, for example, based on the signal quality of the PDCCH candidates. The UE 115-*a* may instead determine the QCL assumption based on a measured SSB associated with the CBRA. That is, the UE 115-*a* may select the TCI state for use in the requested CFRA procedures, but may not select the TCI state for use in CBRA procedures. Additionally or alternatively may not select the TCI state for use in CFRA procedures performed on a SCell (e.g., for SCell, a PDCCH order may be received on the SCell, while a PDCCH order that includes a DCI format 1_0 may be received on a PCell or PSCell, and therefore a QCL dependency based on the PDCCH candidate may not be applicable).

Figure 3A:
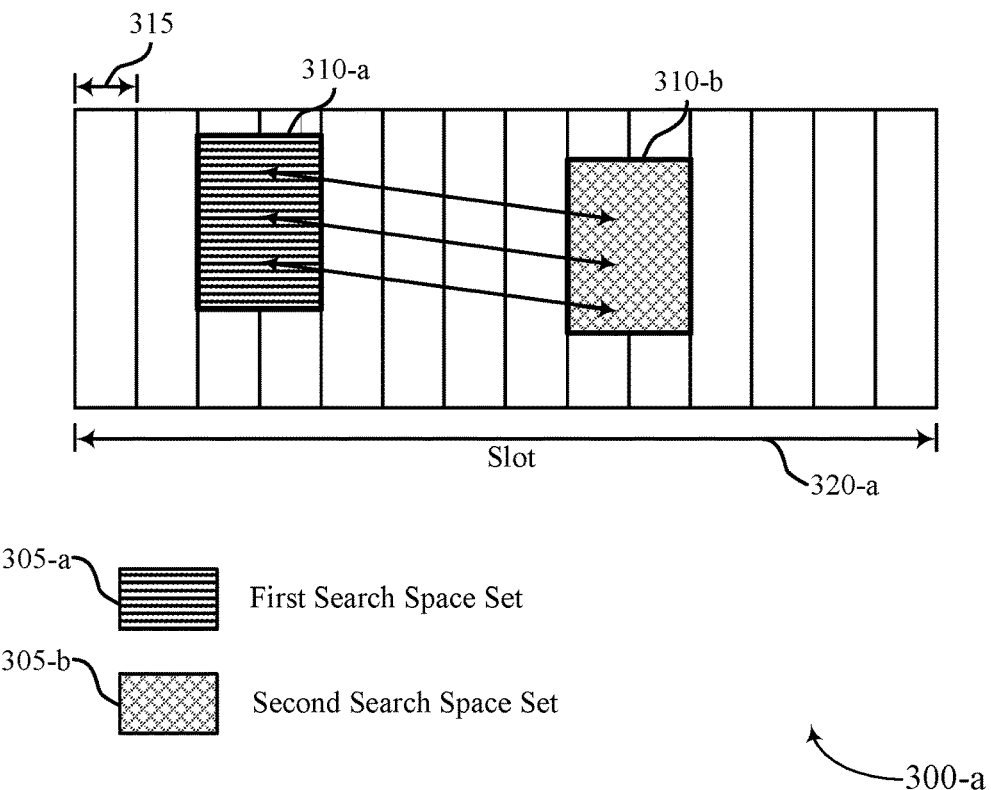
FIGS. 3A and 3B illustrate examples of search space set configurations supports downlink control channel repetition for a downlink control channel order in accordance with aspects of the present disclosure.
Figure 3B:
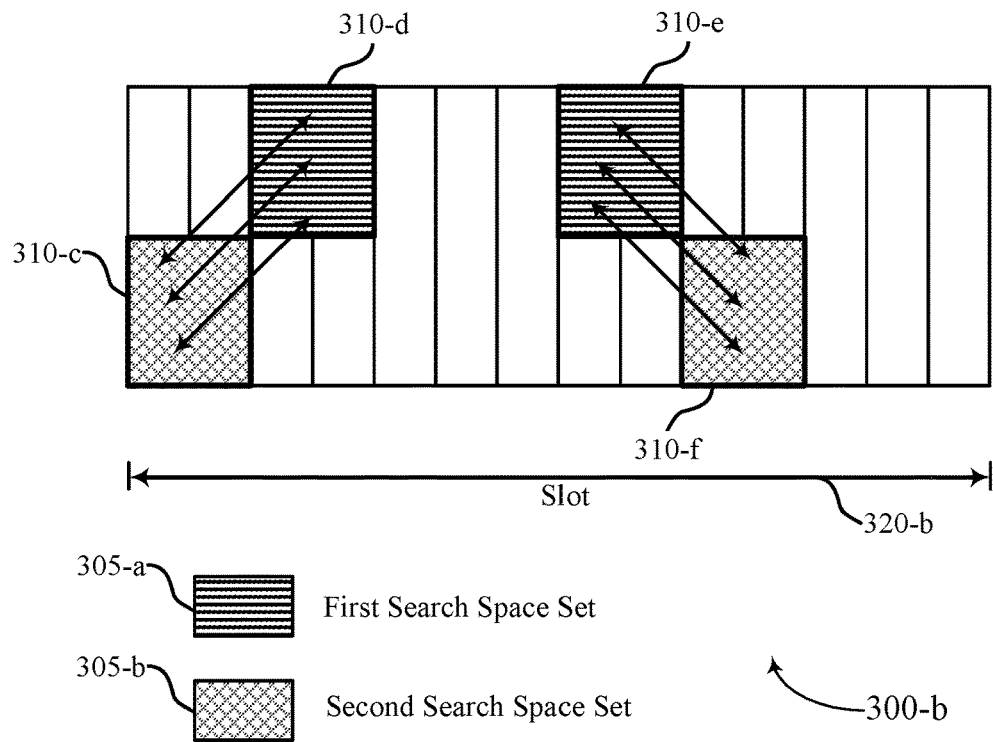

FIGS. 3A and 3B illustrate examples of search space set configurations 300-*a* and 300-*b* that support downlink control channel repetition for a downlink control channel order in accordance with aspects of the present disclosure. The search space set configurations 300-*a* and 300-*b* may implement or be implemented by some aspects of the wireless communications systems 100 or 200. For example, the search space set configurations 300-*a* and 300-*b* may illustrate example configurations for a UE 115, which may represent an example of a UE 115 as described herein.

A UE 115 may be configured to monitor one or more (e.g., up to five) CORESETs in a BWP of a component carrier (CC). As described with reference to FIG. 2, a CORESET may include a quantity (e.g., up to 10 search space sets 305 in a BWP of a CC) search space sets 305. As such, each search space set 305 may correspond to a single CORESET (e.g., and a single corresponding TCI state). The search space sets 305 may be RRC configured, and may include sets of time and frequency resources across one or more symbols 315 (e.g., OFDM symbols 315) within one or more slots 320 in a time domain and one or more subchannels in a frequency domain. The RRC configuration for each search space set 305 may indicate the associated CORESET, monitoring occasions 310 within the search space set 305, a type of the search space set 305 (e.g., a common search space (CSS) or a UE-specific search space (USS)), one or more DCI formats for the UE 115 to monitor within the search space set 305, a quantity of PDCCH candidates within the search space set 305 for each aggregation level, or any combination thereof. The resources in a search space set 305 may be contiguous or non-contiguous in time and frequency. For example, the monitoring occasions 310 within a search space set may be distributed across one or more symbols 315, slots 320, subchannels, or any combination thereof.

The monitoring occasions 310 within a search space set 305 may be configured according to a monitoring slot periodicity, offset, and symbols 315 within a slot 320. That is, the UE 115 may identify a location of each monitoring occasion 310 within a search space set 305 based on the RRC configuration for the search space set 305. Each monitoring occasion 310 may include one or more PDCCH candidates, which may include time and frequency resources for reception of DCI. Each PDCCH candidate may correspond to an aggregation level and may be configured with a candidate index in each search space set 305. As described with reference to FIG. 2, the UE 115 may perform blind decoding of each monitoring occasion 310 and corresponding PDCCH candidate to receive DCI.

In some examples, two or more search space sets 305 may be linked for PDCCH repetition. A UE 115 may receive an indication of the linked search space sets via an RRC configuration. The UE 115 may identify linked monitoring occasions 310 within the search space sets 305 and linked PDCCH candidates within the monitoring occasions 310 according to one or more rules indicated in the RRC configuration. FIGS. 3A and 3B illustrate example search space set configurations 300-*a* and 300-*b* for linked search space sets 305 including linked PDCCH candidates.

FIG. 3A illustrates an example search space set configuration 300-*a* for a first search space set 305-*a* and a second search space set 305-*b*. The search space set configuration 300-*a* may illustrate a configured monitoring occasion 310-*a* of the first search space set and a configured monitoring occasion 310-*b* of the second search space set within a slot 320-*a*. The monitoring occasions 310-*a* and 310-*b* may include a subset of the time and frequency resources within the respective first and second search space sets 305-*a* and 305-*b*.

A UE 115 may receive an indication (e.g., via RRC signaling) that the first search space set 305-*a* and the second search space set 305-*b* are linked for PDCCH repetition. The UE 115 may determine that the monitoring occasion 310-*a* and the monitoring occasion 310-*b* are linked for PDCCH repetition based on one or more rules. For example, the rules may indicate a one-to-one mapping between monitoring occasions 310 of different search space sets 305. For example, PDCCH candidates having the same aggregation level and the same candidate index in two linked search space sets (e.g., 305-*a* and 305-*b*) may be linked. The two linked search space sets 305-*a* and 305-*b* may be configured with the same number of PDCCH candidates for each aggregation level.

The UE 115 may determine one or more pairs of linked PDCCH candidates within the linked monitoring occasions 310-*a* and 310-*b* according to an aggregation level and a candidate index of the respective PDCCH candidates. For example, each search space set 305 may be configured to include a same quantity of PDCCH candidates for each aggregation level. Accordingly, the UE 115 may identify a first PDCCH candidate in the monitoring occasion 310-*a* that corresponds to a first aggregation level and a second PDCCH candidate in the monitoring occasion 310-*b* that also corresponds to the first aggregation level. The UE 115 may determine that the first and second PDCCH candidates are linked for PDCCH repetition based on the RRC configuration, the one-to-one mapping between the monitoring occasions 310-*a* and 310-*b*, and the first aggregation level. In the example of the search space set configuration 300-*a*, the UE 115 may identify three sets of linked PDCCH candidates between the monitoring occasion 310-*a* of the first search space set 305-*a* and the monitoring occasion 310-*b* of the second search space set 305-*b* (e.g., as indicated by the three arrows between the monitoring occasions 310-*a* and 310-*b*). DCI may be transmitted via one or both PDCCH candidates of each linked PDCCH candidate pair.

FIG. 3B illustrates a second example search space set configuration 300-*b* for the first search space set 305-*a* and the second search space set 305-*b*. In the example of the search space set configuration 300-*b*, the first search space set 305-*a* may include two monitoring occasions 310-*d* and 310-*e* in the slot 320-*b* and the second search space set 305-*b* may include two monitoring occasions 310-*c* and 310-*f* in the same slot 320-*b*.

The UE 115 may receive the indication that the first search space set 305-*a* and the second search space set 305-*b* are linked for PDCCH repetition, as described with reference to FIG. 3A. The UE 115 may identify a one-to-one mapping between monitoring occasions 310-*c* and 310-*d* and between monitoring occasions 310-*e* and 310-*f* within the slot 320-*b*.

The UE 115 may determine one or more pairs of linked PDCCH candidates within each pair of linked monitoring occasions 310 according to an aggregation level and a candidate index of the respective PDCCH candidates, as described with reference to FIG. 3A. For example, the UE 115 may identify three sets of linked PDCCH candidates between the monitoring occasion 310-*d* of the first search space set 305-*a* and the monitoring occasion 310-*c* of the second search space set 305-*b* (e.g., as indicated by the three arrows between the monitoring occasions 310-*c* and 310-*d*). The UE 115 may identify three sets of linked PDCCH candidates between the monitoring occasion 310-*e* of the first search space set 305-*a* and the monitoring occasion 310-*f* of the second search space set 305-*b* (e.g., as indicated by the three arrows between the monitoring occasions 310-*e* and 310-*f*). DCI may be transmitted via one or both PDCCH candidates of each linked PDCCH candidate pair.

The search space set configurations 300-*a* and 300-*b* may thereby illustrate intra-slot PDCCH repetition. In some examples, search space set configurations 300 may be different from the search space set configurations 300-*a* and 300-*b*, such that a first monitoring occasion 310 and corresponding PDCCH candidates in a first slot 320 may be linked to a second monitoring occasion 310 and corresponding PDCCH candidates in a second slot 320 (e.g., inter-slot PDCCH repetition).

A UE 115 configured with either of the search space set configurations 300-*a* and 300-*b* may identify the linked search space sets 305, the linked monitoring occasions 310, and the linked PDCCH candidates before decoding DCI received via the linked PDCCH candidates. The UE 115 may or may not perform soft combining to decode the DCI received via the linked PDCCH candidates. In some examples, a PDCCH order may be transmitted to the UE 115 via linked PDCCH candidates, as described with reference to FIG. 2.

If a PDCCH order is received by the UE 115 via linked PDCCH candidates, the UE 115 may not know which QCL assumption to use for receipt of one or more downlink random access messages.

To reduce the impacts of PDCCH repetition on the random access procedure, in some examples, as described herein, the TCI state to use as a basis for which QCL assumption to use for receipt of downlink random access messages may be indicated in the DCI conveying the PDCCH order, which may improve a reliability of the random access procedure. In some examples, a UE 115 may select a TCI state to use as a basis for a QCL assumption for receipt of one or more downlink random access messages, for example based on the signal quality of the PDCCH candidates associated with the TCI states. The UE 115 may transmit a PRACH in a PRACH occasion that is associated with an SSB index that is quasi-colocated with the TCI state associated with one of the PDCCH candidates. The base station 105 may transmit, and the UE 115 may receive, a one or more downlink random access messages using the TCI state selected by the UE 115. Selection of the TCI state based on a signal quality of the associated PDCCH candidate may improve a reliability of the random access procedure.

Figure 4:
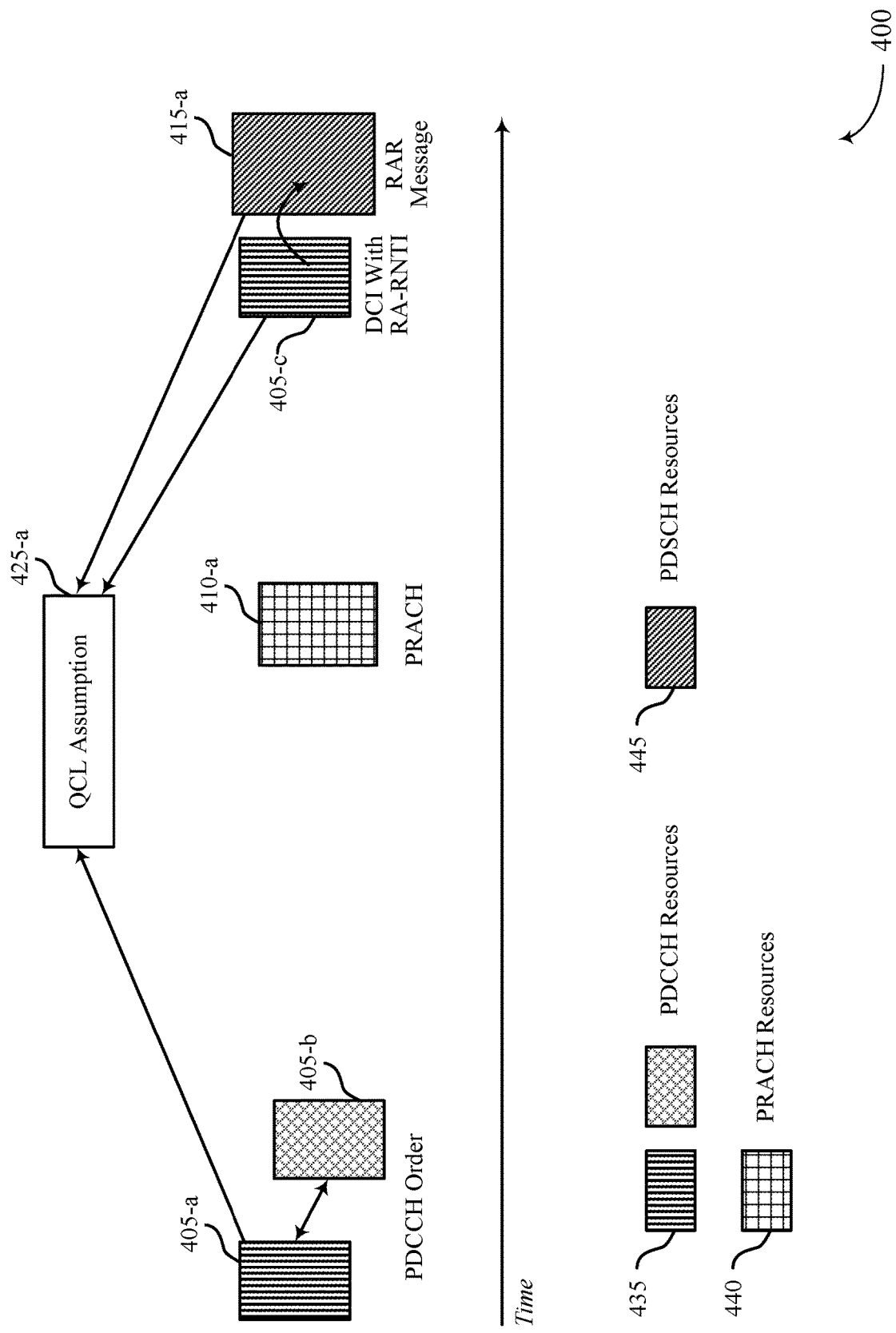
FIG. 4 illustrates an example of a random access timeline that supports downlink control channel repetition for a downlink control channel order in accordance with aspects of the present disclosure.

FIG. 4 illustrates an example of a random access timeline 400 that supports downlink control channel repetition for a downlink control channel order in accordance with aspects of the present disclosure. In the example of the random access timeline 400, the UE 115 may receive, via RRC signaling, an indication that the PDCCH candidates 405-*a* and 405-*b* are linked for PDCCH repetition. For example, the UE 115 may receive RRC signaling indicating two search space sets that are linked for PDCCH repetition. In response to receiving the RRC signaling, the UE 115 may identify linked monitoring occasions within the search space sets and identify the linked PDCCH candidates 405-*a* and 405-*b* within the linked monitoring occasions according to one or more rules indicated via the RRC signaling, as described with reference to FIGS. 3A and 3B. The UE 115 may be configured to monitor the linked PDCCH candidates 405-*a* and 405-*b* for DCI. In some examples, the UE 115 may perform soft combining before receiving DCI via both of the linked PDCCH candidates 405-*a* and 405-*b*. The PDCCH candidates 405-*a* and 405-*b* may each include a set of PDCCH resources 435 (e.g., time and frequency resources allocated for a PDCCH). The PDCCH resources 435 of the first PDCCH candidate 405-*a* may or may not be contiguous in time and frequency with the PDCCH resources 435 of the second PDCCH candidate 405-*b*. In some examples, a PDCCH candidate 405 may be referred to as a downlink control channel candidate.

As described herein, the UE 115 may receive a PDCCH order via the first PDCCH candidate 405-*a*, the second PDCCH candidate 405-*b* that is linked with the first PDCCH candidate 405-*a* for PDCCH repetition, or both (e.g., if the UE 115 soft combines the PDCCH candidates 405). Performing the random access procedure may include transmitting, by the UE 115, an uplink random access message (e.g., Msg 1) during a PRACH occasion 410-*a* (e.g., a set of PRACH resources 440 allocated for transmitting the uplink random access message). The uplink random access message may be an example of a random access request message 230 described with reference to FIG. 2.

The first PDCCH candidate 405-*a* may be associated with a first TCI state and the second PDCCH candidate 405-*b* may be associated with a second TCI state that is different from the first TCI state (e.g., the PDCCH candidates 405 may correspond to different CORESETs associated with different TCI states and the PDCCH order may be received via different beams in each PDCCH candidate 405-*a* and 405-*b*).

The PDCCH order received via at least one of the first PDCCH candidate 405-*a* or the second PDCCH candidate 405-*b* may include an indication of which TCI state to use as a basis to for the QCL assumption 425-*a* to be applied to receipt of the one or more downlink random access messages. For example, DCI conveying the PDCCH order may include multiple reserved bits that may be used to indicate the TCI state. For example, bits in the DCI conveying the PDCCH order may indicate whether to use the TCI state associated with the PDCCH candidate having a lower or higher CORESET ID, search space ID, or TCI state ID. For example, a bit 0 may indicate to use the TCI state associated with the PDCCH candidate having a lower CORESET ID, search space ID, or TCI state ID, and a bit 1 may indicate to use the TCI state associated with the PDCCH candidate having a higher CORESET ID, search space ID, or TCI state ID. Other examples may be based on the timing of the PDCCH candidates, e.g., the TCI state associated with the PDCCH candidate was received earlier. For example, a bit 0 may indicate to use the TCI state associated with the PDCCH candidate that was received earlier, and a bit 1 may indicate to use the TCI state associated with the PDCCH candidate that was received later.

The downlink random access messages may include DCI transmitted via a PDCCH candidate 405-*c* that includes the PDCCH resources 435, a RAR message transmitted via the PDSCH resources 445 during a PDSCH occasion 415-*a*, or both. The DCI (e.g., DCI format 1_0) may include a CRC scrambled by a random access radio network temporary ID (RA-RNTI). The DCI may schedule the PDSCH occasion 415-*a* for transmission of the RAR message. The RAR message (e.g., a downlink RAR message) may be transmitted by a base station 105 responsive to the uplink random access message.

In some examples, the indication of which TCI state to use as a basis for the QCL assumption 425-*a* to be applied to receipt of the one or more downlink random access messages may be applicable if the PDCCH order triggers CFRA (e.g., the random access preamble index in the PDCCH order is not zero) on a PCell, a PSCell, or both. Otherwise, the TCI state for identifying the QCL assumption 425-*a* for receipt of the downlink messages may not depend on the one or more TCI states associated with the PDCCH order, and the UE 115 may identify the QCL assumption 425-*a* based on a measured SSB, or some other signaling.

For example, if the PDCCH order triggers CBRA, the dependency of the QCL assumption 425-*a* on the first TCI state associated with the first PDCCH candidate 405-*a* or the second TCI state associated with the second PDCCH candidate 405-*b* may not be applicable and the UE 115 may identify the QCL assumption 425-*a* based on a measured SSB associated with the CBRA procedure. If the PDCCH order triggers CFRA on a SCell, the PDCCH order may be received on the SCell and the DCI with RA-RNTI and the corresponding RAR message may be received on a PCell. Thus, the TCI states associated with receipt of the PDCCH order on the SCell may not be applied to receipt of the DCI, the RAR message, or both, on the PCell.

Figure 5:
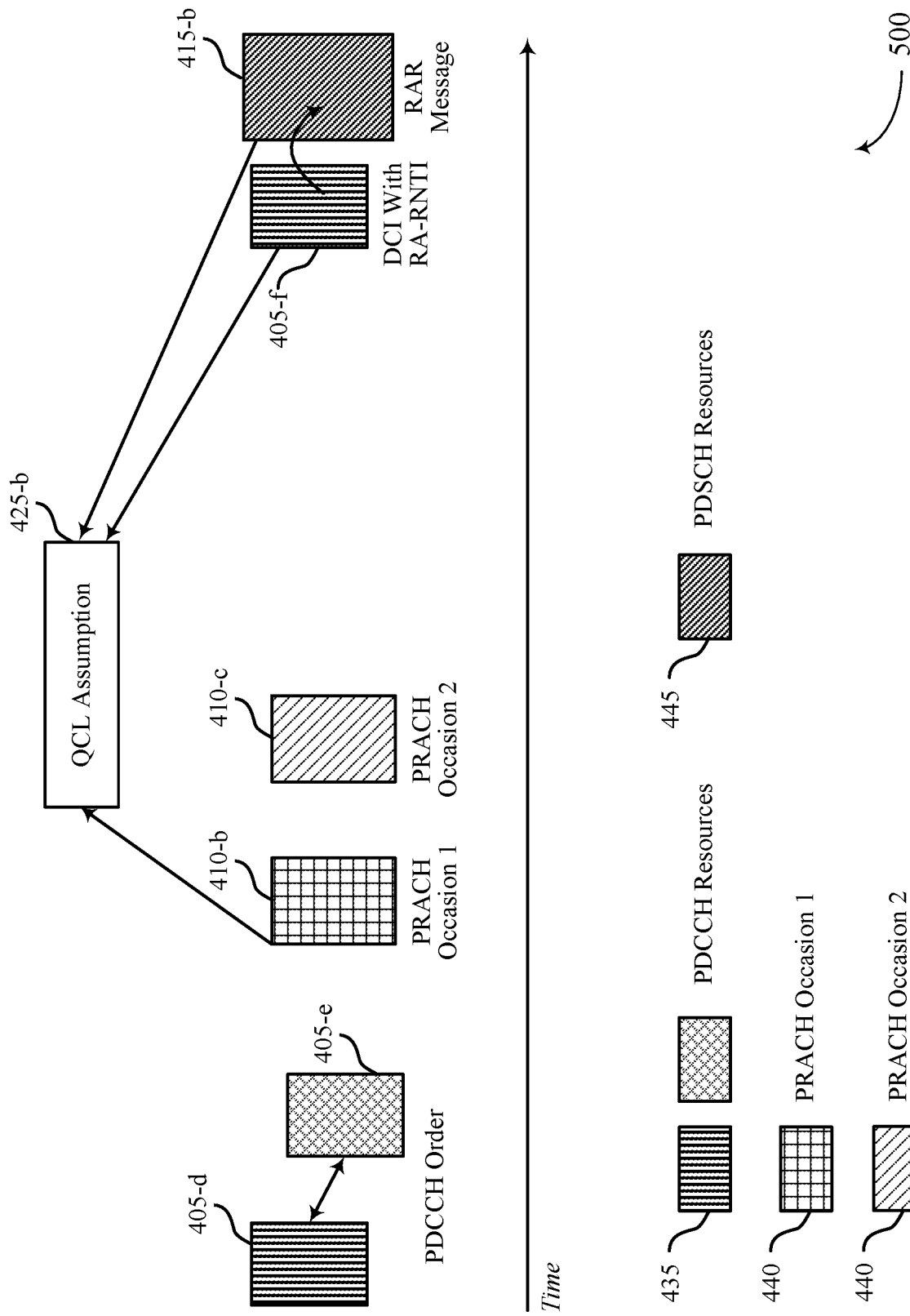
FIG. 5 illustrates an example of a random access timeline that supports downlink control channel repetition for a downlink control channel order in accordance with aspects of the present disclosure.

FIG. 5 illustrates an example of a random access timeline 500 that supports downlink control channel repetition for a downlink control channel order in accordance with aspects of the present disclosure. The random access timeline 500 may be similar to the random access timeline 400 described with reference to FIG. 4. For example, the random access timeline 500 may illustrate a timeline for receiving a PDCCH order via at least one of the linked PDCCH candidates 405-*d* and 405-*e*, transmitting an uplink random access message, and receiving one or more downlink random access messages in accordance with a QCL assumption 425-*b*.

The UE 115 may receive an indication that a first PDCCH candidate 405-*d* and a second PDCCH candidate 405-*e* are linked for PDCCH repetition, and the UE 115 may receive a PDCCH order via the first PDCCH candidate 405-*d*, the second PDCCH candidate 405-*e*, or both.

The first PDCCH candidate 405-*d* may be associated with a first TCI state and the second PDCCH candidate 405-*d* may be associated with a second TCI state that is different from the first TCI state (e.g., the PDCCH candidates 405 may correspond to different CORESETs associated with different TCI states and the PDCCH order may be received via different beams in each PDCCH candidate 405-*d* and 405-*e*).

The UE 115 may select a TCI state associated with either the first PDCCH candidate 405-*d* or the second PDCCH candidate 405-*e* to use a basis for a QCL assumption 425-*b* to be applied to receipt of one or more downlink random access messages. The UE may transmit an uplink random access message (e.g., a PRACH) in one of a first PRACH occasion 410-*b* or a second PRACH occasion 410-*c* which are associated with a first SSB and a second SSB, respectively, which are quasi-colocated with the first PDCCH candidate 405-*d* and the second PDCCH candidate 405-*e*, respectively. Transmitting the uplink random access message in either the first PRACH occasion 410-*b* or the second PRACH occasion 410-*c* indicates, to the base station 105, which TCI state to use for the one or more downlink random access message(s). In some examples, the SSB index indicated in the PDCCH order (e.g., indicated by 6 bits in the DCI conveying the PDCCH order) may be ignored or may be enforced to equal one of the first SSB that is quasi-colocated with the first PDCCH candidate 405-*d* or the second SSB that is quasi-colocated with the second PDCCH candidate 405-*e* (e.g., the SSB index indicated in the 6 bits in the DCI of the PDCCH order may not be used to directly determine the PRACH occasion).

In some examples, the UE 115 may select the TCI state to use based on the link or channel quality of the PDCCH candidates 405-*d* and 405-*e* (e.g., the UE 115 may select the TCI state associated with the PDCCH candidate having a better measured channel quality). For example, the UE 115 may measure the signal quality of DMRS associated with the PDCCH candidates 405-*d* and 405-*e* and select the TCI state based on the measured signal qualities of the DMRSs. For example, the UE 115 may measure a SINR, SNR, or RSRP associated with DMRSs associated with the PDCCH candidates 405-*d* and 405-*e*. In other cases, the UE 115 may select the TCI state based on measuring the signal quality of received coded bits in the PDCCH candidates 405-*d* and 405-*e* such as based on the LLR associated with received coded bits in the PDCCH candidates 405-*d* and 405-*e* (e.g., the UE may select the TCI state associated with the PDCCH candidate having a better LLR for the received coded bits).

The downlink random access messages may include DCI transmitted via a PDCCH candidate 405-*f* that includes the PDCCH resources 435, a RAR message transmitted via the PDSCH resources 445 during a PDSCH occasion 415-*b*, or both. The DCI (e.g., DCI format 1_0) may include a CRC scrambled by a RA-RNTI. The DCI may schedule the PDSCH occasion 415-*b* for transmission of the RAR message. The RAR message (e.g., a downlink RAR message) may be transmitted by a base station 105 responsive to the uplink random access message sent in either the first PRACH occasion 410-*b* or the second PRACH occasion 410-*c*.

In some examples, the UE 115 may select which TCI state to use as a basis for the QCL assumption 425-*b* to be applied to receipt of the one or more downlink random access messages if the PDCCH order triggers CFRA (e.g., the random access preamble index in the PDCCH order is not zero) on a PCell, a PSCell, or both. Otherwise, the TCI state for identifying the QCL assumption 425-*b* for receipt of the downlink messages may not depend on the one or more TCI states associated with the PDCCH order, and the UE 115 may identify the QCL assumption 425-*b* based on a measured SSB, or some other signaling.

For example, if the PDCCH order triggers CBRA, the dependency of the QCL assumption 425-*b* on the first TCI state associated with the first PDCCH candidate 405-*d* or the second TCI state associated with the second PDCCH candidate 405-*e* may not applicable and the UE 115 may identify the QCL assumption 425-*b* based on a measured SSB associated with the CBRA procedure. If the PDCCH order triggers CFRA on a SCell, the PDCCH order may be received on the SCell and the DCI with RA-RNTI and the corresponding RAR message may be received on a PCell. Thus, the TCI states associated with receipt of the PDCCH order on the SCell may not be applied to receipt of the DCI, the RAR message, or both, on the PCell.

Figure 6:
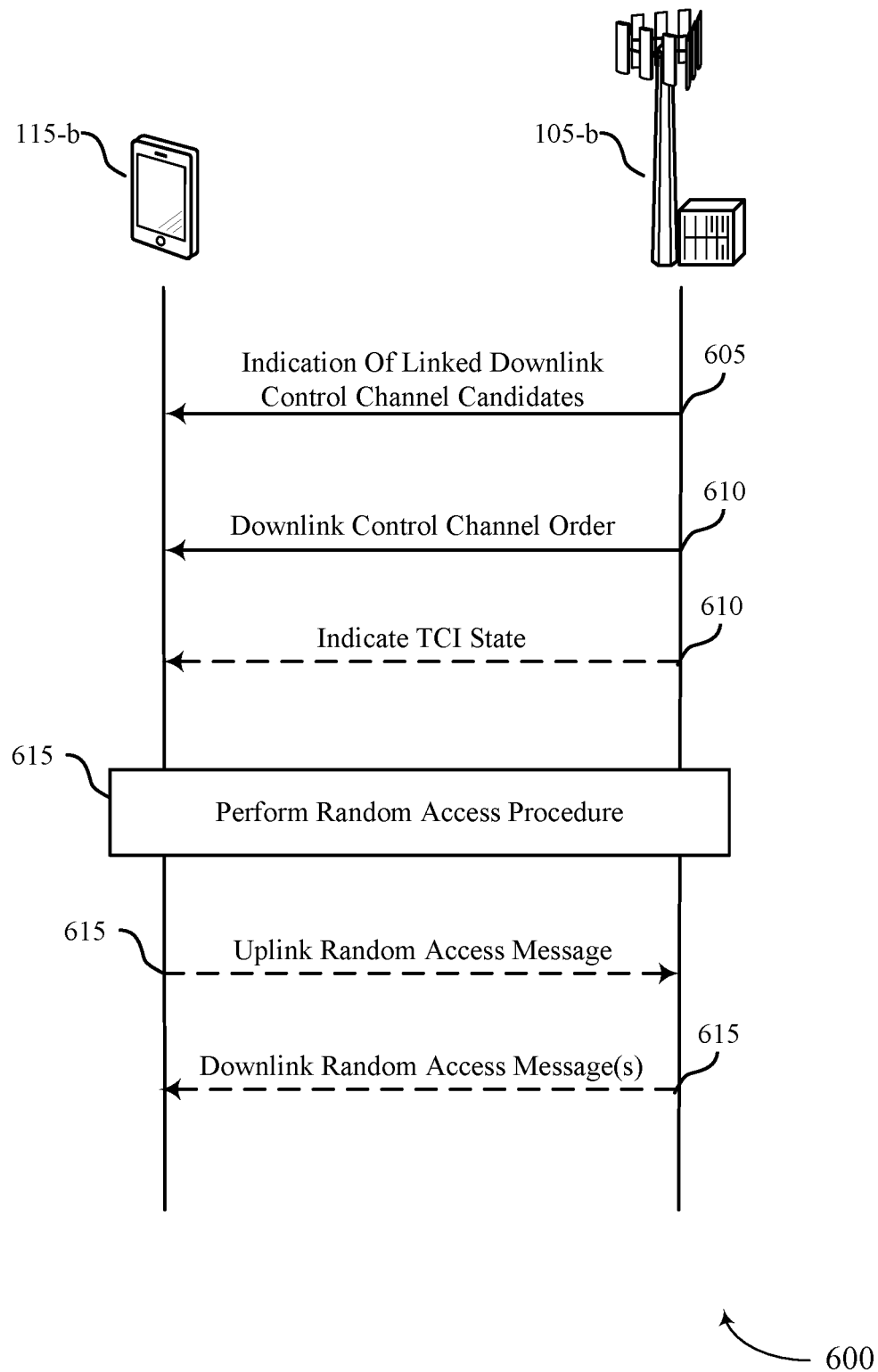
FIG. 6 illustrates an example of a process flow that supports downlink control channel repetition for a downlink control channel order in accordance with aspects of the present disclosure.

FIG. 6 illustrates an example of a process flow 600 that supports downlink control channel repetition for a downlink control channel order in accordance with aspects of the present disclosure. The process flow 600 may implement or be implemented by some aspects of the wireless communications system 100 or 200. For example, the process flow 600 may include a UE 115-b and a base station 105-b, which may be examples of a UE 115 and a base station 105 as described herein.

At 605, the base station 105-b may transmit, and the UE 115-b may receive, an indication of linked downlink control channel candidates. For example, the UE 115-b may receive an indication that a first downlink control channel candidate and a second downlink control channel candidate are linked for downlink control channel repetition (e.g., PDCCH repetition). The first downlink control channel candidate may be associated with a first TCI state and the second downlink control channel may be associated with a second TCI state that is different from the first TCI state At 610, the base station 105-b may transmit, and the UE 115-b may receive, a downlink control channel order requesting the UE 115-b to participate in a random access procedure. The downlink control channel order may be transmitted and received via at least one of the first downlink control channel candidate and the second downlink control channel candidate. In some examples, at 610, the base station 105-b may transmit, and the UE 115-b may receive, within the downlink control channel order, an indication of which TCI state (e.g., the first TCI state or the second TCI state) to use as a basis for a QCL assumption to be applied to receipt of the one or more downlink random access messages. For example, DCI conveying the downlink control channel order at 610 may include multiple reserved bits that may be used to indicate the TCI state. For example, bits in the DCI conveying the downlink control channel order may indicate whether to use the TCI state associated with the PDCCH candidate having a lower or higher CORESET ID, search space ID, or TCI state ID. For example, a bit 0 may indicate to use the TCI state associated with the downlink control channel candidate having a lower CORESET ID, search space ID, or TCI state ID, and a bit 1 may indicate to use the TCI state associated with the downlink control channel candidate having a higher CORESET ID, search space ID, or TCI state ID. Other examples may be based on the timing of the downlink control channel candidates, e.g., the TCI state associated with the downlink control channel candidate was received earlier.

At 615, the UE 115-b and the base station 105-b may perform the random access procedure associated with the downlink control channel order. In some examples, performing the random access procedure at 615 may include transmitting, by the UE 115-b, an uplink random access message to the base station 105-b, and transmitting, by the base station 105-b, one or more downlink random access messages to the UE 115-b using the indicated TCI state.

Figure 7:
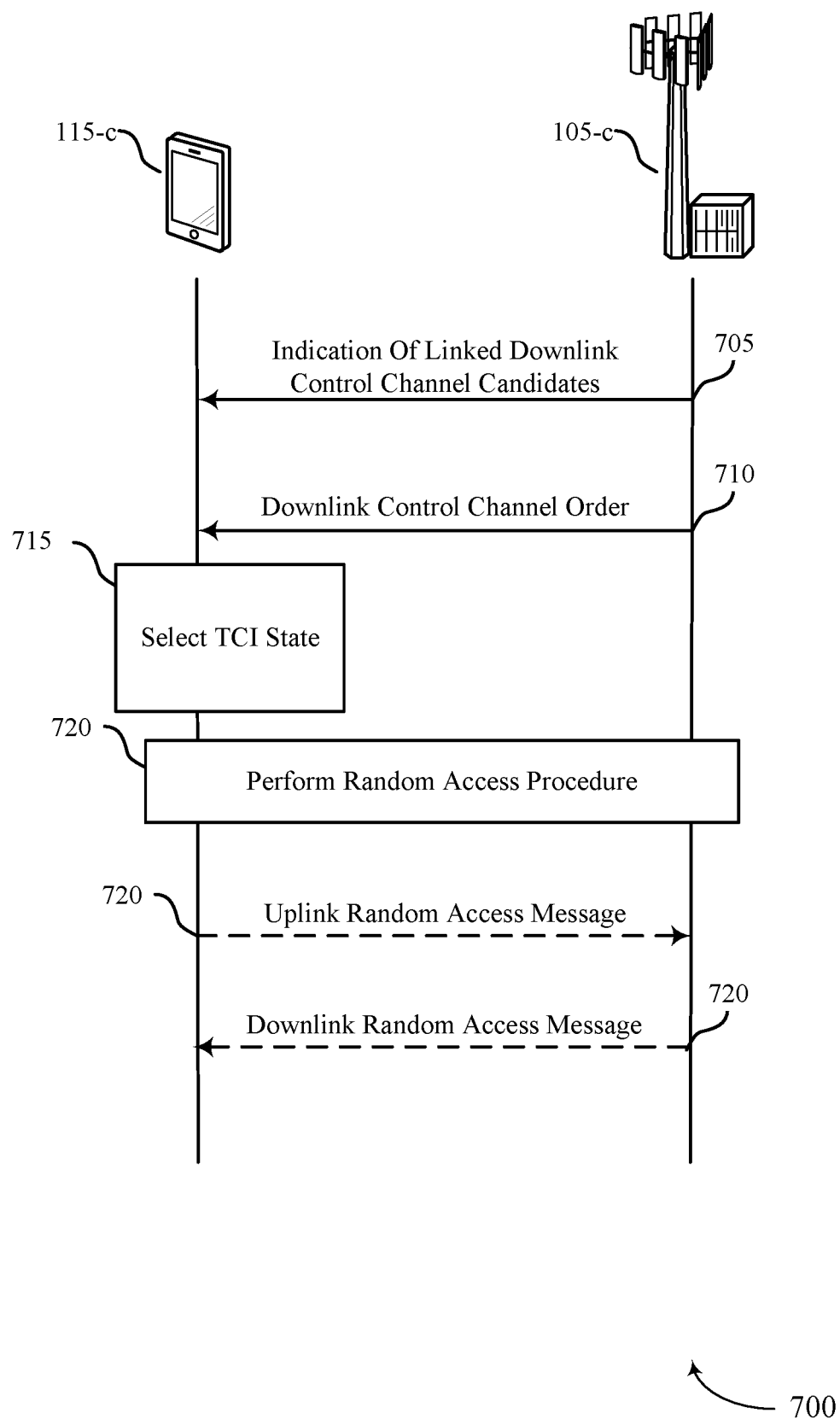
FIG. 7 illustrates an example of a process flow that supports downlink control channel repetition for a downlink control channel order in accordance with aspects of the present disclosure.

FIG. 7 illustrates an example of a process flow 700 that supports downlink control channel repetition for a downlink control channel order in accordance with aspects of the present disclosure. The process flow 700 may implement or be implemented by some aspects of the wireless communications system 100 or 200. For example, the process flow 700 may include a UE 115-c and a base station 105-c, which may be examples of a UE 115 and a base station 105 as described herein.

At 705, the base station 105-c may transmit, and the UE 115-c may receive, an indication of linked downlink control channel candidates. For example, the UE 115-c may receive an indication that a first downlink control channel candidate and a second downlink control channel candidate are linked for downlink control channel repetition (e.g., PDCCH repetition). The first downlink control channel candidate may be associated with a first TCI state and the second downlink control channel may be associated with a second TCI state that is different from the first TCI state At 710, the base station 105-c may transmit, and the UE 115-c may receive, a downlink control channel order requesting the UE 115-c to participate in a random access procedure. The downlink control channel order may be transmitted and received via at least one of the first downlink control channel candidate and the second downlink control channel candidate.

At 715, the UE 115-c may select the TCI state associated with one of either the first downlink control channel candidate or the second downlink control channel candidate to use a basis for the QCL assumption to be applied to receipt of one or more downlink random access messages based on the measured channel qualities. In some examples, the UE 115-c may select which TCI state to use for the random access procedure based on the channel quality of the first and downlink control channel candidates (e.g., the UE 115-c may select the TCI state associated with the downlink control channel candidate having a better measured channel quality). In some examples, the UE 115-c may measure the channel quality of the first and second downlink control channel candidates by measuring the signal quality of DMRSs associated with the first and second downlink control channel candidates. For example, the UE 115-c may measure an SINR, SNR, or RSRP associated with DMRSs associated with the first and second downlink control channel candidates. In other cases, the UE 115-c may select the TCI state based on measuring the signal quality of received coded bits in the first and second downlink control channel candidates, such as based on the LLR associated with received coded bits in the first and second downlink control channel candidates.

At 720, the UE 115-c and the base station 105-c may perform the random access procedure associated with the downlink control channel order. Performing the random access procedure at 720 may include transmitting, by the UE 115-c, a PRACH to the base station 105-c in a PRACH occasion that is associated with an SSB that is quasi-colocated with either the first or second downlink control channel candidate that is associated with the selected TCI state, and transmitting, by the base station 105-c, one or more downlink random access messages to the UE 115-c using the indicated TCI state. Transmitting, by the UE 115-c, a PRACH to the base station 105-c in a PRACH occasion that is associated with an SSB that is quasi-colocated with either the first or second downlink control channel candidate that is associated with the selected TCI state may indicate to the base station 105-c to use that TCI state to transmit the one or more downlink random access messages to the UE 115-c.

Figure 8:
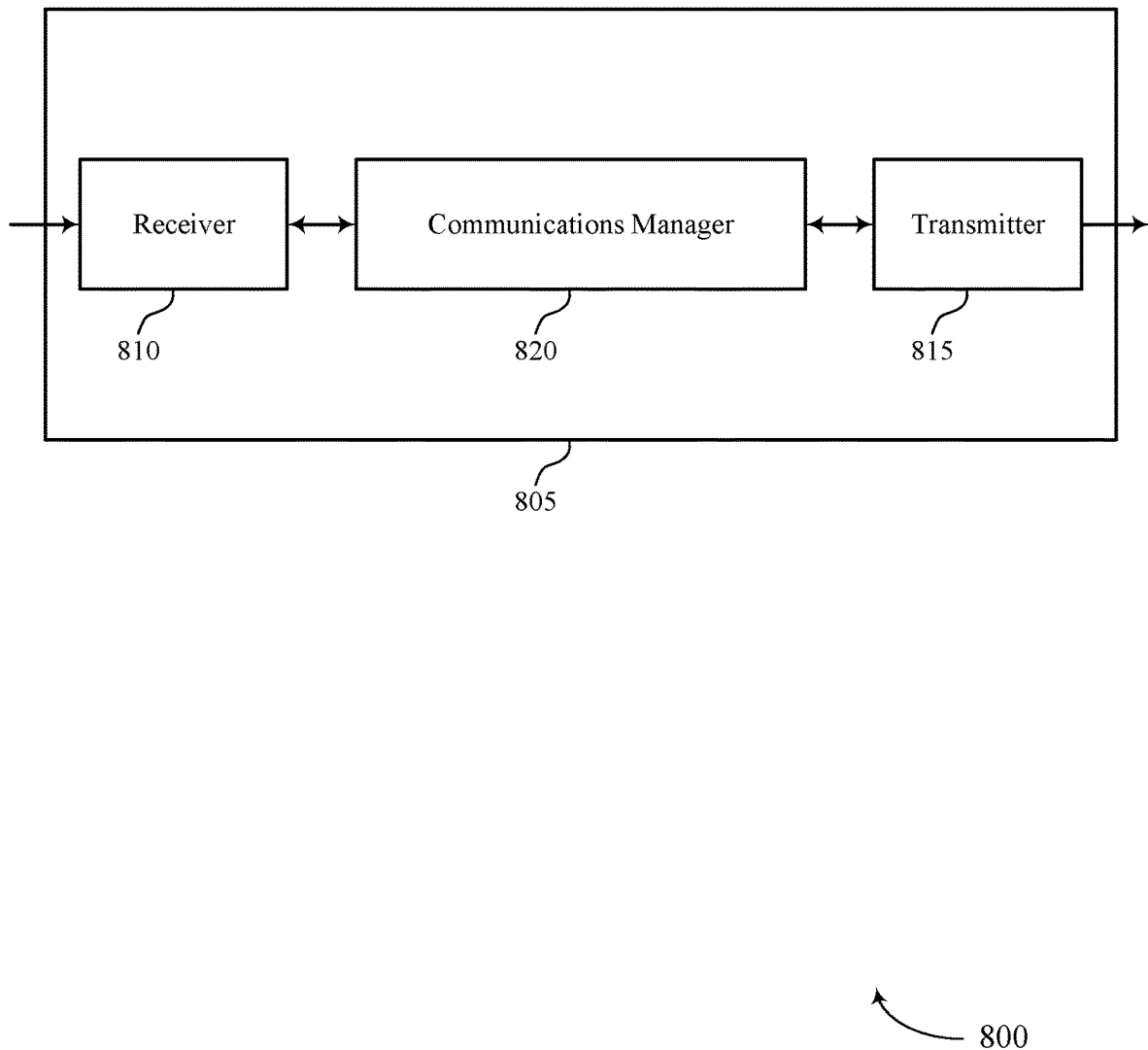
FIGS. 8 and 9 show block diagrams of devices that support downlink control channel repetition for a downlink control channel order in accordance with aspects of the present disclosure.

FIG. 8 shows a block diagram 800 of a device 805 that supports downlink control channel repetition for a downlink control channel order in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to downlink control channel repetition for a downlink control channel order). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to downlink control channel repetition for a downlink control channel order). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of downlink control channel repetition for a downlink control channel order as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The communications manager 820 may be configured as or otherwise support a means for receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The communications manager 820 may be configured as or otherwise support a means for performing the random access procedure using the indicated one of the first TCI state or the second TCI state.

Additionally, or alternatively, the communications manager 820 may support wireless communications at a UE in accordance with examples as disclosed herein. For example, the communications manager 820 may be configured as or otherwise support a means for receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The communications manager 820 may be configured as or otherwise support a means for receiving, via at least one of the first downlink control channel candidate or the second downlink control channel candidate, a downlink control channel order requesting the UE to participate in a random access procedure. The communications manager 820 may be configured as or otherwise support a means for transmitting a PRACH of the random access procedure associated with the downlink control channel order using one of the first TCI state or the second TCI state.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for may support techniques for reduced processing and more efficient utilization of communication resources. For example, the processor of the device 805 may receive and decode DCI received via linked PDCCH candidates, which may improve a reliability of the DCI, provide for more efficient utilization of communication resources, and reduce processing.

Figure 9:
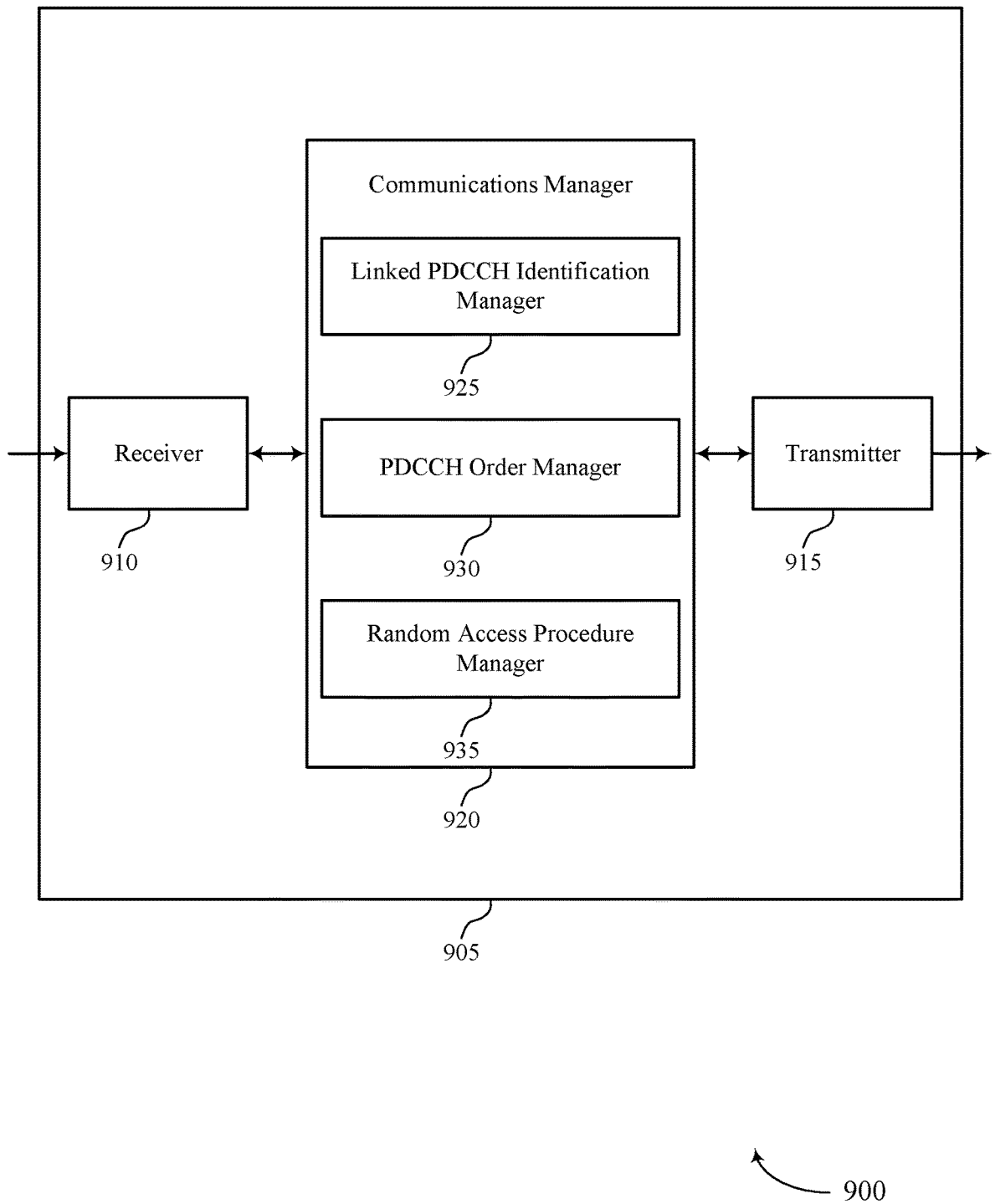

FIG. 9 shows a block diagram 900 of a device 905 that supports downlink control channel repetition for a downlink control channel order in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to downlink control channel repetition for a downlink control channel order). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to downlink control channel repetition for a downlink control channel order). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of downlink control channel repetition for a downlink control channel order as described herein. For example, the communications manager 920 may include a linked PDCCH identification manager 925, a PDCCH order manager 930, a random access procedure manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The linked PDCCH identification manager 925 may be configured as or otherwise support a means for receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The PDCCH order manager 930 may be configured as or otherwise support a means for receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The random access procedure manager 935 may be configured as or otherwise support a means for performing the random access procedure using the indicated one of the first TCI state or the second TCI state.

Additionally, or alternatively, the communications manager 920 may support wireless communications at a UE in accordance with examples as disclosed herein. The linked PDCCH identification manager 925 may be configured as or otherwise support a means for receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The PDCCH order manager 930 may be configured as or otherwise support a means for receiving, via at least one of the first downlink control channel candidate or the second downlink control channel candidate, a downlink control channel order requesting the UE to participate in a random access procedure. The random access procedure manager 935 may be configured as or otherwise support a means for transmitting a PRACH of the random access procedure associated with the downlink control channel order using one of the first TCI state or the second TCI state.

Figure 10:
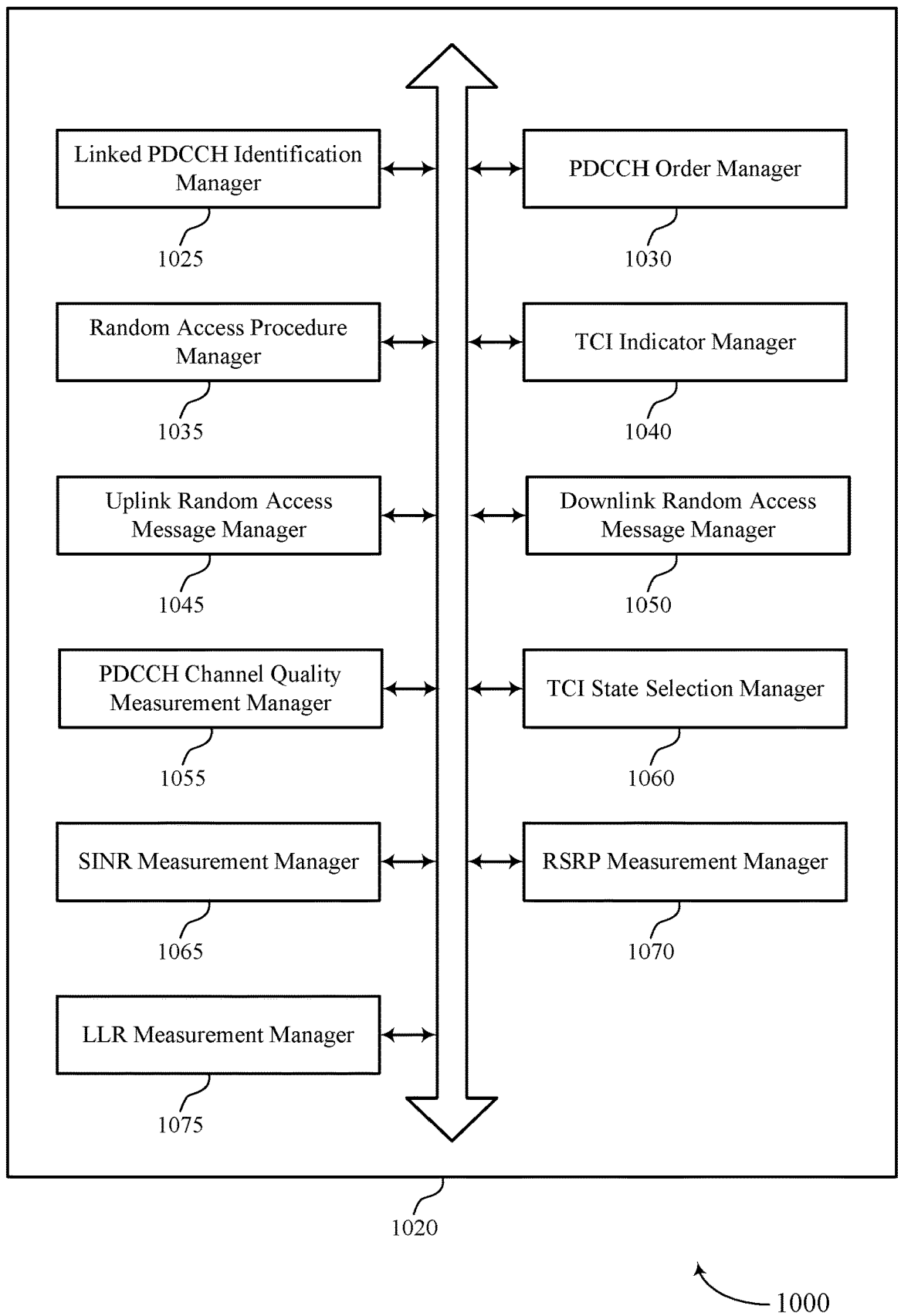
FIG. 10 shows a block diagram of a communications manager that supports downlink control channel repetition for a downlink control channel order in accordance with aspects of the present disclosure.

FIG. 10 shows a block diagram 1000 of a communications manager 1020 that supports downlink control channel repetition for a downlink control channel order in accordance with aspects of the present disclosure. The communications manager 1020 may be an example of aspects of a communications manager 820, a communications manager 920, or both, as described herein. The communications manager 1020, or various components thereof, may be an example of means for performing various aspects of downlink control channel repetition for a downlink control channel order as described herein. For example, the communications manager 1020 may include a linked PDCCH identification manager 1025, a PDCCH order manager 1030, a random access procedure manager 1035, a TCI indicator manager 1040, an uplink random access message manager 1045, a downlink random access message manager 1050, a PDCCH channel quality measurement manager 1055, a TCI state selection manager 1060, an SINR measurement manager 1065, an RSRP measurement manager 1070, an LLR measurement manager 1075, or any combination thereof. Each of these components may communicate, directly or indirectly, with one another (e.g., via one or more buses).

The communications manager 1020 may support wireless communications at a UE in accordance with examples as disclosed herein. The linked PDCCH identification manager 1025 may be configured as or otherwise support a means for receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The PDCCH order manager 1030 may be configured as or otherwise support a means for receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The random access procedure manager 1035 may be configured as or otherwise support a means for performing the random access procedure using the indicated one of the first TCI state or the second TCI state.

In some examples, to support receiving the downlink control channel order, the TCI indicator manager 1040 may be configured as or otherwise support a means for receiving an indication that the first TCI state is associated with the random access procedure, where the first TCI state is associated with a first CORESET ID and the second TCI state is associated with a second CORESET ID that is lower than the first CORESET ID.

In some examples, to support receiving the downlink control channel order, the TCI indicator manager 1040 may be configured as or otherwise support a means for receiving an indication that the first TCI state is associated with the random access procedure, where the first TCI state is associated with a first search space ID and the second TCI state is associated with a second search space ID that is lower than the first search space ID.

In some examples, to support receiving the downlink control channel order, the TCI indicator manager 1040 may be configured as or otherwise support a means for receiving an indication that the first TCI state is associated with the random access procedure, where the first TCI state is associated with a first TCI state ID and the second TCI state is associated with a second TCI state ID that is lower than the first TCI state ID.

In some examples, to support receiving the downlink control channel order, the TCI indicator manager 1040 may be configured as or otherwise support a means for receiving an indication that the first TCI state is associated with the random access procedure, where the first TCI state is associated with a first CORESET ID and the second TCI state is associated with a second CORESET ID that is higher than the first CORESET ID.

In some examples, to support receiving the downlink control channel order, the TCI indicator manager 1040 may be configured as or otherwise support a means for receiving an indication that the first TCI state is associated with the random access procedure, first search space ID and the second TCI state is associated with a second search space ID that is higher than the first search space ID.

In some examples, to support receiving the downlink control channel order, the TCI indicator manager 1040 may be configured as or otherwise support a means for receiving an indication that the first TCI state is associated with the random access procedure, where the first TCI state is associated with a first TCI state ID and the second TCI state is associated with a second TCI state ID that is higher than the first TCI state ID.

In some examples, the indicated one of the first TCI state or the second TCI state used for the random access procedure is based on a relative timing of the first downlink control channel candidate and the second downlink control channel candidate.

In some examples, to support performing the random access procedure, the uplink random access message manager 1045 may be configured as or otherwise support a means for transmitting an uplink random access message responsive to the downlink control channel order. In some examples, to support performing the random access procedure, the downlink random access message manager 1050 may be configured as or otherwise support a means for receiving, using the indicated one of the first TCI state or the second TCI state, a downlink random access message responsive to the uplink random access message.

In some examples, to support receiving the downlink random access message, the downlink random access message manager 1050 may be configured as or otherwise support a means for receiving DCI that schedules a random access response message. In some examples, to support receiving the downlink random access message, the downlink random access message manager 1050 may be configured as or otherwise support a means for receiving the random access response message via a physical downlink shared channel.

In some examples, to support performing the random access procedure, the downlink random access message manager 1050 may be configured as or otherwise support a means for receiving the downlink random access message responsive to the uplink random access message using a same beam that was used to receive the one of the first downlink control channel candidate or the second downlink control channel candidate that is associated with the indicated one of the first TCI state or the second TCI state.

In some examples, the downlink control channel order requests a contention-free random access procedure on a primary cell or a primary-secondary cell.

In some examples, to support receiving the downlink control channel order, the PDCCH order manager 1030 may be configured as or otherwise support a means for receiving the downlink control channel order via DCI, where the DCI indicates the one of the first TCI state or the second TCI state to use for the random access procedure.

Additionally, or alternatively, the communications manager 1020 may support wireless communications at a UE in accordance with examples as disclosed herein. In some examples, the linked PDCCH identification manager 1025 may be configured as or otherwise support a means for receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. In some examples, the PDCCH order manager 1030 may be configured as or otherwise support a means for receiving, via at least one of the first downlink control channel candidate or the second downlink control channel candidate, a downlink control channel order requesting the UE to participate in a random access procedure. In some examples, the random access procedure manager 1035 may be configured as or otherwise support a means for transmitting a PRACH of the random access procedure associated with the downlink control channel order using one of the first TCI state or the second TCI state.

In some examples, the PDCCH channel quality measurement manager 1055 may be configured as or otherwise support a means for measuring a first channel quality of the first downlink control channel candidate and a second channel quality of the second downlink control channel candidate. In some examples, the TCI state selection manager 1060 may be configured as or otherwise support a means for selecting one of the first TCI state or the second TCI state for transmitting the PRACH based on the measured first channel quality of the first downlink control channel candidate and the measured second channel quality of the second downlink control channel candidate.

In some examples, the transmitting the PRACH includes transmitting the PRACH using the selected one of the of the first TCI state or the second TCI state.

In some examples, the PDCCH channel quality measurement manager 1055 may be configured as or otherwise support a means for receiving a first DMRS associated with the first downlink control channel candidate, where the first channel quality of the first downlink control channel candidate is measured based on the first DMRS. In some examples, the PDCCH channel quality measurement manager 1055 may be configured as or otherwise support a means for receiving a second DMRS associated with the second downlink control channel candidate, where the second channel quality of the second downlink control channel candidate is measured based on the second DMRS.

In some examples, to support measuring the first channel quality of the first downlink control channel candidate and the second channel quality of the second downlink control channel candidate, the SINR measurement manager 1065 may be configured as or otherwise support a means for measuring a first SINR associated with the first DMRS and a second SINR associated with the second DMRS.

In some examples, to support measuring the first channel quality of the first downlink control channel candidate and the second channel quality of the second downlink control channel candidate, the RSRP measurement manager 1070 may be configured as or otherwise support a means for measuring a first RSRP associated with the first DMRS and a second RSRP associated with the second DMRS.

In some examples, the PDCCH channel quality measurement manager 1055 may be configured as or otherwise support a means for receiving a first set of coded bits via the first downlink control channel candidate, where the first channel quality of the first downlink control channel candidate is measured based on the first set of coded bits. In some examples, the PDCCH channel quality measurement manager 1055 may be configured as or otherwise support a means for receiving a second set of coded bits via the second downlink control channel candidate, where the second channel quality of the second downlink control channel candidate is measured based on the second set of coded bits.

In some examples, to support measuring the first channel quality of the first downlink control channel candidate and the second channel quality of the second downlink control channel candidate, the LLR measurement manager 1075 may be configured as or otherwise support a means for measuring a first LLR associated with the first set of coded bits and a second LLR associated with the second set of coded bits.

In some examples, the downlink random access message manager 1050 may be configured as or otherwise support a means for applying, in a reception of a downlink random access message responsive to the PRACH, a QCL assumption, where the QCL assumption is associated with one of the first TCI state or the second TCI state.

In some examples, to support reception of the downlink random access message, the downlink random access message manager 1050 may be configured as or otherwise support a means for receiving DCI that schedules a random access response message. In some examples, to support reception of the downlink random access message, the downlink random access message manager 1050 may be configured as or otherwise support a means for receiving the random access response message via a physical downlink shared channel.

In some examples, the QCL assumption is associated with an SSB that is associated with the PRACH.

In some examples, to support transmitting the PRACH, the uplink random access message manager 1045 may be configured as or otherwise support a means for transmitting the PRACH in one of a first PRACH occasion associated with the first TCI state, or a second PRACH occasion associated with the second TCI state, where the first PRACH occasion is associated with a first SSB and the second PRACH occasion is associated with a second SSB.

In some examples, the downlink control channel order requests a contention-free random access procedure on a primary cell or a primary-secondary cell.

Figure 11:
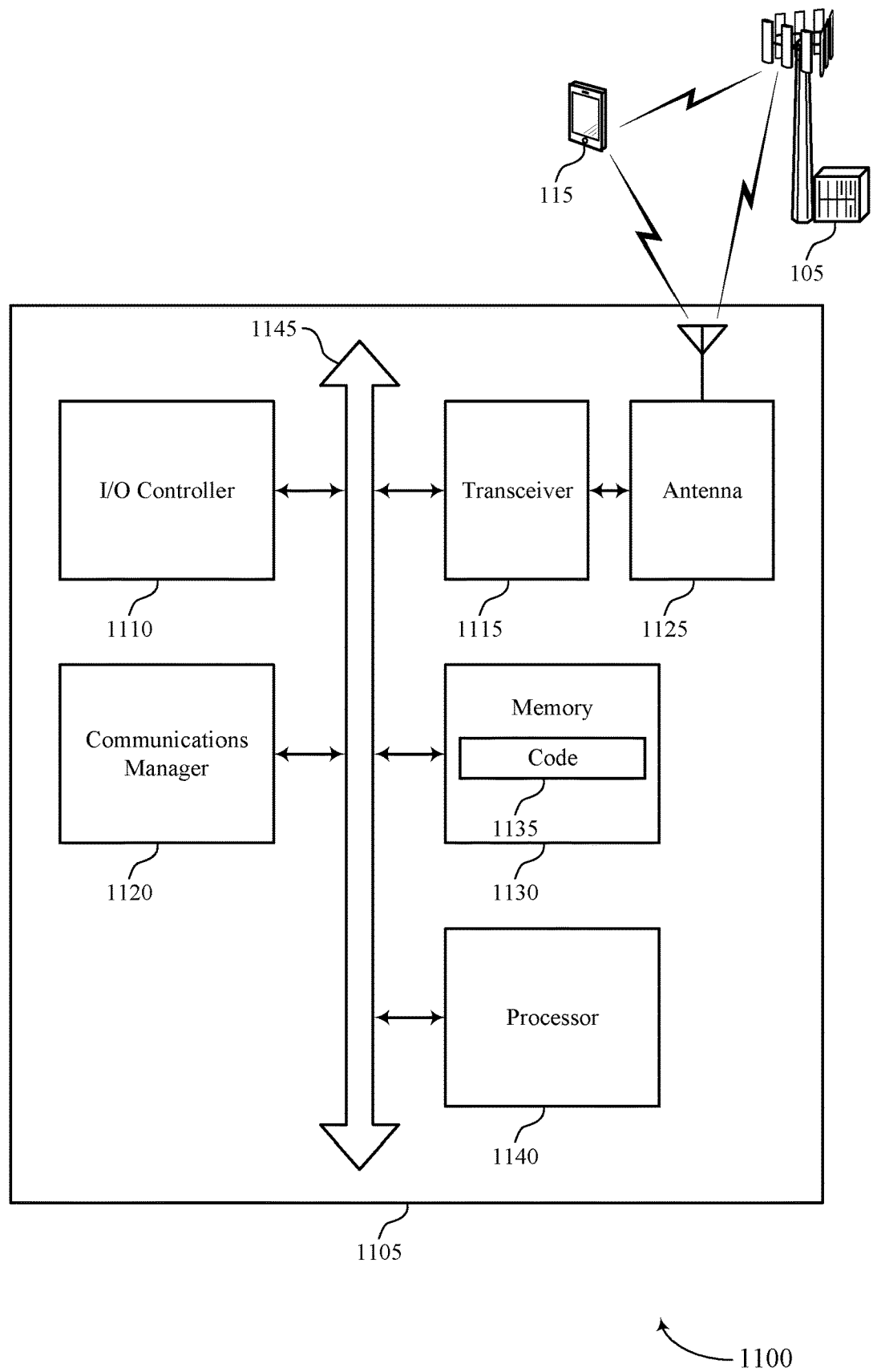
FIG. 11 shows a diagram of a system including a device that supports downlink control channel repetition for a downlink control channel order in accordance with aspects of the present disclosure.

FIG. 11 shows a diagram of a system 1100 including a device 1105 that supports downlink control channel repetition for a downlink control channel order in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting downlink control channel repetition for a downlink control channel order). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The communications manager 1120 may be configured as or otherwise support a means for receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The communications manager 1120 may be configured as or otherwise support a means for performing the random access procedure using the indicated one of the first TCI state or the second TCI state.

Additionally, or alternatively, the communications manager 1120 may support wireless communications at a UE in accordance with examples as disclosed herein. For example, the communications manager 1120 may be configured as or otherwise support a means for receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The communications manager 1120 may be configured as or otherwise support a means for receiving, via at least one of the first downlink control channel candidate or the second downlink control channel candidate, a downlink control channel order requesting the UE to participate in a random access procedure. The communications manager 1120 may be configured as or otherwise support a means for transmitting a PRACH of the random access procedure associated with the downlink control channel order using one of the first TCI state or the second TCI state.

By including or configuring the communications manager 1120 in accordance with examples as described herein, the device 1105 may support techniques for improved communication reliability and improved coordination between devices. By receiving the PDCCH order and performing a corresponding random access procedure according to an indication in the PDCCH order or according to channel quality measurement of the PDCCH candidates, the device 1105 may accurately determine a QCL assumption for the random access procedure, which may improve communication reliability and coordination between devices (e.g., between a UE 115 and a base station 105).

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of downlink control channel repetition for a downlink control channel order as described herein, or the processor 1140 and the memory 1130 may be otherwise configured to perform or support such operations.

Figure 12:
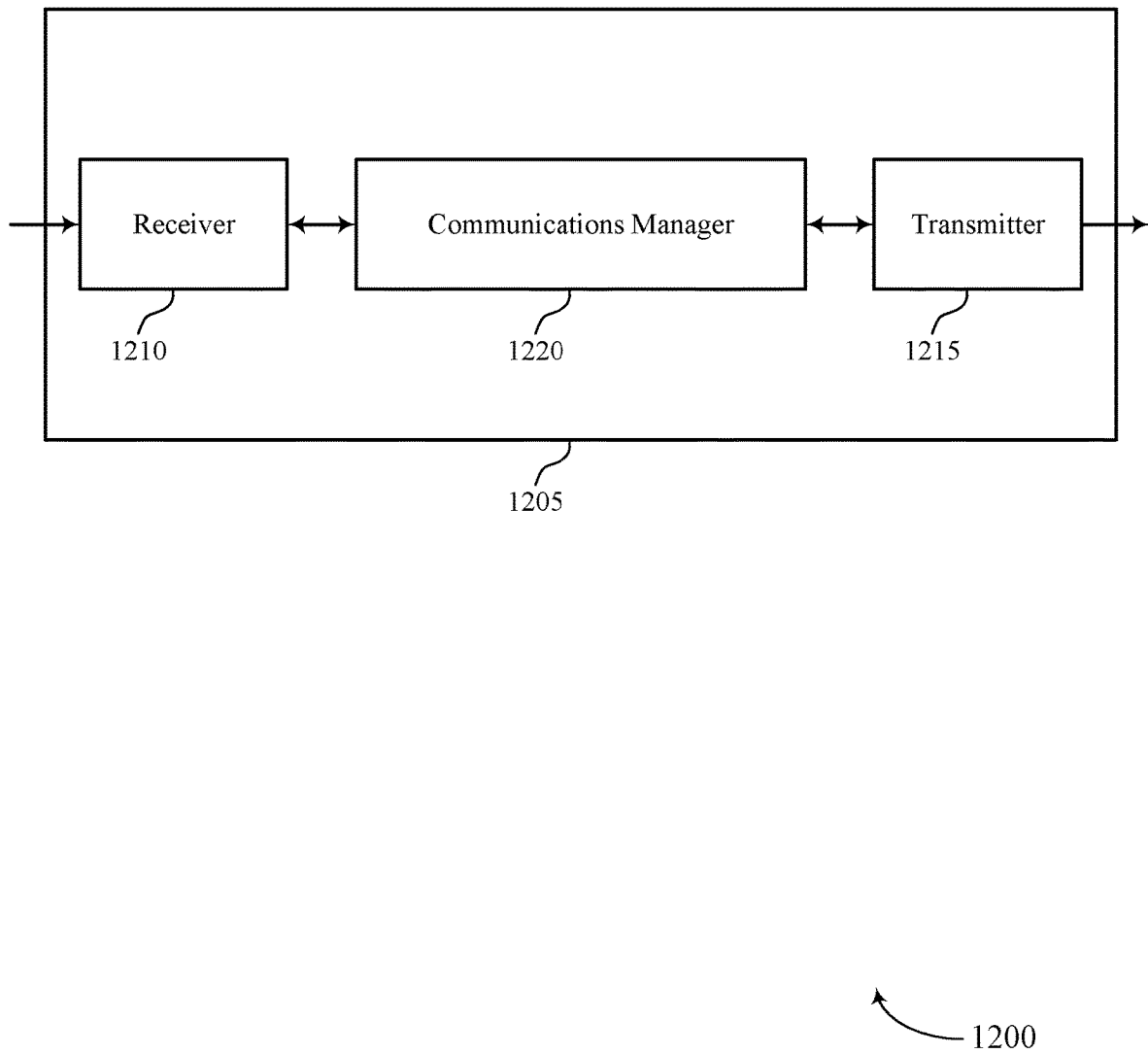
FIGS. 12 and 13 show block diagrams of devices that support downlink control channel repetition for a downlink control channel order in accordance with aspects of the present disclosure.

FIG. 12 shows a block diagram 1200 of a device 1205 that supports downlink control channel repetition for a downlink control channel order in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to downlink control channel repetition for a downlink control channel order). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to downlink control channel repetition for a downlink control channel order). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of downlink control channel repetition for a downlink control channel order as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

For example, the communications manager 1220 may be configured as or otherwise support a means for transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The communications manager 1220 may be configured as or otherwise support a means for transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure.

Additionally, or alternatively, the communications manager 1220 may support wireless communications at a base station in accordance with examples as disclosed herein. For example, the communications manager 1220 may be configured as or otherwise support a means for transmitting, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The communications manager 1220 may be configured as or otherwise support a means for transmitting, to the UE, via at least one of the first downlink control channel candidate or the second downlink control channel candidate, a downlink control channel order requesting the UE to participate in a random access procedure. The communications manager 1220 may be configured as or otherwise support a means for receiving, from the UE, a PRACH of the random access procedure associated with the downlink control channel order using one of the first TCI state or the second TCI state.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for may support techniques for reduced processing and more efficient utilization of communication resources. For example, the processor of the device 1205 may transmit DCI via linked PDCCH candidates, which may improve a reliability of the DCI, provide for more efficient utilization of communication resources, and reduce processing.

Figure 13:
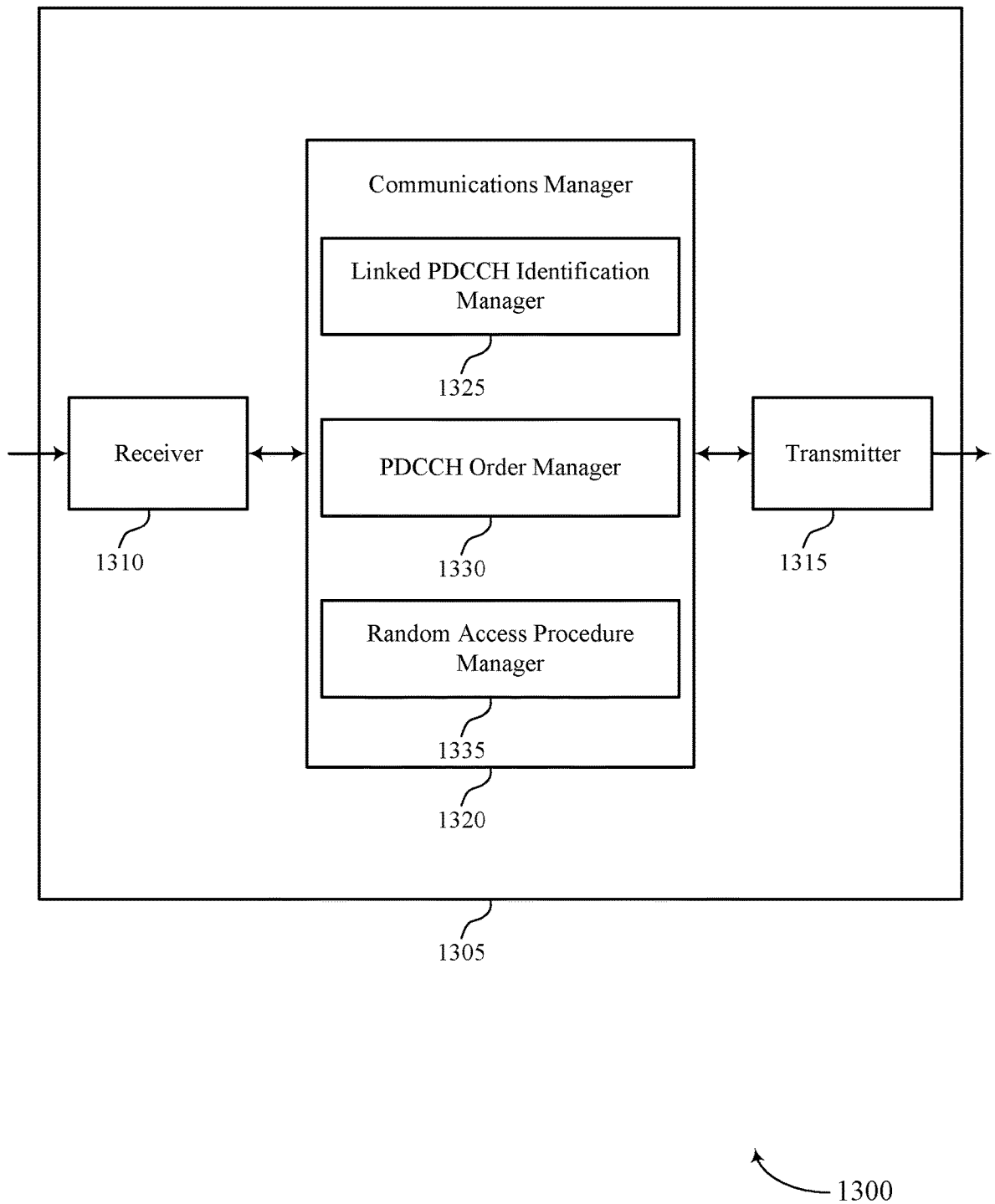

FIG. 13 shows a block diagram 1300 of a device 1305 that supports downlink control channel repetition for a downlink control channel order in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to downlink control channel repetition for a downlink control channel order). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to downlink control channel repetition for a downlink control channel order). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of downlink control channel repetition for a downlink control channel order as described herein. For example, the communications manager 1320 may include a linked PDCCH identification manager 1325, a PDCCH order manager 1330, a random access procedure manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The linked PDCCH identification manager 1325 may be configured as or otherwise support a means for transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The PDCCH order manager 1330 may be configured as or otherwise support a means for transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure.

Additionally, or alternatively, the communications manager 1320 may support wireless communications at a base station in accordance with examples as disclosed herein. The linked PDCCH identification manager 1325 may be configured as or otherwise support a means for transmitting, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The PDCCH order manager 1330 may be configured as or otherwise support a means for transmitting, to the UE, via at least one of the first downlink control channel candidate or the second downlink control channel candidate, a downlink control channel order requesting the UE to participate in a random access procedure. The random access procedure manager 1335 may be configured as or otherwise support a means for receiving, from the UE, a PRACH of the random access procedure associated with the downlink control channel order using one of the first TCI state or the second TCI state.

Figure 14:
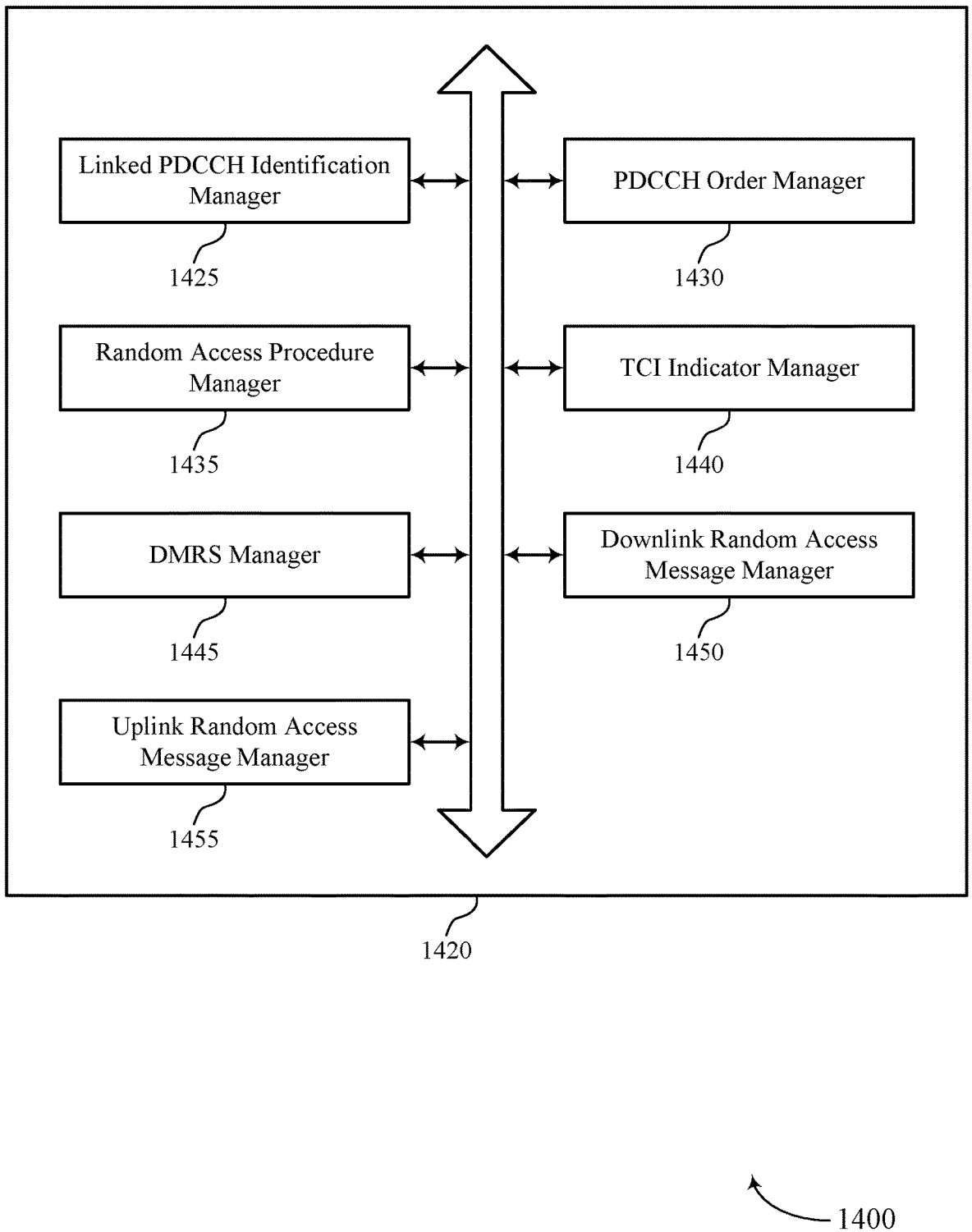
FIG. 14 shows a block diagram of a communications manager that supports downlink control channel repetition for a downlink control channel order in accordance with aspects of the present disclosure.

FIG. 14 shows a block diagram 1400 of a communications manager 1420 that supports downlink control channel repetition for a downlink control channel order in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of downlink control channel repetition for a downlink control channel order as described herein. For example, the communications manager 1420 may include a linked PDCCH identification manager 1425, a PDCCH order manager 1430, a random access procedure manager 1435, a TCI indicator manager 1440, a DMRS manager 1445, a downlink random access message manager 1450, an uplink random access message manager 1455, or any combination thereof. Each of these components may communicate, directly or indirectly, with one another (e.g., via one or more buses).

The linked PDCCH identification manager 1425 may be configured as or otherwise support a means for transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The PDCCH order manager 1430 may be configured as or otherwise support a means for transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure.

In some examples, the random access procedure manager 1435 may be configured as or otherwise support a means for performing the random access procedure using the indicated one of the first TCI state or the second TCI state.

In some examples, to support performing the random access procedure, the uplink random access message manager 1455 may be configured as or otherwise support a means for receiving, from the UE, an uplink random access message responsive to the downlink control channel order. In some examples, to support performing the random access procedure, the downlink random access message manager 1450 may be configured as or otherwise support a means for transmitting, to the UE, using the indicated one of the first TCI state or the second TCI state, a downlink random access message responsive to the uplink random access message.

In some examples, to support performing the random access procedure, the downlink random access message manager 1450 may be configured as or otherwise support a means for transmitting the downlink random access message responsive to the uplink random access message using a same beam that was used to transmit the one of the first downlink control channel candidate or the second downlink control channel candidate that is associated with the indicated one of the first TCI state or the second TCI state.

In some examples, to support transmitting the downlink control channel order, the TCI indicator manager 1440 may be configured as or otherwise support a means for transmitting an indication that the first TCI state is associated with the random access procedure, where the first TCI state is associated with a first CORESET ID and the second TCI state is associated with a second CORESET ID that is lower than the first CORESET ID.

In some examples, to support transmitting the downlink control channel order, the TCI indicator manager 1440 may be configured as or otherwise support a means for transmitting an indication that the first TCI state is associated with the random access procedure, where the first TCI state is associated with a first search space ID and the second TCI state is associated with a second search space ID that is lower than the first search space ID.

In some examples, to support transmitting the downlink control channel order, the TCI indicator manager 1440 may be configured as or otherwise support a means for transmitting an indication that the first TCI state is associated with the random access procedure, where the first TCI state is associated with a first TCI state ID and the second TCI state is associated with a second TCI state ID that is lower than the first TCI state ID.

In some examples, to support transmitting the downlink control channel order, the TCI indicator manager 1440 may be configured as or otherwise support a means for transmitting an indication that the first TCI state is associated with the random access procedure, where the first TCI state is associated with a first CORESET ID and the second TCI state is associated with a second CORESET ID that is higher than the first CORESET ID.

In some examples, to support transmitting the downlink control channel order, the TCI indicator manager 1440 may be configured as or otherwise support a means for transmitting an indication that the first TCI state is associated with the random access procedure, first search space ID and the second TCI state is associated with a second search space ID that is higher than the first search space ID.

In some examples, to support transmitting the downlink control channel order, the TCI indicator manager 1440 may be configured as or otherwise support a means for transmitting an indication that the first TCI state is associated with the random access procedure, where the first TCI state is associated with a first TCI state ID and the second TCI state is associated with a second TCI state ID that is higher than the first TCI state ID.

In some examples, the indicated one of the first TCI state or the second TCI state used for the random access procedure is based on a relative timing of the first downlink control channel candidate and the second downlink control channel candidate.

In some examples, the downlink control channel order requests a contention-free random access procedure on a primary cell or a primary-secondary cell.

In some examples, to support transmitting the downlink control channel order, the PDCCH order manager 1430 may be configured as or otherwise support a means for transmitting the downlink control channel order via DCI, where the DCI indicates the one of the first TCI state or the second TCI state to use for the random access procedure.

Additionally, or alternatively, the communications manager 1420 may support wireless communications at a base station in accordance with examples as disclosed herein. In some examples, the linked PDCCH identification manager 1425 may be configured as or otherwise support a means for transmitting, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. In some examples, the PDCCH order manager 1430 may be configured as or otherwise support a means for transmitting, to the UE, via at least one of the first downlink control channel candidate or the second downlink control channel candidate, a downlink control channel order requesting the UE to participate in a random access procedure. The random access procedure manager 1435 may be configured as or otherwise support a means for receiving, from the UE, a PRACH of the random access procedure associated with the downlink control channel order using one of the first TCI state or the second TCI state.

In some examples, the DMRS manager 1445 may be configured as or otherwise support a means for transmitting, to the UE, a first DMRS associated with the first downlink control channel candidate. In some examples, the DMRS manager 1445 may be configured as or otherwise support a means for transmitting, to the UE, a second DMRS associated with the second downlink control channel candidate.

In some examples, the downlink random access message manager 1450 may be configured as or otherwise support a means for applying, in a transmission of a downlink random access message responsive to the PRACH, a QCL assumption, where the QCL assumption is associated with one of the first TCI state or the second TCI state.

In some examples, the QCL assumption is associated with a SSB that is associated with the PRACH.

In some examples, to support receiving the PRACH, the random access procedure manager 1435 may be configured as or otherwise support a means for receiving the PRACH in one of a first PRACH occasion associated with the first TCI state, or a second PRACH occasion associated with the second TCI state, where the first PRACH occasion is associated with a first SSB and the second PRACH occasion is associated with a second SSB.

In some examples, the downlink control channel order requests a contention-free random access procedure on a primary cell or a primary-secondary cell.

Figure 15:
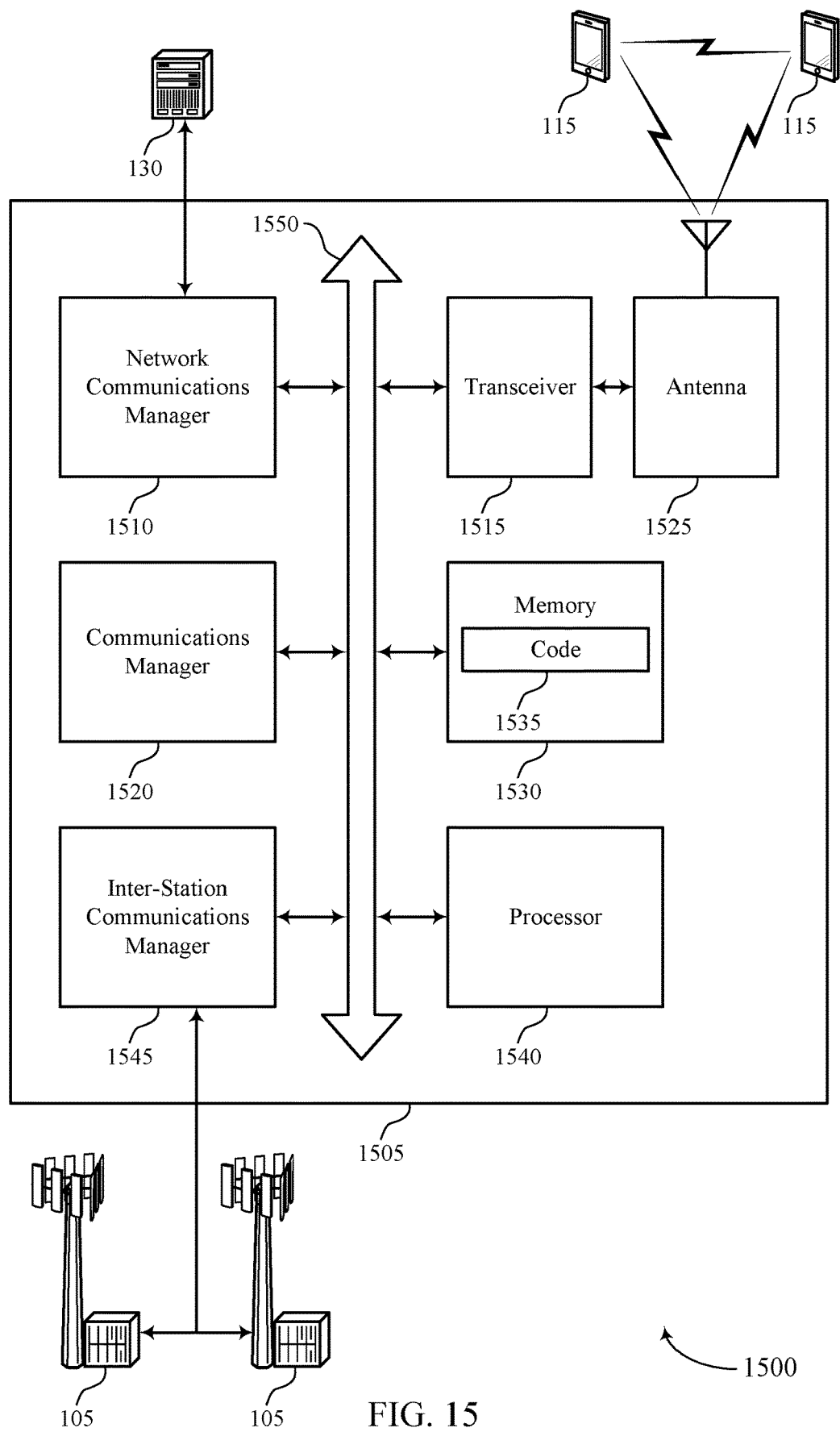
FIG. 15 shows a diagram of a system including a device that supports downlink control channel repetition for a downlink control channel order in accordance with aspects of the present disclosure.

FIG. 15 shows a diagram of a system 1500 including a device 1505 that supports downlink control channel repetition for a downlink control channel order in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting downlink control channel repetition for a downlink control channel order). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

For example, the communications manager 1520 may be configured as or otherwise support a means for transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The communications manager 1520 may be configured as or otherwise support a means for transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure.

Additionally, or alternatively, the communications manager 1520 may support wireless communications at a base station in accordance with examples as disclosed herein. For example, the communications manager 1520 may be configured as or otherwise support a means for transmitting, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The communications manager 1520 may be configured as or otherwise support a means for transmitting, to the UE, via at least one of the first downlink control channel candidate or the second downlink control channel candidate, a downlink control channel order requesting the UE to participate in a random access procedure. The communications manager 1520 may be configured as or otherwise support a means for receiving, from the UE, a PRACH of the random access procedure associated with the downlink control channel order using one of the first TCI state or the second TCI state.

By including or configuring the communications manager 1520 in accordance with examples as described herein, the device 1505 may support techniques for improved communication reliability and improved coordination between devices. For example, transmitting the PDCCH order and performing a corresponding random access procedure according to the TCI state indicated in the PDCCH order or according to channel quality measurement of the PDCCH candidates which may improve communication reliability and coordination between devices (e.g., between a UE 115 and a base station 105).

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of downlink control channel repetition for a downlink control channel order as described herein, or the processor 1540 and the memory 1530 may be otherwise configured to perform or support such operations.

Figure 16:
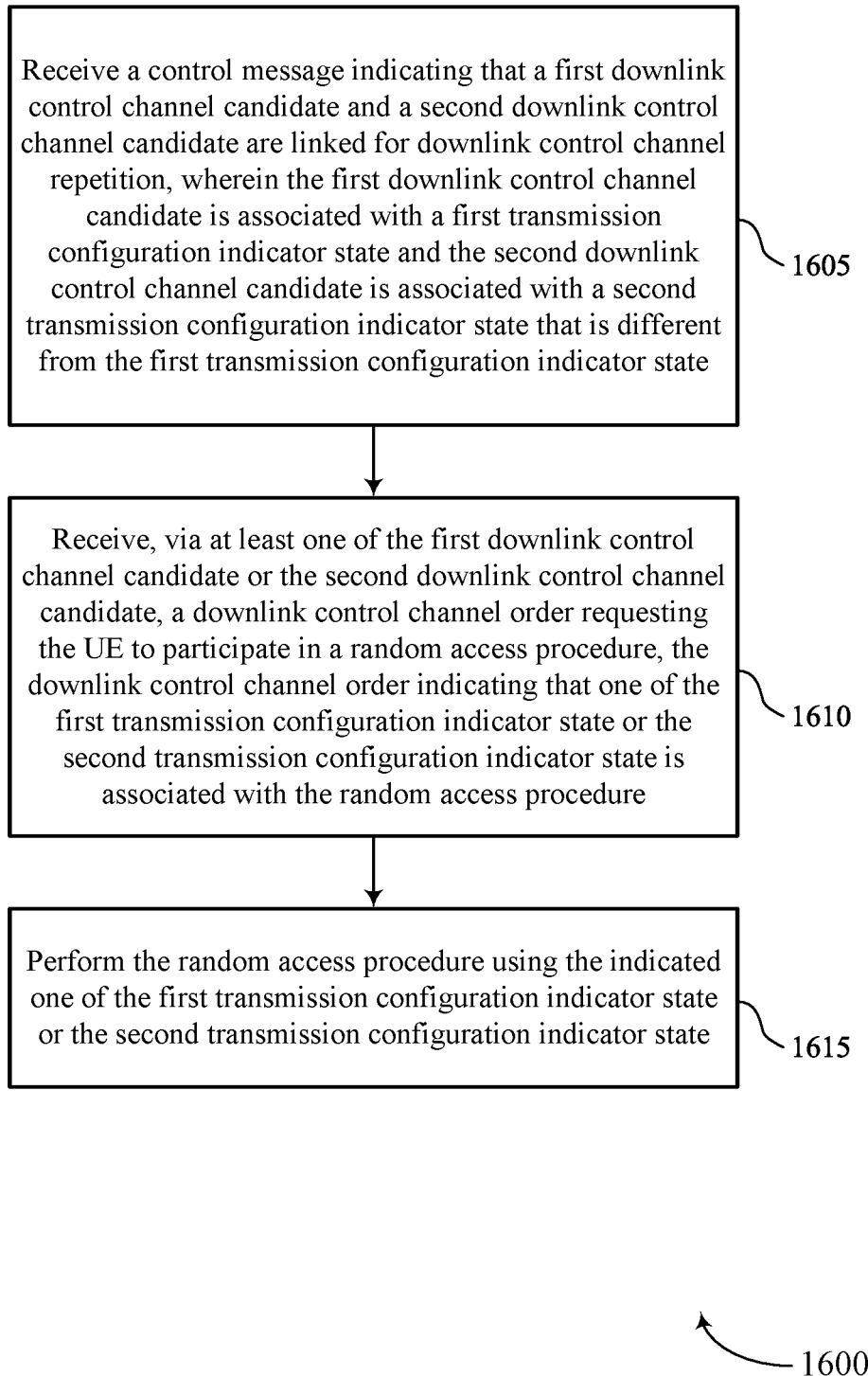
FIGS. 16 through 26 show flowcharts illustrating methods that support downlink control channel repetition for a downlink control channel order in accordance with aspects of the present disclosure.

FIG. 16 shows a flowchart illustrating a method 1600 that supports downlink control channel repetition for a downlink control channel order in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 1605 may be performed in accordance with examples as disclosed herein. In some examples, aspects of the operations of 1605 may be performed by a linked PDCCH identification manager 1025 as described with reference to FIG. 10.

At 1610, the method may include receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The operations of 1610 may be performed in accordance with examples as disclosed herein. In some examples, aspects of the operations of 1610 may be performed by a PDCCH order manager 1030 as described with reference to FIG. 10.

At 1615, the method may include performing the random access procedure using the indicated one of the first TCI state or the second TCI state. The operations of 1615 may be performed in accordance with examples as disclosed herein.

In some examples, aspects of the operations of 1615 may be performed by a random access procedure manager 1035 as described with reference to FIG. 10.

Figure 17:
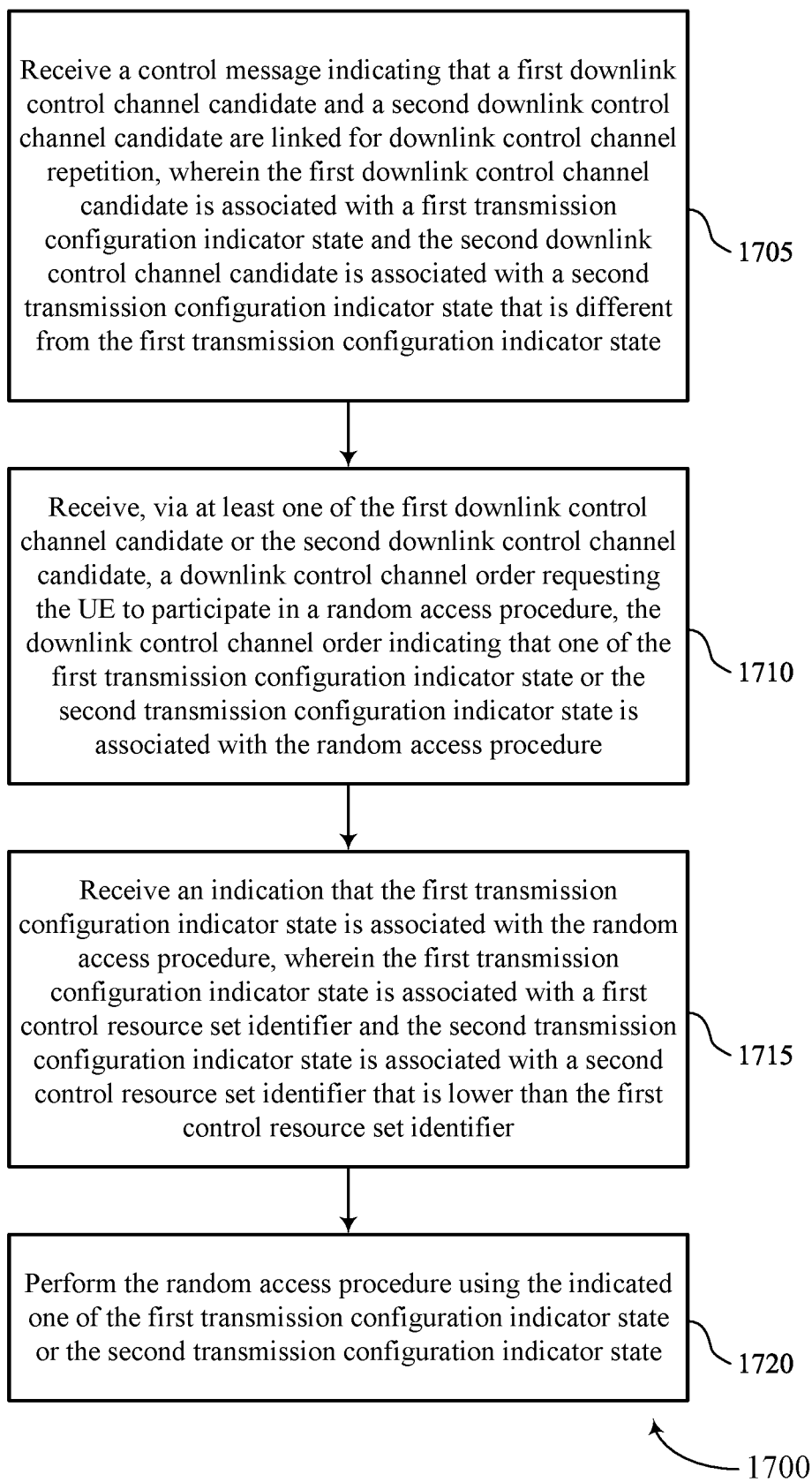

FIG. 17 shows a flowchart illustrating a method 1700 that supports downlink control channel repetition for a downlink control channel order in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 1705 may be performed in accordance with examples as disclosed herein. In some examples, aspects of the operations of 1705 may be performed by a linked PDCCH identification manager 1025 as described with reference to FIG. 10.

At 1710, the method may include receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The operations of 1710 may be performed in accordance with examples as disclosed herein. In some examples, aspects of the operations of 1710 may be performed by a PDCCH order manager 1030 as described with reference to FIG. 10.

At 1715, the method may include receiving an indication that the first TCI state is associated with the random access procedure, where the first TCI state is associated with a first CORESET ID and the second TCI state is associated with a second CORESET ID that is lower than the first CORESET ID. The operations of 1715 may be performed in accordance with examples as disclosed herein. In some examples, aspects of the operations of 1715 may be performed by a TCI indicator manager 1040 as described with reference to FIG. 10.

At 1720, the method may include performing the random access procedure using the indicated one of the first TCI state or the second TCI state. The operations of 1720 may be performed in accordance with examples as disclosed herein. In some examples, aspects of the operations of 1720 may be performed by a random access procedure manager 1035 as described with reference to FIG. 10.

Figure 18:
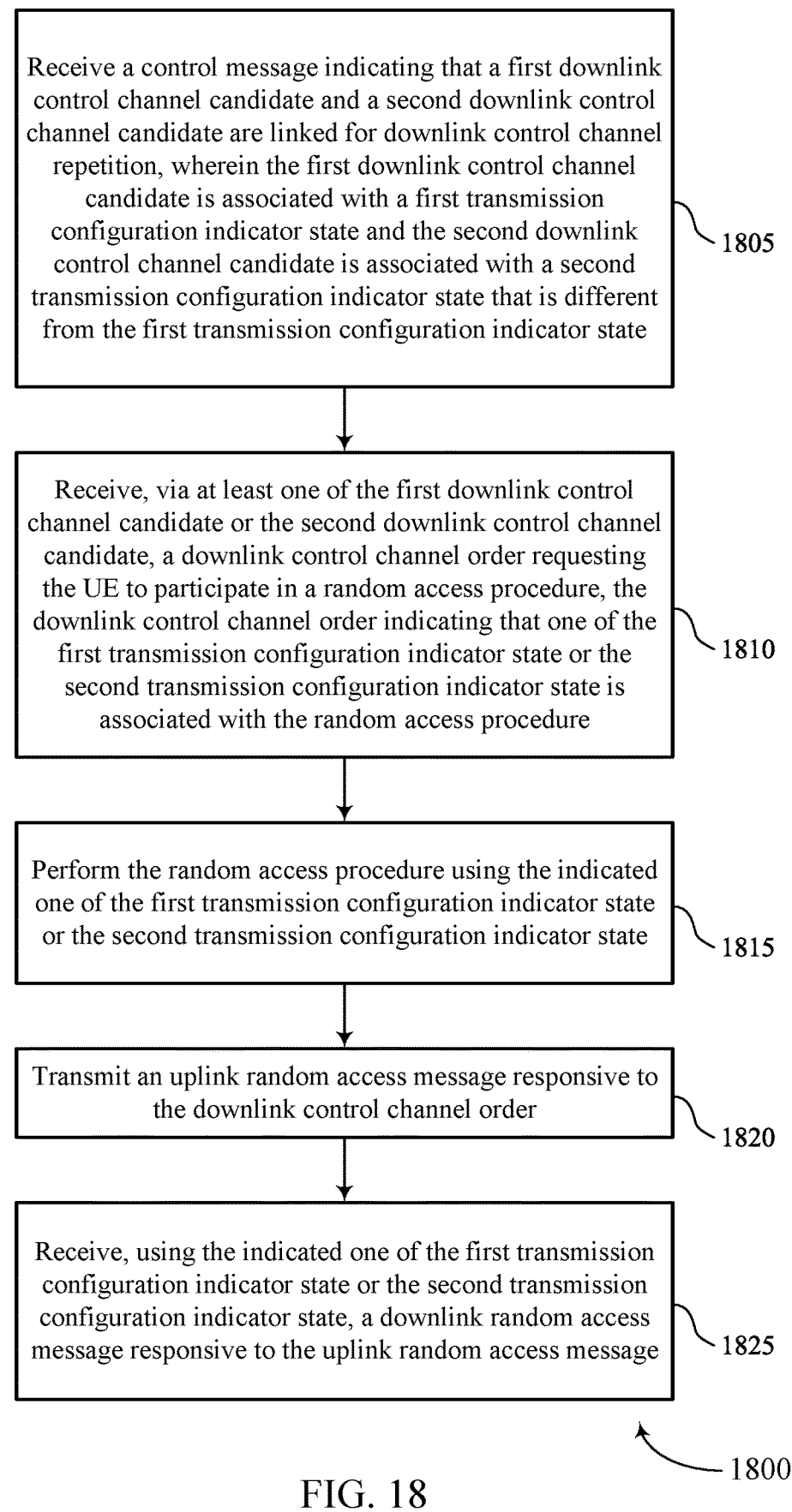

FIG. 18 shows a flowchart illustrating a method 1800 that supports downlink control channel repetition for a downlink control channel order in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 1805 may be performed in accordance with examples as disclosed herein. In some examples, aspects of the operations of 1805 may be performed by a linked PDCCH identification manager 1025 as described with reference to FIG. 10.

At 1810, the method may include receiving, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The operations of 1810 may be performed in accordance with examples as disclosed herein. In some examples, aspects of the operations of 1810 may be performed by a PDCCH order manager 1030 as described with reference to FIG. 10.

At 1815, the method may include performing the random access procedure using the indicated one of the first TCI state or the second TCI state. The operations of 1815 may be performed in accordance with examples as disclosed herein. In some examples, aspects of the operations of 1815 may be performed by a random access procedure manager 1035 as described with reference to FIG. 10.

At 1820, the method may include transmitting an uplink random access message responsive to the downlink control channel order. The operations of 1820 may be performed in accordance with examples as disclosed herein. In some examples, aspects of the operations of 1820 may be performed by an uplink random access message manager 1045 as described with reference to FIG. 10.

At 1825, the method may include receiving, using the indicated one of the first TCI state or the second TCI state, a downlink random access message responsive to the uplink random access message. The operations of 1825 may be performed in accordance with examples as disclosed herein. In some examples, aspects of the operations of 1825 may be performed by a downlink random access message manager 1050 as described with reference to FIG. 10.

Figure 19:
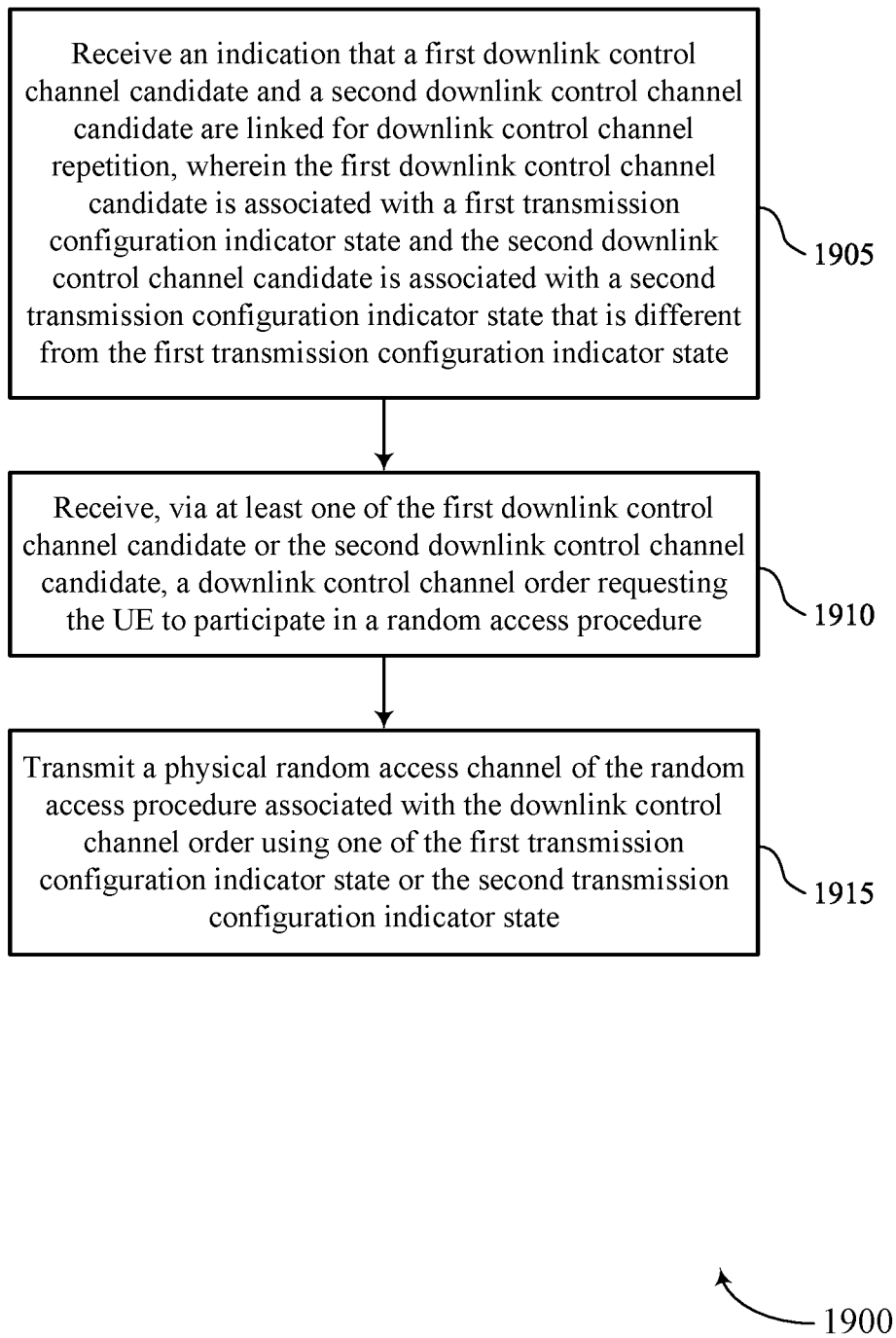

FIG. 19 shows a flowchart illustrating a method 1900 that supports downlink control channel repetition for a downlink control channel order in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 1905 may be performed in accordance with examples as disclosed herein. In some examples, aspects of the operations of 1905 may be performed by a linked PDCCH identification manager 1025 as described with reference to FIG. 10.

At 1910, the method may include receiving, via at least one of the first downlink control channel candidate or the second downlink control channel candidate, a downlink control channel order requesting the UE to participate in a random access procedure. The operations of 1910 may be performed in accordance with examples as disclosed herein. In some examples, aspects of the operations of 1910 may be performed by a PDCCH order manager 1030 as described with reference to FIG. 10.

At 1915, the method may include transmitting a PRACH of the random access procedure associated with the downlink control channel order using one of the first TCI state or the second TCI state. The operations of 1915 may be performed in accordance with examples as disclosed herein. In some examples, aspects of the operations of 1915 may be performed by a random access procedure manager 1035 as described with reference to FIG. 10.

Figure 20:
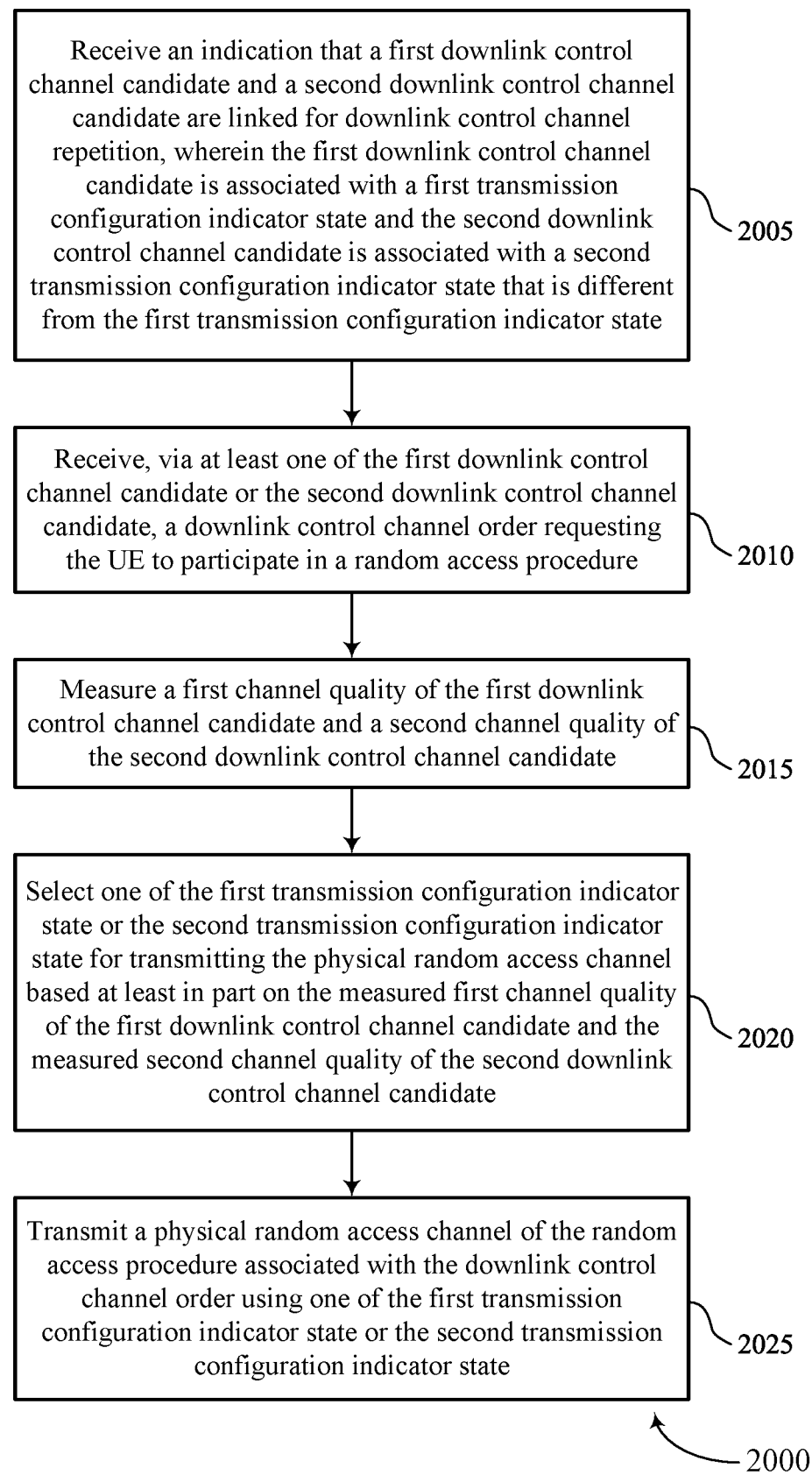

FIG. 20 shows a flowchart illustrating a method 2000 that supports downlink control channel repetition for a downlink control channel order in accordance with aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2005, the method may include receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 2005 may be performed in accordance with examples as disclosed herein. In some examples, aspects of the operations of 2005 may be performed by a linked PDCCH identification manager 1025 as described with reference to FIG. 10.

At 2010, the method may include receiving, via at least one of the first downlink control channel candidate or the second downlink control channel candidate, a downlink control channel order requesting the UE to participate in a random access procedure. The operations of 2010 may be performed in accordance with examples as disclosed herein. In some examples, aspects of the operations of 2010 may be performed by a PDCCH order manager 1030 as described with reference to FIG. 10.

At 2015, the method may include measuring a first channel quality of the first downlink control channel candidate and a second channel quality of the second downlink control channel candidate. The operations of 2015 may be performed in accordance with examples as disclosed herein. In some examples, aspects of the operations of 2015 may be performed by a PDCCH channel quality measurement manager 1055 as described with reference to FIG. 10.

At 2020, the method may include selecting one of the first TCI state or the second TCI state for transmitting the PRACH based on the measured first channel quality of the first downlink control channel candidate and the measured second channel quality of the second downlink control channel candidate. The operations of 2020 may be performed in accordance with examples as disclosed herein. In some examples, aspects of the operations of 2020 may be performed by a TCI state selection manager 1060 as described with reference to FIG. 10.

At 2025, the method may include transmitting a PRACH of the random access procedure associated with the downlink control channel order using one of the first TCI state or the second TCI state. The operations of 2025 may be performed in accordance with examples as disclosed herein. In some examples, aspects of the operations of 2025 may be performed by a random access procedure manager 1035 as described with reference to FIG. 10.

Figure 21:
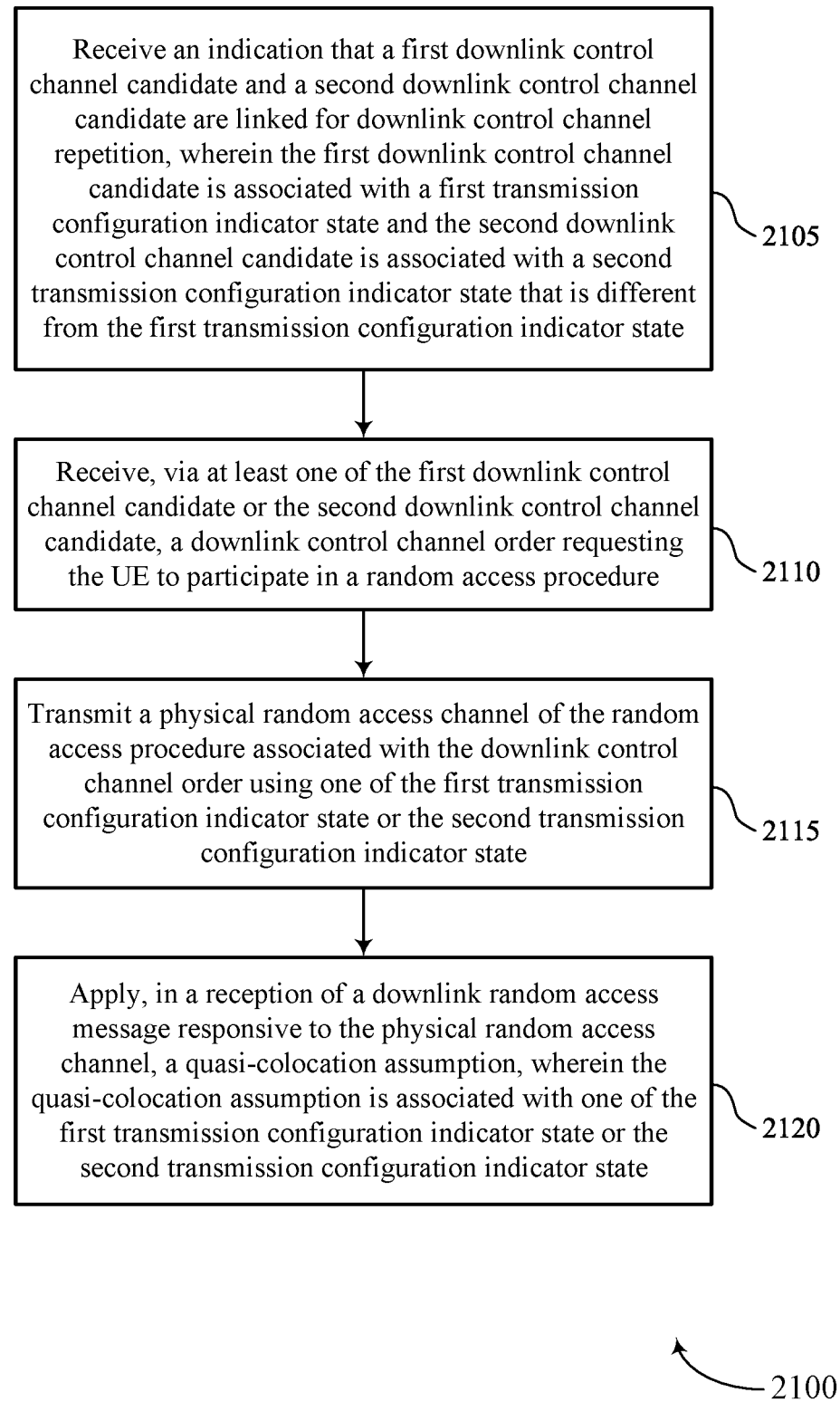

FIG. 21 shows a flowchart illustrating a method 2100 that supports downlink control channel repetition for a downlink control channel order in accordance with aspects of the present disclosure. The operations of the method 2100 may be implemented by a UE or its components as described herein. For example, the operations of the method 2100 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2105, the method may include receiving an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 2105 may be performed in accordance with examples as disclosed herein. In some examples, aspects of the operations of 2105 may be performed by a linked PDCCH identification manager 1025 as described with reference to FIG. 10.

At 2110, the method may include receiving, via at least one of the first downlink control channel candidate or the second downlink control channel candidate, a downlink control channel order requesting the UE to participate in a random access procedure. The operations of 2110 may be performed in accordance with examples as disclosed herein. In some examples, aspects of the operations of 2110 may be performed by a PDCCH order manager 1030 as described with reference to FIG. 10.

At 2115, the method may include transmitting a PRACH of the random access procedure associated with the downlink control channel order using one of the first TCI state or the second TCI state. The operations of 2115 may be performed in accordance with examples as disclosed herein. In some examples, aspects of the operations of 2115 may be performed by a random access procedure manager 1035 as described with reference to FIG. 10.

At 2120, the method may include applying, in a reception of a downlink random access message responsive to the PRACH, a QCL assumption, where the QCL assumption is associated with one of the first TCI state or the second TCI state. The operations of 2120 may be performed in accordance with examples as disclosed herein. In some examples, aspects of the operations of 2120 may be performed by a downlink random access message manager 1050 as described with reference to FIG. 10.

Figure 22:
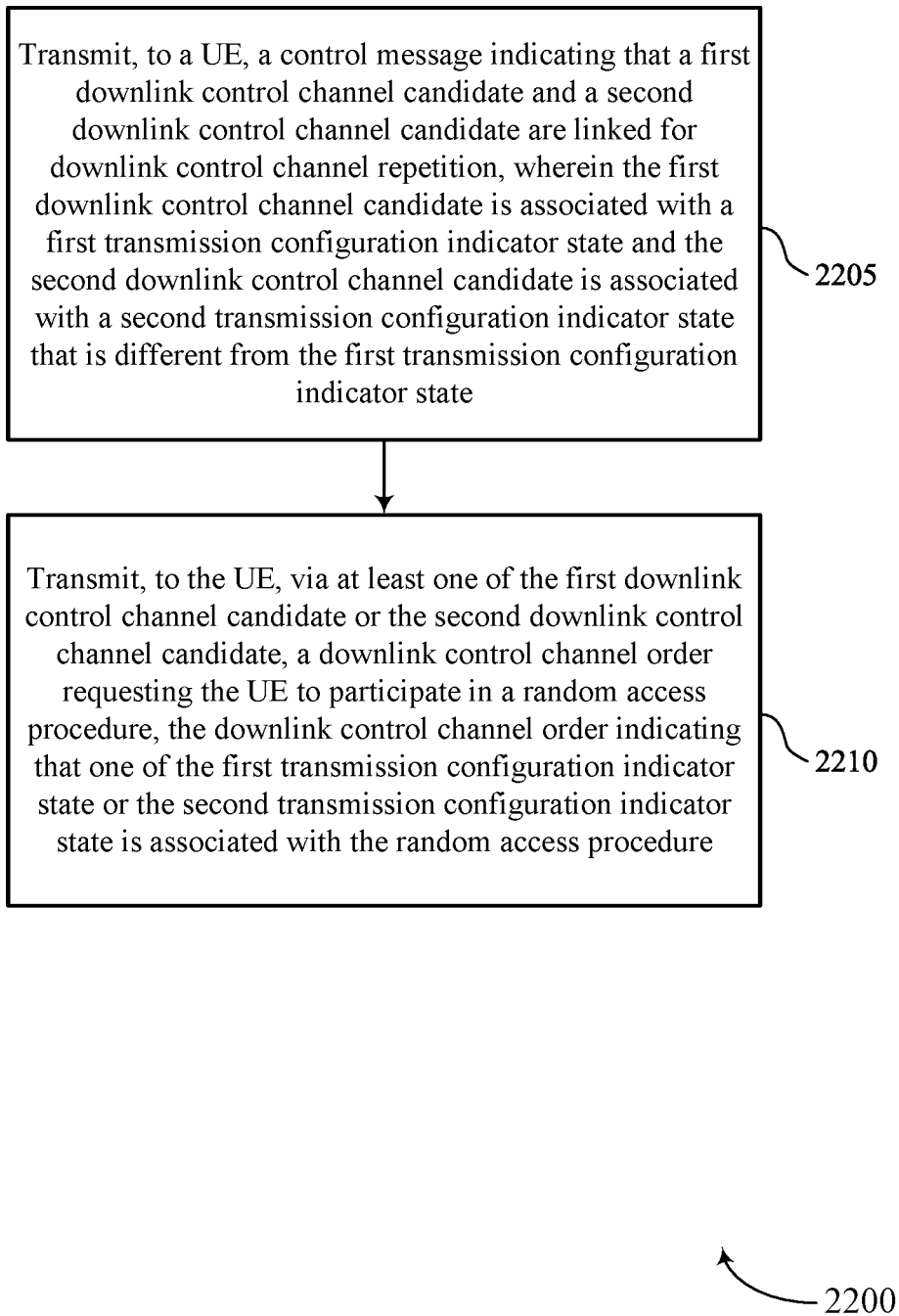

FIG. 22 shows a flowchart illustrating a method 2200 that supports downlink control channel repetition for a downlink control channel order in accordance with aspects of the present disclosure. The operations of the method 2200 may be implemented by a base station or its components as described herein. For example, the operations of the method 2200 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2205, the method may include transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 2205 may be performed in accordance with examples as disclosed herein. In some examples, aspects of the operations of 2205 may be performed by a linked PDCCH identification manager 1425 as described with reference to FIG. 14.

At 2210, the method may include transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The operations of 2210 may be performed in accordance with examples as disclosed herein. In some examples, aspects of the operations of 2210 may be performed by a PDCCH order manager 1430 as described with reference to FIG. 14.

Figure 23:
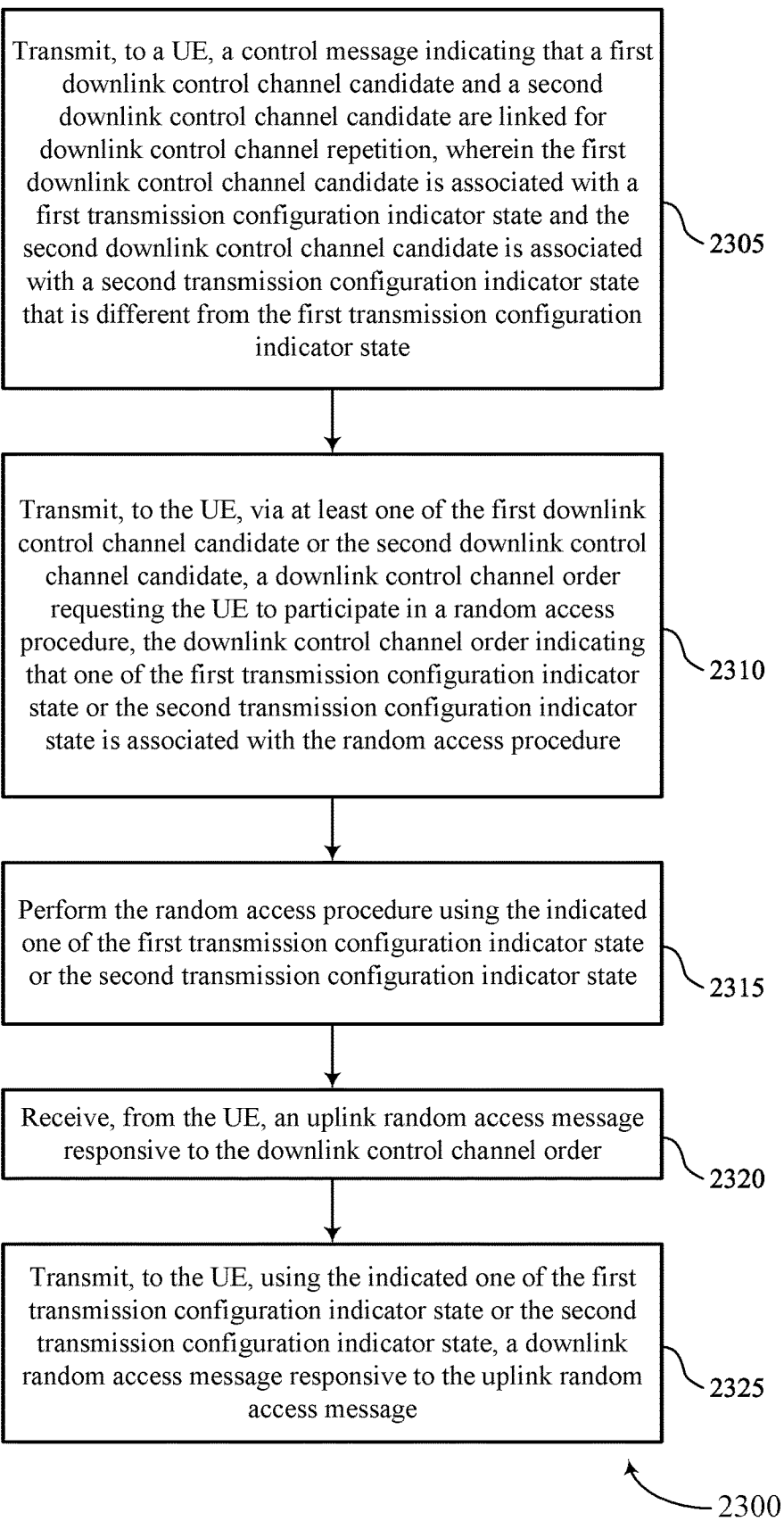

FIG. 23 shows a flowchart illustrating a method 2300 that supports downlink control channel repetition for a downlink control channel order in accordance with aspects of the present disclosure. The operations of the method 2300 may be implemented by a base station or its components as described herein. For example, the operations of the method 2300 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2305, the method may include transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 2305 may be performed in accordance with examples as disclosed herein. In some examples, aspects of the operations of 2305 may be performed by a linked PDCCH identification manager 1425 as described with reference to FIG. 14.

At 2310, the method may include transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The operations of 2310 may be performed in accordance with examples as disclosed herein. In some examples, aspects of the operations of 2310 may be performed by a PDCCH order manager 1430 as described with reference to FIG. 14.

At 2315, the method may include performing the random access procedure using the indicated one of the first TCI state or the second TCI state. The operations of 2315 may be performed in accordance with examples as disclosed herein. In some examples, aspects of the operations of 2315 may be performed by a random access procedure manager 1435 as described with reference to FIG. 14.

At 2320, the method may include receiving, from the UE, an uplink random access message responsive to the downlink control channel order. The operations of 2320 may be performed in accordance with examples as disclosed herein. In some examples, aspects of the operations of 2320 may be performed by an uplink random access message manager 1455 as described with reference to FIG. 14.

At 2325, the method may include transmitting, to the UE, using the indicated one of the first TCI state or the second TCI state, a downlink random access message responsive to the uplink random access message. The operations of 2325 may be performed in accordance with examples as disclosed herein. In some examples, aspects of the operations of 2325 may be performed by a downlink random access message manager 1450 as described with reference to FIG. 14.

Figure 24:
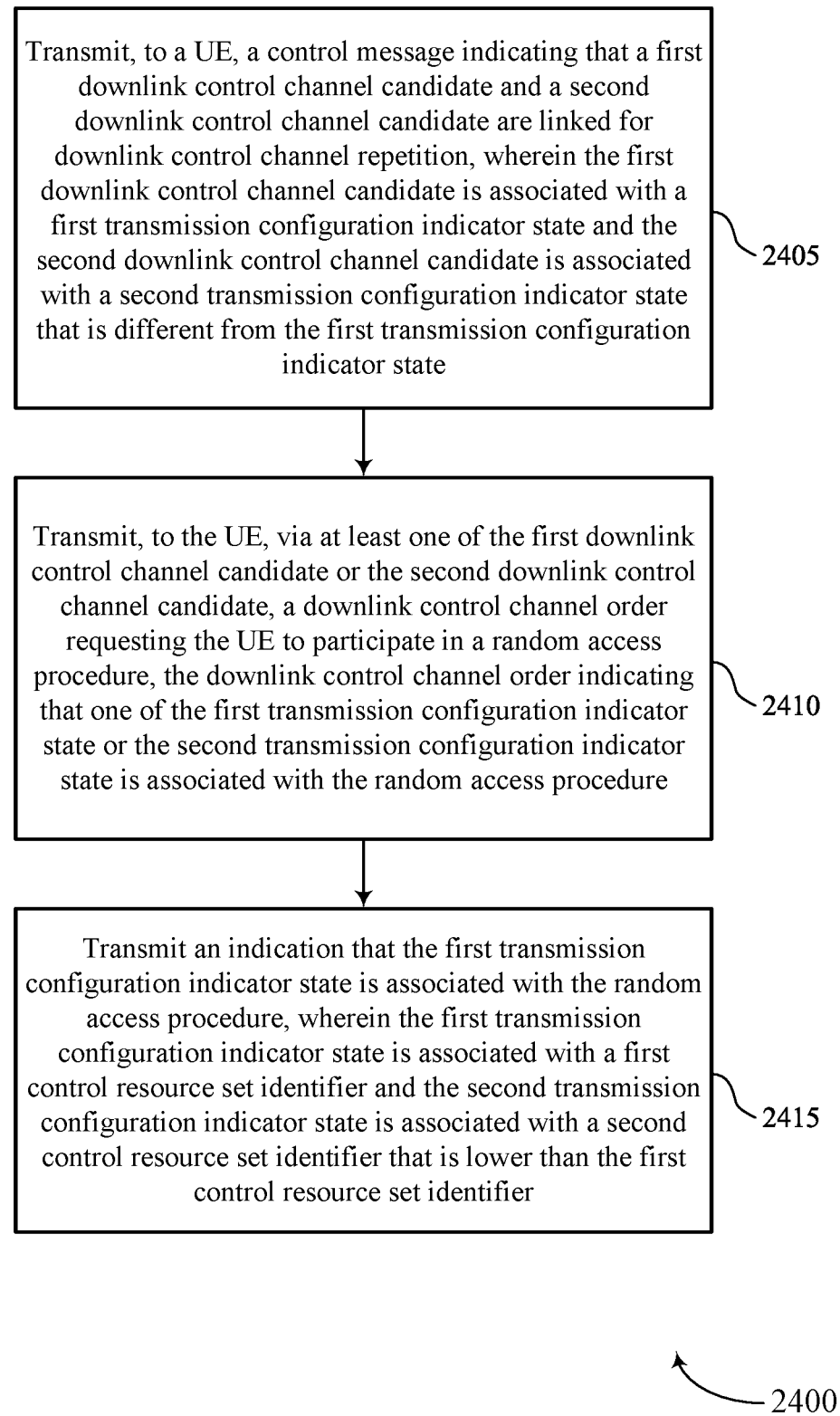

FIG. 24 shows a flowchart illustrating a method 2400 that supports downlink control channel repetition for a downlink control channel order in accordance with aspects of the present disclosure. The operations of the method 2400 may be implemented by a base station or its components as described herein. For example, the operations of the method 2400 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2405, the method may include transmitting, to a UE, a control message indicating that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 2405 may be performed in accordance with examples as disclosed herein. In some examples, aspects of the operations of 2405 may be performed by a linked PDCCH identification manager 1425 as described with reference to FIG. 14.

At 2410, the method may include transmitting, to the UE, via at least one of the first downlink control channel candidate or the second downlink control channel candidate, a downlink control channel order requesting the UE to participate in a random access procedure, the downlink control channel order indicating that one of the first TCI state or the second TCI state is associated with the random access procedure. The operations of 2410 may be performed in accordance with examples as disclosed herein. In some examples, aspects of the operations of 2410 may be performed by a PDCCH order manager 1430 as described with reference to FIG. 14.

At 2415, the method may include transmitting an indication that the first TCI state is associated with the random access procedure, where the first TCI state is associated with a first CORESET ID and the second TCI state is associated with a second CORESET ID that is lower than the first CORESET ID. The operations of 2415 may be performed in accordance with examples as disclosed herein. In some examples, aspects of the operations of 2415 may be performed by a TCI indicator manager 1440 as described with reference to FIG. 14.

Figure 25:
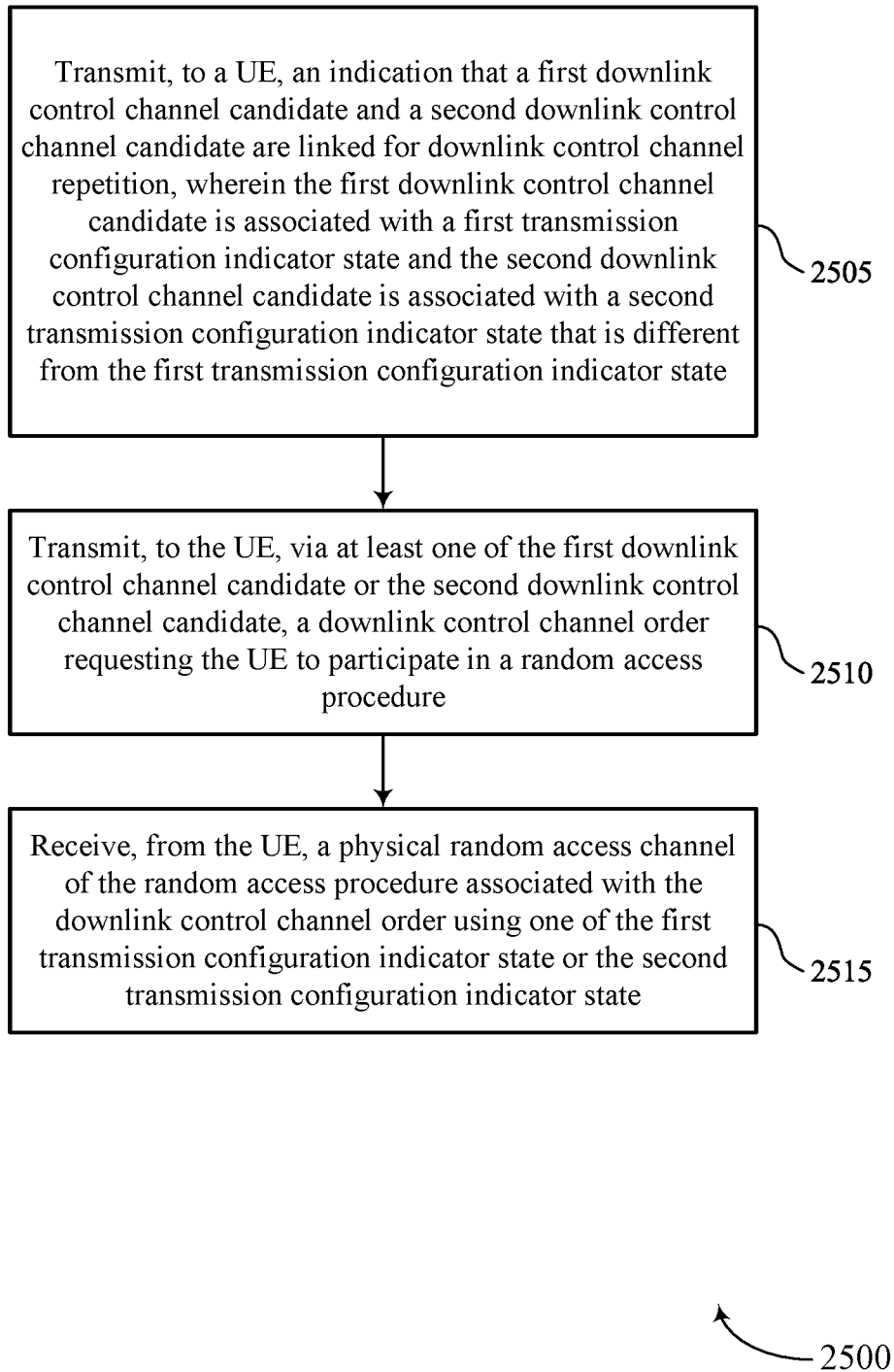

FIG. 25 shows a flowchart illustrating a method 2500 that supports downlink control channel repetition for a downlink control channel order in accordance with aspects of the present disclosure. The operations of the method 2500 may be implemented by a base station or its components as described herein. For example, the operations of the method 2500 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2505, the method may include transmitting, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 2505 may be performed in accordance with examples as disclosed herein. In some examples, aspects of the operations of 2505 may be performed by a linked PDCCH identification manager 1425 as described with reference to FIG. 14.

At 2510, the method may include transmitting, to the UE, via at least one of the first downlink control channel candidate or the second downlink control channel candidate, a downlink control channel order requesting the UE to participate in a random access procedure. The operations of 2510 may be performed in accordance with examples as disclosed herein. In some examples, aspects of the operations of 2510 may be performed by a PDCCH order manager 1430 as described with reference to FIG. 14.

At 2515, the method may include receiving, from the UE, a PRACH of the random access procedure associated with the downlink control channel order using one of the first TCI state or the second TCI state. The operations of 2515 may be performed in accordance with examples as disclosed herein. In some examples, aspects of the operations of 2515 may be performed by a random access procedure manager 1435 as described with reference to FIG. 14.

Figure 26:
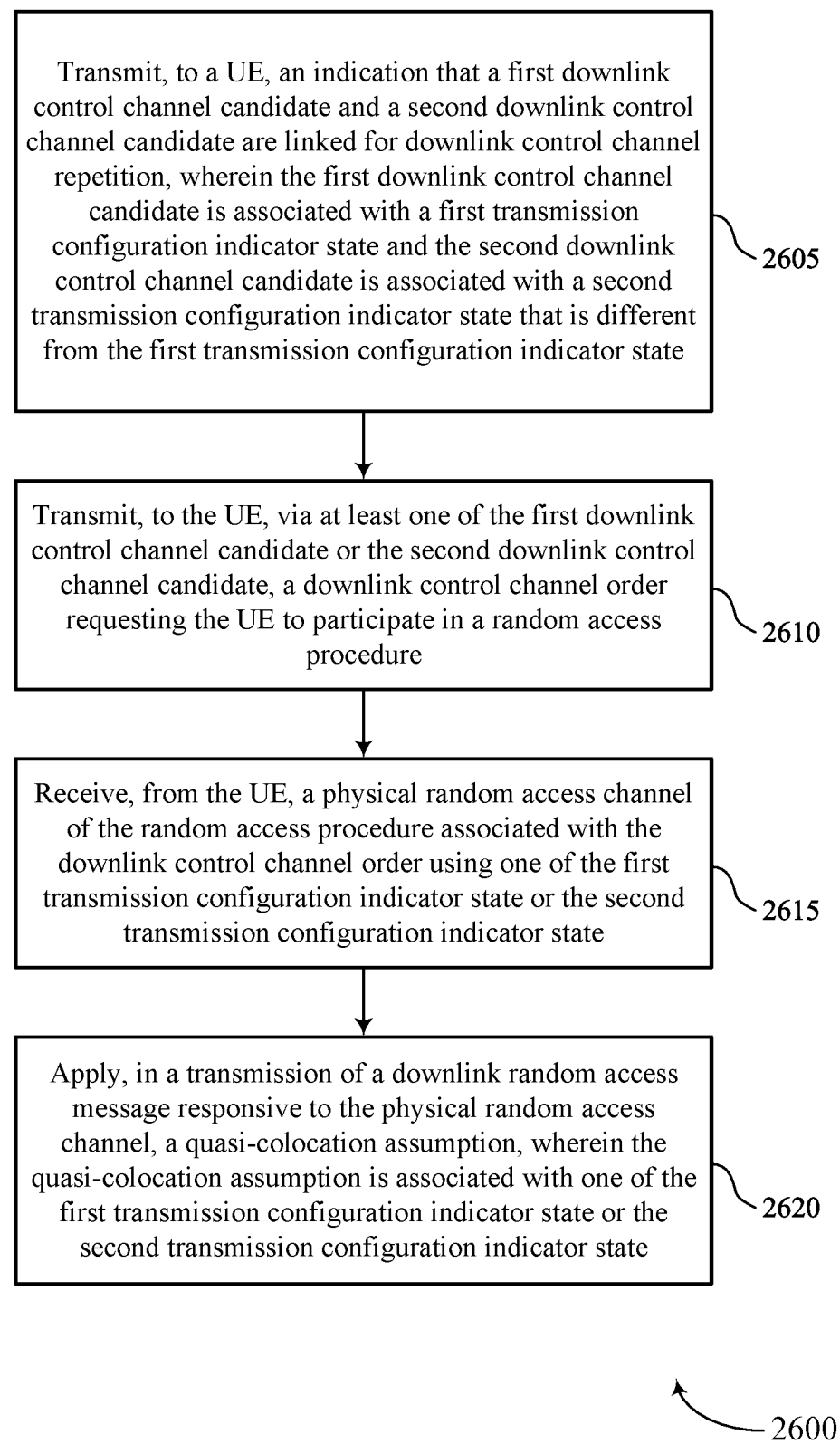

FIG. 26 shows a flowchart illustrating a method 2600 that supports downlink control channel repetition for a downlink control channel order in accordance with aspects of the present disclosure. The operations of the method 2600 may be implemented by a base station or its components as described herein. For example, the operations of the method 2600 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2605, the method may include transmitting, to a UE, an indication that a first downlink control channel candidate and a second downlink control channel candidate are linked for downlink control channel repetition, where the first downlink control channel candidate is associated with a first TCI state and the second downlink control channel candidate is associated with a second TCI state that is different from the first TCI state. The operations of 2605 may be performed in accordance with examples as disclosed herein. In some examples, aspects of the operations of 2605 may be performed by a linked PDCCH identification manager 1425 as described with reference to FIG. 14.

At 2610, the method may include transmitting, to the UE, via at least one of the first downlink control channel candidate or the second downlink control channel candidate, a downlink control channel order requesting the UE to participate in a random access procedure. The operations of 2610 may be performed in accordance with examples as disclosed herein. In some examples, aspects of the operations of 2610 may be performed by a PDCCH order manager 1430 as described with reference to FIG. 14.

At 2615, the method may include receiving, from the UE, a PRACH of the random access procedure associated with the downlink control channel order using one of the first TCI state or the second TCI state. The operations of 2615 may be performed in accordance with examples as disclosed herein. In some examples, aspects of the operations of 2615 may be performed by a random access procedure manager 1435 as described with reference to FIG. 14.

At 2620, the method may include applying, in a transmission of a downlink random access message responsive to the PRACH, a QCL assumption, where the QCL assumption is associated with one of the first TCI state or the second TCI state. The operations of 2620 may be performed in accordance with examples as disclosed herein. In some examples, aspects of the operations of 2620 may be performed by a downlink random access message manager 1450 as described with reference to FIG. 14. The following provides an overview of aspects of the present disclosure:

Aspect 1: A method for wireless communications at a UE, comprising: receiving a control message indicating that a first downlink control channel candidate and a second downlink control channel candidate are linked for downlink control channel repetition, wherein the first downlink control channel candidate is associated with a first transmission configuration indicator state and the second downlink control channel candidate is associated with a second transmission configuration indicator state that is different from the first transmission configuration indicator state; receiving, via at least one of the first downlink control channel candidate or the second downlink control channel candidate, a downlink control channel order requesting the UE to participate in a random access procedure, the downlink control channel order indicating that one of the first transmission configuration indicator state or the second transmission configuration indicator state is associated with the random access procedure; and performing the random access procedure using the indicated one of the first transmission configuration indicator state or the second transmission configuration indicator state.

Aspect 2: The method of aspect 1, wherein receiving the downlink control channel order comprises: receiving an indication that the first transmission configuration indicator state is associated with the random access procedure, wherein the first transmission configuration indicator state is associated with a first control resource set identifier and the second transmission configuration indicator state is associated with a second control resource set identifier that is lower than the first control resource set identifier.

Aspect 3: The method of any of aspects 1 through 2, wherein receiving the downlink control channel order comprises: receiving an indication that the first transmission configuration indicator state is associated with the random access procedure, wherein the first transmission configuration indicator state is associated with a first search space identifier and the second transmission configuration indicator state is associated with a second search space identifier that is lower than the first search space identifier.

Aspect 4: The method of any of aspects 1 through 3, wherein receiving the downlink control channel order comprises: receiving an indication that the first transmission configuration indicator state is associated with the random access procedure, wherein the first transmission configuration indicator state is associated with a first transmission configuration indicator state identifier and the second transmission configuration indicator state is associated with a second transmission configuration indicator state identifier that is lower than the first transmission configuration indicator state identifier.

Aspect 5: The method of any of aspects 1 through 4, wherein receiving the downlink control channel order comprises: receiving an indication that the first transmission configuration indicator state is associated with the random access procedure, wherein the first transmission configuration indicator state is associated with a first control resource set identifier and the second transmission configuration indicator state is associated with a second control resource set identifier that is higher than the first control resource set identifier.

Aspect 6: The method of any of aspects 1 through 5, wherein receiving the downlink control channel order comprises: receiving an indication that the first transmission configuration indicator state is associated with the random access procedure, first search space identifier and the second transmission configuration indicator state is associated with a second search space identifier that is higher than the first search space identifier.

Aspect 7: The method of any of aspects 1 through 6, wherein receiving the downlink control channel order comprises: receiving an indication that the first transmission configuration indicator state is associated with the random access procedure, wherein the first transmission configuration indicator state is associated with a first transmission configuration indicator state identifier and the second transmission configuration indicator state is associated with a second transmission configuration indicator state identifier that is higher than the first transmission configuration indicator state identifier.

Aspect 8: The method of any of aspects 1 through 7, wherein the indicated one of the first transmission configuration indicator state or the second transmission configuration indicator state used for the random access procedure is based at least in part on a relative timing of the first downlink control channel candidate and the second downlink control channel candidate.

Aspect 9: The method of any of aspects 1 through 8, wherein performing the random access procedure comprises: transmitting an uplink random access message responsive to the downlink control channel order; and receiving, using the indicated one of the first transmission configuration indicator state or the second transmission configuration indicator state, a downlink random access message responsive to the uplink random access message.

Aspect 10: The method of aspect 9, wherein receiving the downlink random access message comprises: receiving downlink control information that schedules a random access response message; and receiving the random access response message via a physical downlink shared channel.

Aspect 11: The method of any of aspects 9 through 10, wherein performing the random access procedure comprises: receiving the downlink random access message responsive to the uplink random access message using a same beam that was used to receive the one of the first downlink control channel candidate or the second downlink control channel candidate that is associated with the indicated one of the first transmission configuration indicator state or the second transmission configuration indicator state.

Aspect 12: The method of any of aspects 1 through 11, wherein the downlink control channel order requests a contention-free random access procedure on a primary cell or a primary-secondary cell.

Aspect 13: The method of any of aspects 1 through 12, wherein receiving the downlink control channel order comprises: receiving the downlink control channel order via downlink control information, wherein the downlink control information indicates the one of the first transmission configuration indicator state or the second transmission configuration indicator state to use for the random access procedure.

Aspect 14: A method for wireless communications at a UE, comprising: receiving an indication that a first downlink control channel candidate and a second downlink control channel candidate are linked for downlink control channel repetition, wherein the first downlink control channel candidate is associated with a first transmission configuration indicator state and the second downlink control channel candidate is associated with a second transmission configuration indicator state that is different from the first transmission configuration indicator state; receiving, via at least one of the first downlink control channel candidate or the second downlink control channel candidate, a downlink control channel order requesting the UE to participate in a random access procedure; and transmitting a physical random access channel of the random access procedure associated with the downlink control channel order using one of the first transmission configuration indicator state or the second transmission configuration indicator state.

Aspect 15: The method of aspect 14, further comprising: measuring a first channel quality of the first downlink control channel candidate and a second channel quality of the second downlink control channel candidate; and selecting one of the first transmission configuration indicator state or the second transmission configuration indicator state for transmitting the physical random access channel based at least in part on the measured first channel quality of the first downlink control channel candidate and the measured second channel quality of the second downlink control channel candidate.

Aspect 16: The method of aspect 15, wherein the transmitting the physical random access channel comprises transmitting the physical random access channel using the selected one of the of the first transmission configuration indicator state or the second transmission configuration indicator state.

Aspect 17: The method of any of aspects 15 through 16, further comprising: receiving a first demodulation reference signal associated with the first downlink control channel candidate, wherein the first channel quality of the first downlink control channel candidate is measured based at least in part on the first demodulation reference signal; and receiving a second demodulation reference signal associated with the second downlink control channel candidate, wherein the second channel quality of the second downlink control channel candidate is measured based at least in part on the second demodulation reference signal.

Aspect 18: The method of aspect 17, wherein measuring the first channel quality of the first downlink control channel candidate and the second channel quality of the second downlink control channel candidate comprises: measuring a first signal to interference and noise ratio associated with the first demodulation reference signal and a second signal to interference and noise ratio associated with the second demodulation reference signal.

Aspect 19: The method of any of aspects 17 through 18, wherein measuring the first channel quality of the first downlink control channel candidate and the second channel quality of the second downlink control channel candidate comprises: measuring a first reference signal received power associated with the first demodulation reference signal and a second reference signal received power associated with the second demodulation reference signal.

Aspect 20: The method of any of aspects 15 through 19, further comprising: receiving a first set of coded bits via the first downlink control channel candidate, wherein the first channel quality of the first downlink control channel candidate is measured based at least in part on the first set of coded bits; and receiving a second set of coded bits via the second downlink control channel candidate, wherein the second channel quality of the second downlink control channel candidate is measured based at least in part on the second set of coded bits.

Aspect 21: The method of aspect 20, wherein measuring the first channel quality of the first downlink control channel candidate and the second channel quality of the second downlink control channel candidate comprises: measuring a first log likelihood ratio associated with the first set of coded bits and a second log likelihood ratio associated with the second set of coded bits.

Aspect 22: The method of any of aspects 14 through 21, further comprising: applying, in a reception of a downlink random access message responsive to the physical random access channel, a quasi-colocation assumption, wherein the quasi-colocation assumption is associated with one of the first transmission configuration indicator state or the second transmission configuration indicator state.

Aspect 23: The method of aspect 22, wherein the reception of the downlink random access message comprises: receiving downlink control information that schedules a random access response message; and receiving the random access response message via a physical downlink shared channel.

Aspect 24: The method of any of aspects 22 through 23, wherein the quasi-colocation assumption is associated with a synchronization signal block that is associated with the physical random access channel.

Aspect 25: The method of any of aspects 14 through 24, wherein transmitting the physical random access channel comprises: transmitting the physical random access channel in one of a first physical random access channel occasion associated with the first transmission configuration indicator state, or a second physical random access channel occasion associated with the second transmission configuration indicator state, wherein the first physical random access channel occasion is associated with a first synchronization signal block and the second physical random access channel occasion is associated with a second synchronization signal block.

Aspect 26: The method of any of aspects 14 through 25, wherein the downlink control channel order requests a contention-free random access procedure on a primary cell or a primary-secondary cell.

Aspect 27: A method for wireless communications at a base station comprising: transmitting, to a UE, a control message indicating that a first downlink control channel candidate and a second downlink control channel candidate are linked for downlink control channel repetition, wherein the first downlink control channel candidate is associated with a first transmission configuration indicator state and the second downlink control channel candidate is associated with a second transmission configuration indicator state that is different from the first transmission configuration indicator state; and transmitting, to the UE, via at least one of the first downlink control channel candidate or the second downlink control channel candidate, a downlink control channel order requesting the UE to participate in a random access procedure, the downlink control channel order indicating that one of the first transmission configuration indicator state or the second transmission configuration indicator state is associated with the random access procedure.

Aspect 28: The method of aspect 27, further comprising: performing the random access procedure using the indicated one of the first transmission configuration indicator state or the second transmission configuration indicator state.

Aspect 29: The method of aspect 28, wherein performing the random access procedure comprises: receiving, from the UE, an uplink random access message responsive to the downlink control channel order; and transmitting, to the UE, using the indicated one of the first transmission configuration indicator state or the second transmission configuration indicator state, a downlink random access message responsive to the uplink random access message.

Aspect 30: The method of aspect 29, wherein performing the random access procedure comprises: transmitting the downlink random access message responsive to the uplink random access message using a same beam that was used to transmit the one of the first downlink control channel candidate or the second downlink control channel candidate that is associated with the indicated one of the first transmission configuration indicator state or the second transmission configuration indicator state.

Aspect 31: The method of any of aspects 27 through 30, wherein transmitting the downlink control channel order comprises: transmitting an indication that the first transmission configuration indicator state is associated with the random access procedure, wherein the first transmission configuration indicator state is associated with a first control resource set identifier and the second transmission configuration indicator state is associated with a second control resource set identifier that is lower than the first control resource set identifier.

Aspect 32: The method of any of aspects 27 through 31, wherein transmitting the downlink control channel order comprises: transmitting an indication that the first transmission configuration indicator state is associated with the random access procedure, wherein the first transmission configuration indicator state is associated with a first search space identifier and the second transmission configuration indicator state is associated with a second search space identifier that is lower than the first search space identifier.

Aspect 33: The method of any of aspects 27 through 32, wherein transmitting the downlink control channel order comprises: transmitting an indication that the first transmission configuration indicator state is associated with the random access procedure, wherein the first transmission configuration indicator state is associated with a first transmission configuration indicator state identifier and the second transmission configuration indicator state is associated with a second transmission configuration indicator state identifier that is lower than the first transmission configuration indicator state identifier.

Aspect 34: The method of any of aspects 27 through 33, wherein transmitting the downlink control channel order comprises: transmitting an indication that the first transmission configuration indicator state is associated with the random access procedure, wherein the first transmission configuration indicator state is associated with a first control resource set identifier and the second transmission configuration indicator state is associated with a second control resource set identifier that is higher than the first control resource set identifier.

Aspect 35: The method of any of aspects 27 through 34, wherein transmitting the downlink control channel order comprises: transmitting an indication that the first transmission configuration indicator state is associated with the random access procedure, first search space identifier and the second transmission configuration indicator state is associated with a second search space identifier that is higher than the first search space identifier.

Aspect 36: The method of any of aspects 27 through 35, wherein transmitting the downlink control channel order comprises: transmitting an indication that the first transmission configuration indicator state is associated with the random access procedure, wherein the first transmission configuration indicator state is associated with a first transmission configuration indicator state identifier and the second transmission configuration indicator state is associated with a second transmission configuration indicator state identifier that is higher than the first transmission configuration indicator state identifier.

Aspect 37: The method of any of aspects 27 through 36, wherein the indicated one of the first transmission configuration indicator state or the second transmission configuration indicator state used for the random access procedure is based at least in part on a relative timing of the first downlink control channel candidate and the second downlink control channel candidate.

Aspect 38: The method of any of aspects 27 through 37, wherein the downlink control channel order requests a contention-free random access procedure on a primary cell or a primary-secondary cell.

Aspect 39: The method of any of aspects 27 through 38, wherein transmitting the downlink control channel order comprises: transmitting the downlink control channel order via downlink control information, wherein the downlink control information indicates the one of the first transmission configuration indicator state or the second transmission configuration indicator state to use for the random access procedure.

Aspect 40: A method for wireless communications at a base station, comprising: transmitting, to a UE, an indication that a first downlink control channel candidate and a second downlink control channel candidate are linked for downlink control channel repetition, wherein the first downlink control channel candidate is associated with a first transmission configuration indicator state and the second downlink control channel candidate is associated with a second transmission configuration indicator state that is different from the first transmission configuration indicator state; transmitting, to the UE, via at least one of the first downlink control channel candidate or the second downlink control channel candidate, a downlink control channel order requesting the UE to participate in a random access procedure; and receiving, from the UE, a physical random access channel of the random access procedure associated with the downlink control channel order using one of the first transmission configuration indicator state or the second transmission configuration indicator state.

Aspect 41: The method of aspect 40, further comprising: transmitting, to the UE, a first demodulation reference signal associated with the first downlink control channel candidate; and transmitting, to the UE, a second demodulation reference signal associated with the second downlink control channel candidate.

Aspect 42: The method of any of aspects 40 through 41, further comprising: applying, in a transmission of a downlink random access message responsive to the physical random access channel, a quasi-colocation assumption, wherein the quasi-colocation assumption is associated with one of the first transmission configuration indicator state or the second transmission configuration indicator state.

Aspect 43: The method of aspect 42, wherein the quasi-colocation assumption is associated with a synchronization signal block that is associated with the physical random access channel.

Aspect 44: The method of any of aspects 40 through 43, wherein receiving the physical random access channel comprises: receiving the physical random access channel in one of a first physical random access channel occasion associated with the first transmission configuration indicator state, or a second physical random access channel occasion associated with the second transmission configuration indicator state, wherein the first physical random access channel occasion is associated with a first synchronization signal block and the second physical random access channel occasion is associated with a second synchronization signal block.

Aspect 45: The method of any of aspects 40 through 44, wherein the downlink control channel order requests a contention-free random access procedure on a primary cell or a primary-secondary cell.

Aspect 46: An apparatus for wireless communications at a UE, comprising a processor; memory coupled with the processor; and instructions stored in the memory and executable by the processor to cause the apparatus to perform a method of any of aspects 1 through 13.

Aspect 47: An apparatus for wireless communications at a UE, comprising at least one means for performing a method of any of aspects 1 through 13.

Aspect 48: A non-transitory computer-readable medium storing code for wireless communications at a UE, the code comprising instructions executable by a processor to perform a method of any of aspects 1 through 13.

Aspect 49: An apparatus for wireless communications at a UE, comprising a processor; memory coupled with the processor; and instructions stored in the memory and executable by the processor to cause the apparatus to perform a method of any of aspects 14 through 26.

Aspect 50: An apparatus for wireless communications at a UE, comprising at least one means for performing a method of any of aspects 14 through 26.

Aspect 51: A non-transitory computer-readable medium storing code for wireless communications at a UE, the code comprising instructions executable by a processor to perform a method of any of aspects 14 through 26.

Aspect 52: An apparatus comprising a processor; memory coupled with the processor; and instructions stored in the memory and executable by the processor to cause the apparatus to perform a method of any of aspects 27 through 39.

Aspect 53: An apparatus comprising at least one means for performing a method of any of aspects 27 through 39.

Aspect 54: A non-transitory computer-readable medium storing code the code comprising instructions executable by a processor to perform a method of any of aspects 27 through 39.

Aspect 55: An apparatus for wireless communications at a base station, comprising a processor; memory coupled with the processor; and instructions stored in the memory and executable by the processor to cause the apparatus to perform a method of any of aspects 40 through 45.

Aspect 56: An apparatus for wireless communications at a base station, comprising at least one means for performing a method of any of aspects 40 through 45.

Aspect 57: A non-transitory computer-readable medium storing code for wireless communications at a base station, the code comprising instructions executable by a processor to perform a method of any of aspects 40 through 45.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a control message indicating that a first downlink control channel candidate and a second downlink control channel candidate are linked for downlink control channel repetition, wherein the first downlink control channel candidate is associated with a first transmission configuration indicator state and the second downlink control channel candidate is associated with a second transmission configuration indicator state that is different from the first transmission configuration indicator state;
    receiving, via at least one of the first downlink control channel candidate or the second downlink control channel candidate, a downlink control channel order requesting the UE to participate in a random access procedure, the downlink control channel order including an indication that one of the first transmission configuration indicator state or the second transmission configuration indicator state is to be used for the random access procedure; and
    performing the random access procedure, wherein performing the random access procedure comprises:
        transmitting an uplink random access message responsive to the downlink control channel order; and
        receiving, using one of the first transmission configuration indicator state or the second transmission configuration indicator state indicated by the downlink control channel order, a downlink random access message responsive to the uplink random access message using a same beam that was used to receive the at least one of the first downlink control channel candidate or the second downlink control channel candidate that is associated with the one of the first transmission configuration indicator state or the second transmission configuration indicator state.

2. The method of claim 1, wherein receiving the downlink control channel order comprises:
    receiving an indication that the first transmission configuration indicator state is to be used for the random access procedure, wherein the first transmission configuration indicator state is associated with a first control resource set identifier and the second transmission configuration indicator state is associated with a second control resource set identifier that is lower than the first control resource set identifier.

3. The method of claim 1, wherein receiving the downlink control channel order comprises:
    receiving an indication that the first transmission configuration indicator state is to be used for the random access procedure, wherein the first transmission configuration indicator state is associated with a first search space identifier and the second transmission configuration indicator state is associated with a second search space identifier that is lower than the first search space identifier.

4. The method of claim 1, wherein receiving the downlink control channel order comprises:
    receiving an indication that the first transmission configuration indicator state is to be used for the random access procedure, wherein the first transmission configuration indicator state is associated with a first transmission configuration indicator state identifier and the second transmission configuration indicator state is associated with a second transmission configuration indicator state identifier that is lower than the first transmission configuration indicator state identifier.

5. The method of claim 1, wherein receiving the downlink control channel order comprises:
    receiving an indication that the first transmission configuration indicator state is to be used for the random access procedure, wherein the first transmission configuration indicator state is associated with a first control resource set identifier and the second transmission configuration indicator state is associated with a second control resource set identifier that is higher than the first control resource set identifier.

6. The method of claim 1, wherein receiving the downlink control channel order comprises:
    receiving an indication that the first transmission configuration indicator state is to be used for the random access procedure, first search space identifier and the second transmission configuration indicator state is associated with a second search space identifier that is higher than the first search space identifier.

7. The method of claim 1, wherein receiving the downlink control channel order comprises:
    receiving an indication that the first transmission configuration indicator state is to be used for the random access procedure, wherein the first transmission configuration indicator state is associated with a first transmission configuration indicator state identifier and the second transmission configuration indicator state is associated with a second transmission configuration indicator state identifier that is higher than the first transmission configuration indicator state identifier.

8. The method of claim 1, wherein the one of the first transmission configuration indicator state or the second transmission configuration indicator state indicated by the downlink control channel order used for the random access procedure is based at least in part on a relative timing of the first downlink control channel candidate and the second downlink control channel candidate.

9. The method of claim 1, wherein receiving the downlink random access message comprises receiving downlink control information that schedules a random access response message, the method further comprising:
    receiving the random access response message via a physical downlink shared channel.

10. The method of claim 1, wherein the downlink control channel order requests a contention-free random access procedure on a primary cell or a primary-secondary cell.

11. The method of claim 1, wherein receiving the downlink control channel order comprises:
    receiving the downlink control channel order via downlink control information, wherein the downlink control information indicates the one of the first transmission configuration indicator state or the second transmission configuration indicator state to use for the random access procedure.

12. A method for wireless communications at a network device comprising:
    transmitting, to a user equipment (UE), a control message indicating that a first downlink control channel candidate and a second downlink control channel candidate are linked for downlink control channel repetition, wherein the first downlink control channel candidate is associated with a first transmission configuration indicator state and the second downlink control channel candidate is associated with a second transmission configuration indicator state that is different from the first transmission configuration indicator state;
    transmitting, to the UE, via at least one of the first downlink control channel candidate or the second downlink control channel candidate, a downlink control channel order requesting the UE to participate in a random access procedure, the downlink control channel order including an indication that one of the first transmission configuration indicator state or the second transmission configuration indicator state is to be used for the random access procedure; and
    performing the random access procedure, wherein performing the random access procedure comprises:
        receiving, from the UE, an uplink random access message responsive to the downlink control channel order; and
        transmitting, to the UE, using the one of the first transmission configuration indicator state or the second transmission configuration indicator state indicated by the downlink control channel order, a downlink random access message responsive to the uplink random access message using a same beam that was used to transmit the at least one of the first downlink control channel candidate or the second downlink control channel candidate that is associated with the one of the first transmission configuration indicator state or the second transmission configuration indicator state.

13. The method of claim 12, wherein transmitting the downlink control channel order comprises:
    transmitting an indication that the first transmission configuration indicator state is to be used for the random access procedure, wherein the first transmission configuration indicator state is associated with a first control resource set identifier and the second transmission configuration indicator state is associated with a second control resource set identifier that is lower than the first control resource set identifier.

14. The method of claim 12, wherein transmitting the downlink control channel order comprises:
    transmitting an indication that the first transmission configuration indicator state is to be used for the random access procedure, wherein the first transmission configuration indicator state is associated with a first search space identifier and the second transmission configuration indicator state is associated with a second search space identifier that is lower than the first search space identifier.

15. The method of claim 12, wherein transmitting the downlink control channel order comprises:
    transmitting an indication that the first transmission configuration indicator state is to be used for the random access procedure, wherein the first transmission configuration indicator state is associated with a first transmission configuration indicator state identifier and the second transmission configuration indicator state is associated with a second transmission configuration indicator state identifier that is lower than the first transmission configuration indicator state identifier.

16. The method of claim 12, wherein transmitting the downlink control channel order comprises:
    transmitting an indication that the first transmission configuration indicator state is to be used for the random access procedure, wherein the first transmission configuration indicator state is associated with a first control resource set identifier and the second transmission configuration indicator state is associated with a second control resource set identifier that is higher than the first control resource set identifier.

17. The method of claim 12, wherein transmitting the downlink control channel order comprises:
    transmitting an indication that the first transmission configuration indicator state is to be used for the random access procedure, first search space identifier and the second transmission configuration indicator state is associated with a second search space identifier that is higher than the first search space identifier.

18. The method of claim 12, wherein transmitting the downlink control channel order comprises:
    transmitting an indication that the first transmission configuration indicator state is to be used for the random access procedure, wherein the first transmission configuration indicator state is associated with a first transmission configuration indicator state identifier and the second transmission configuration indicator state is associated with a second transmission configuration indicator state identifier that is higher than the first transmission configuration indicator state identifier.

19. The method of claim 12, wherein the one of the first transmission configuration indicator state or the second transmission configuration indicator state indicated by the downlink control channel order used for the random access procedure is based at least in part on a relative timing of the first downlink control channel candidate and the second downlink control channel candidate.

20. The method of claim 12, wherein the downlink control channel order requests a contention-free random access procedure on a primary cell or a primary-secondary cell.

21. The method of claim 12, wherein transmitting the downlink control channel order comprises:
    transmitting the downlink control channel order via downlink control information, wherein the downlink control information indicates the one of the first transmission configuration indicator state or the second transmission configuration indicator state to use for the random access procedure.

22. An apparatus for wireless communications at a user equipment (UE), comprising:
    one or more processors;
    one or more memories coupled with the one or more processors; and instructions stored in the one or more memories, wherein the instructions are executable by the one or more processors to:
receive a control message indicating that a first downlink control channel candidate and a second downlink control channel candidate are linked for downlink control channel repetition, wherein the first downlink control channel candidate is associated with a first transmission configuration indicator state and the second downlink control channel candidate is associated with a second transmission configuration indicator state that is different from the first transmission configuration indicator state;
receive, via at least one of the first downlink control channel candidate or the second downlink control channel candidate, a downlink control channel order via downlink control information requesting the UE to participate in a random access procedure, the downlink control information indicating that one of the first transmission configuration indicator state or the second transmission configuration indicator state is to be used for the random access procedure; and
perform the random access procedure using one of the first transmission configuration indicator state or the second transmission configuration indicator state indicated by the downlink control channel order, wherein the instructions executable by the one or more processors to perform the random access procedure comprise instructions executable by the one or more processors to cause the apparatus to:
transmit an uplink random access message responsive to the downlink control channel order; and
receive, using one of the first transmission configuration indicator state or the second transmission configuration indicator state indicated by the downlink control channel order, a downlink random access message responsive to the uplink random access message using a same beam that was used to receive the at least one of the first downlink control channel candidate or the second downlink control channel candidate that is associated with the one of the first transmission configuration indicator state or the second transmission configuration indicator state.

23. The apparatus of claim 22, wherein the instructions executable by the one or more processors to receive the downlink control channel order comprise instructions executable by the one or more processors to cause the apparatus to:
receive an indication that the first transmission configuration indicator state is to be used for the random access procedure, wherein the first transmission configuration indicator state is associated with a first control resource set identifier and the second transmission configuration indicator state is associated with a second control resource set identifier that is lower than the first control resource set identifier.

24. The apparatus of claim 22, wherein the instructions executable by the one or more processors to receive the downlink control channel order comprise instructions executable by the one or more processors to cause the apparatus to:
receive an indication that the first transmission configuration indicator state is to be used for the random access procedure, wherein the first transmission configuration indicator state is associated with a first control resource set identifier and the second transmission configuration indicator state is associated with a second control resource set identifier that is lower than the first control resource set identifier.

25. The apparatus of claim 22, wherein the instructions executable by the one or more processors to receive the downlink control channel order comprise instructions executable by the one or more processors to cause the apparatus to:
receive an indication that the first transmission configuration indicator state is to be used for the random access procedure, wherein the first transmission configuration indicator state is associated with a first search space identifier and the second transmission configuration indicator state is associated with a second search space identifier that is lower than the first search space identifier.

26. The apparatus of claim 22, wherein the instructions executable by the one or more processors to receive the downlink control channel order comprise instructions executable by the one or more processors to cause the apparatus to:
receive an indication that the first transmission configuration indicator state is to be used for the random access procedure, wherein the first transmission configuration indicator state is associated with a first transmission configuration indicator state identifier and the second transmission configuration indicator state is associated with a second transmission configuration indicator state identifier that is lower than the first transmission configuration indicator state identifier.

27. The apparatus of claim 22, wherein the instructions executable by the one or more processors to receive the downlink control channel order comprise instructions executable by the one or more processors to cause the apparatus to:
receive the downlink control channel order via downlink control information, wherein the downlink control information indicates the one of the first transmission configuration indicator state or the second transmission configuration indicator state to use for the random access procedure.

28. The method of claim 12, further comprising:
performing the random access procedure using one of the first transmission configuration indicator state or the second transmission configuration indicator state indicated by the downlink control channel order.

29. An apparatus for wireless communications at a network device, comprising:
one or more processors;
one or more memories coupled with the one or more processors; and
instructions stored in the one or more memories, wherein the instructions are executable by the one or more processors to:
transmit, to a user equipment (UE), a control message indicating that a first downlink control channel candidate and a second downlink control channel candidate are linked for downlink control channel repetition, wherein the first downlink control channel candidate is associated with a first transmission configuration indicator state and the second downlink control channel candidate is associated with a second transmission configuration indicator state that is different from the first transmission configuration indicator state;
transmit, to the UE, via at least one of the first downlink control channel candidate or the second downlink control channel candidate, a downlink control channel order via downlink control information requesting the UE to participate in a random access procedure, the downlink control information indicating that one of the first transmission configuration indicator state or the second transmission configuration indicator state is to be used for the random access procedure; and perform the random access procedure using one of the first transmission configuration indicator state or the second transmission configuration indicator state indicated by the downlink control channel order, wherein the instructions executable by the one or more processors to perform the random access procedure comprise instructions executable by the one or more processors to cause the apparatus to:

receive, from the UE, an uplink random access message responsive to the downlink control channel order; and transmit, to the UE, using the one of the first transmission configuration indicator state or the second transmission configuration indicator state indicated by the downlink control channel order, a downlink random access message responsive to the uplink random access message using a same beam that was used to transmit the at least one of the first downlink control channel candidate or the second downlink control channel candidate that is associated with the one of the first transmission configuration indicator state or the second transmission configuration indicator state.

30. The apparatus of claim 29, wherein the instructions executable by the one or more processors to transmit the downlink control channel order comprise instructions executable by the one or more processors to cause the apparatus to:

transmit the downlink control channel order via downlink control information, wherein the downlink control information indicates the one of the first transmission configuration indicator state or the second transmission configuration indicator state to use for the random access procedure.

* * * * *